(12) United States Patent
Alalao et al.

(10) Patent No.: US 11,181,905 B2
(45) Date of Patent: Nov. 23, 2021

(54) TELEOPERATION OF AUTONOMOUS VEHICLES

(71) Applicant: Motional AD LLC, Boston, MA (US)

(72) Inventors: Ayman Alalao, Cambridge, MA (US); Hsun-Hsien Chang, Brookline, MA (US); Shih-Yuan Liu, Boston, MA (US)

(73) Assignee: MOTIONAL AD LLC, Boston, MA (US)

( * ) Notice: Subject to any disclaimer, the term of this patent is extended or adjusted under 35 U.S.C. 154(b) by 175 days.

(21) Appl. No.: 16/530,837

(22) Filed: Aug. 2, 2019

(65) Prior Publication Data

US 2020/0041994 A1 Feb. 6, 2020

Related U.S. Application Data

(60) Provisional application No. 62/714,015, filed on Aug. 2, 2018.

(51) Int. Cl.
*G05D 1/00* (2006.01)

(52) U.S. Cl.
CPC ......... *G05D 1/0022* (2013.01); *G05D 1/0055* (2013.01); *G05D 1/0088* (2013.01); *G05D 2201/0213* (2013.01)

(58) Field of Classification Search
CPC .. G05D 1/0022; G05D 1/0055; G05D 1/0088; G05D 2201/0213; G05D 1/0027;
(Continued)

(56) References Cited

U.S. PATENT DOCUMENTS 6,182,125 B1    1/2001  Borella et al.
9,373,149 B2 *  6/2016  Abhyanker .......... G05D 1/0251
(Continued)

FOREIGN PATENT DOCUMENTS

CN    107074065    8/2017
CN    107850895    3/2018
(Continued)

OTHER PUBLICATIONS

[No Author Listed], "J3016: SAE International Surface Vehicle Recommended Practice, Taxonomy and Definitions for Terms Related to Driving Automation Systems for On-Road Motor Vehicles," SAE International, Sep. 30, 2016, 30 pages.
(Continued)

*Primary Examiner* — Muhammad Shafi
(74) *Attorney, Agent, or Firm* — Fish & Richardson P.C.

(57) ABSTRACT

An autonomous vehicle receives sensor data from one or more sensors of the autonomous vehicle, and generates a request for remote control of the autonomous vehicle by a computer system remote from the autonomous vehicle. Generating the request includes determining a quality metric associated with a network connection between the autonomous vehicle and the computer system, and upon determining that the quality metric is greater than a threshold quality level, transmitting, from the autonomous vehicle to the computer system the request for remote control and a first data item representing the sensor data. The first data item meets one or more conditions associated with the threshold quality level.

16 Claims, 39 Drawing Sheets

(58) Field of Classification Search
CPC .... G05D 1/0236; G05D 1/024; G05D 1/0242;
G05D 1/0251; G05D 1/0255; G05D
1/0257; G05D 1/0263; G05D 1/0261;
G05D 1/0223; G05D 1/0214; G05D
1/0289; G05D 1/0293; G05D 1/0278;
G05D 1/028; G05D 1/0285; G05D
2201/0212; G05D 1/00; H04W 4/18;
H04W 4/38; H04W 4/024; H04W 4/40;
G08C 17/00; G08G 1/16
USPC .......................................................... 701/2
See application file for complete search history.

(56) References Cited

U.S. PATENT DOCUMENTS

| | | | |
|---|---|---|---|
| 9,494,439 B1* | 11/2016 | Ross | G05D 1/0027 |
| 2007/0291693 A1 | 12/2007 | Schultz et al. | |
| 2008/0027600 A1 | 1/2008 | Bierdeman et al. | |
| 2008/0095108 A1* | 4/2008 | Malladi | H04B 1/713 |
| | | | 370/329 |
| 2008/0180237 A1* | 7/2008 | Fayyad | G08G 1/205 |
| | | | 340/461 |
| 2008/0201032 A1* | 8/2008 | Fayyad | G07C 5/0816 |
| | | | 701/31.4 |
| 2014/0358409 A1 | 12/2014 | Khoe et al. | |
| 2015/0210387 A1 | 7/2015 | Ling et al. | |
| 2015/0339928 A1 | 11/2015 | Ramanujam | |
| 2016/0209220 A1 | 7/2016 | Laetz et al. | |
| 2016/0358475 A1 | 12/2016 | Prokhorov et al. | |
| 2017/0039667 A1 | 2/2017 | Kim | |
| 2017/0075358 A1 | 3/2017 | Zhang et al. | |
| 2017/0093947 A1* | 3/2017 | Smith | H04N 21/23805 |
| 2017/0098377 A1 | 4/2017 | Marco et al. | |
| 2017/0160092 A1 | 6/2017 | Botea et al. | |
| 2017/0249794 A1* | 8/2017 | Davis | G07C 9/00857 |
| 2018/0060827 A1 | 3/2018 | Abbas et al. | |
| 2018/0136651 A1 | 5/2018 | Levinson et al. | |
| 2018/0192142 A1* | 7/2018 | Paul | H04N 21/41407 |
| 2018/0202822 A1 | 7/2018 | Delizio et al. | |
| 2018/0209806 A1 | 7/2018 | Rakah | |
| 2018/0233047 A1* | 8/2018 | Mandeville-Clarke | |
| | | | B60W 30/00 |
| 2018/0267537 A1* | 9/2018 | Kroop | B60W 10/20 |
| 2020/0042019 A1 | 2/2020 | Marczuk et al. | |
| 2020/0377128 A1 | 12/2020 | Marczuk et al. | |

FOREIGN PATENT DOCUMENTS

| | | | |
|---|---|---|---|
| CN | 108292474 | | 7/2018 |
| CN | 108351221 | | 7/2018 |
| EP | 001959400 | * | 8/2008 |
| WO | 2002071787 | | 9/2002 |

OTHER PUBLICATIONS

DK Third Technical Examination in Danish Appln. No. PA 2018 70685, dated Sep. 21, 2020, 3 pages.
U.S. Appl. No. 16/885,380, filed May 28, 2020, Marczuk.
U.S. Appl. No. 16/530,827, filed Aug. 2, 2019, Marczuk.
EP Search Report in European Appln. No. 19187171.4, dated Dec. 6, 2019, 7 pages.
DK 5th Technical Examination in Danish Appln. No. PA 201870685, dated Feb. 24, 2021, 2 pages.
EP Extended Search Report in European Appln. No. 21169359.3, dated Jun. 17, 2021, 7 pages.
DK Search Opinion in Danish Appln. No. PA201870685, dated Jan. 25, 2019, 15 pages.
DK Fourth Technical Examination in Danish Appln. No. PA 201870685, dated Jan. 11, 2021, 7 pages.
DK Second Technical Examination in Danish Appln. No. PA 201870685, dated Oct. 25, 2019, 3 pages.

* cited by examiner

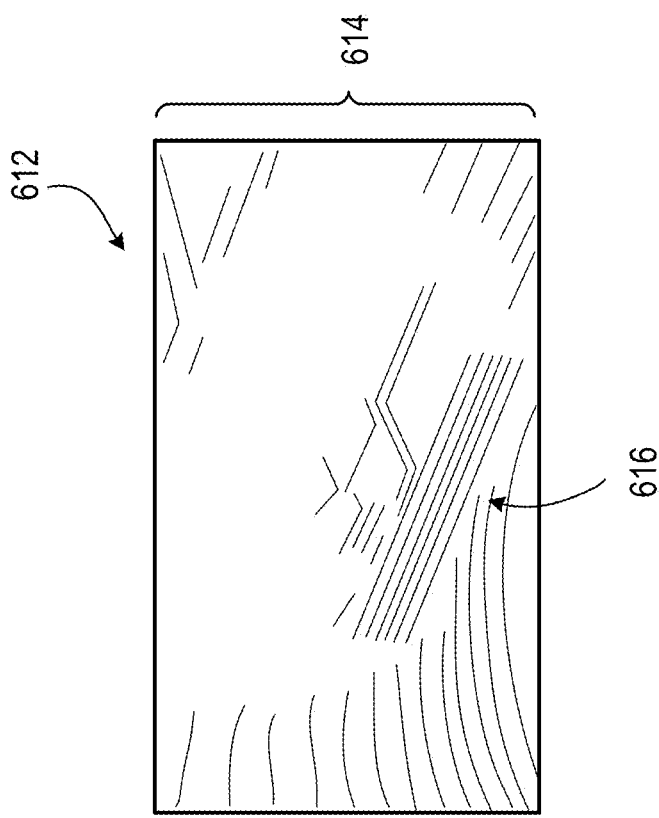
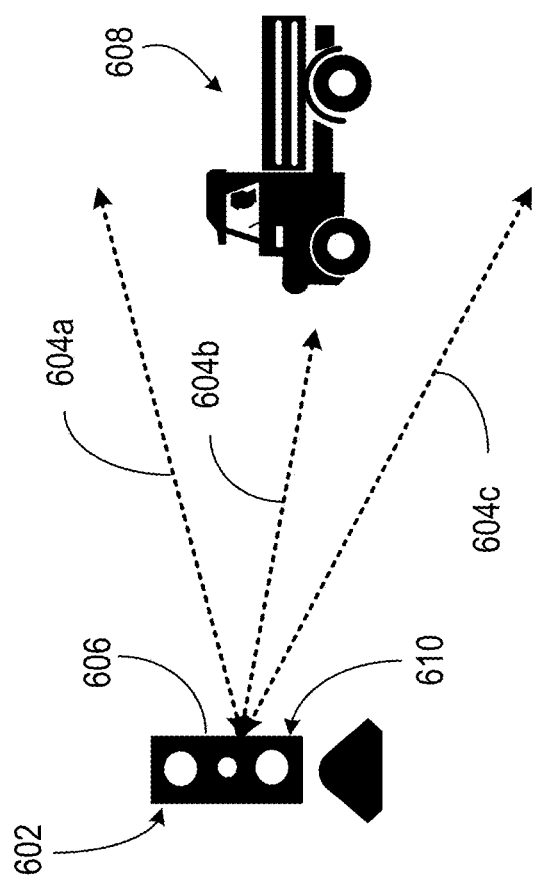
FIG. 6

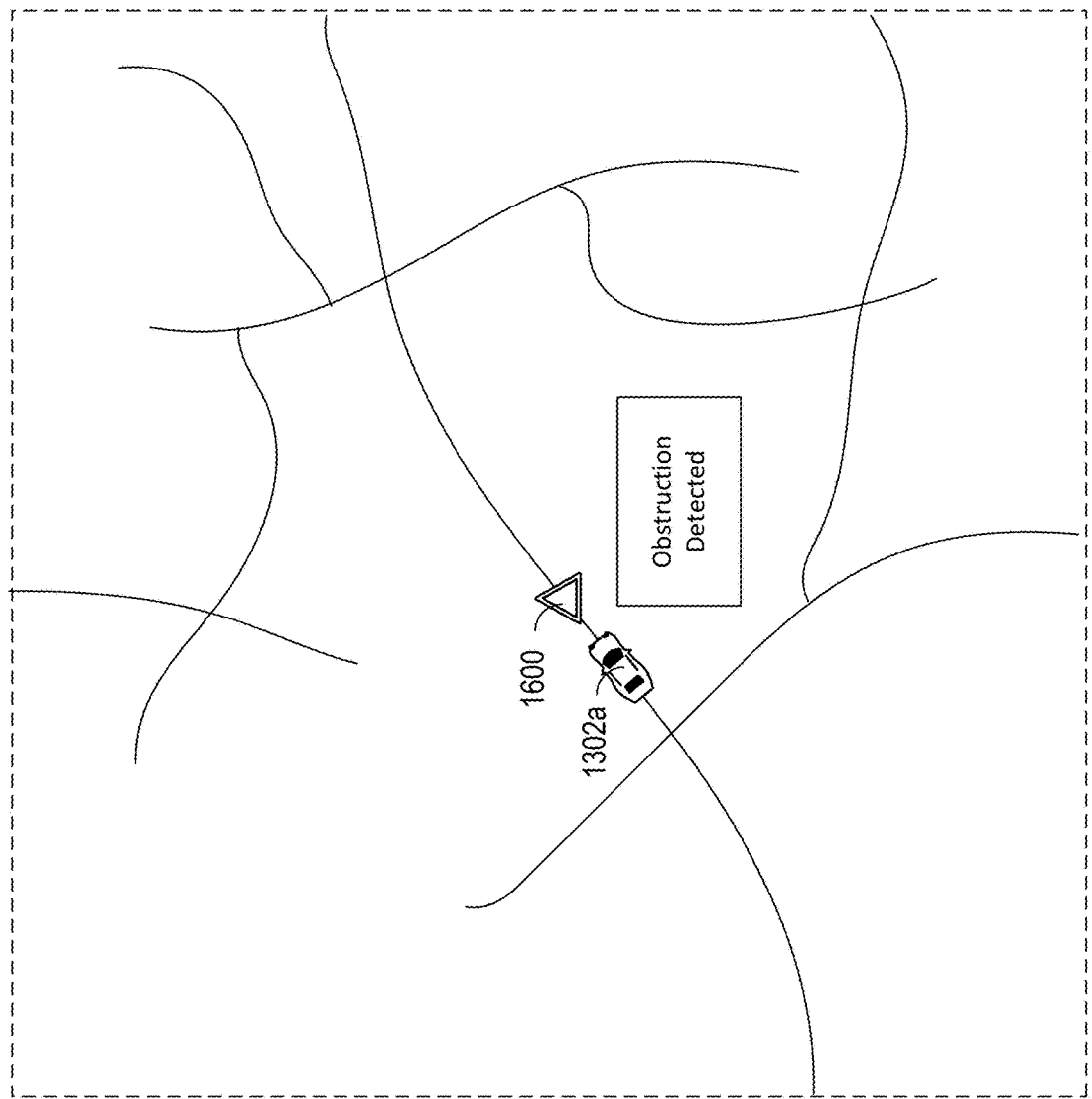
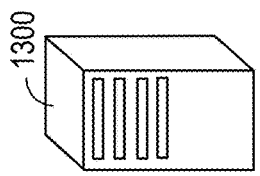
FIG. 16

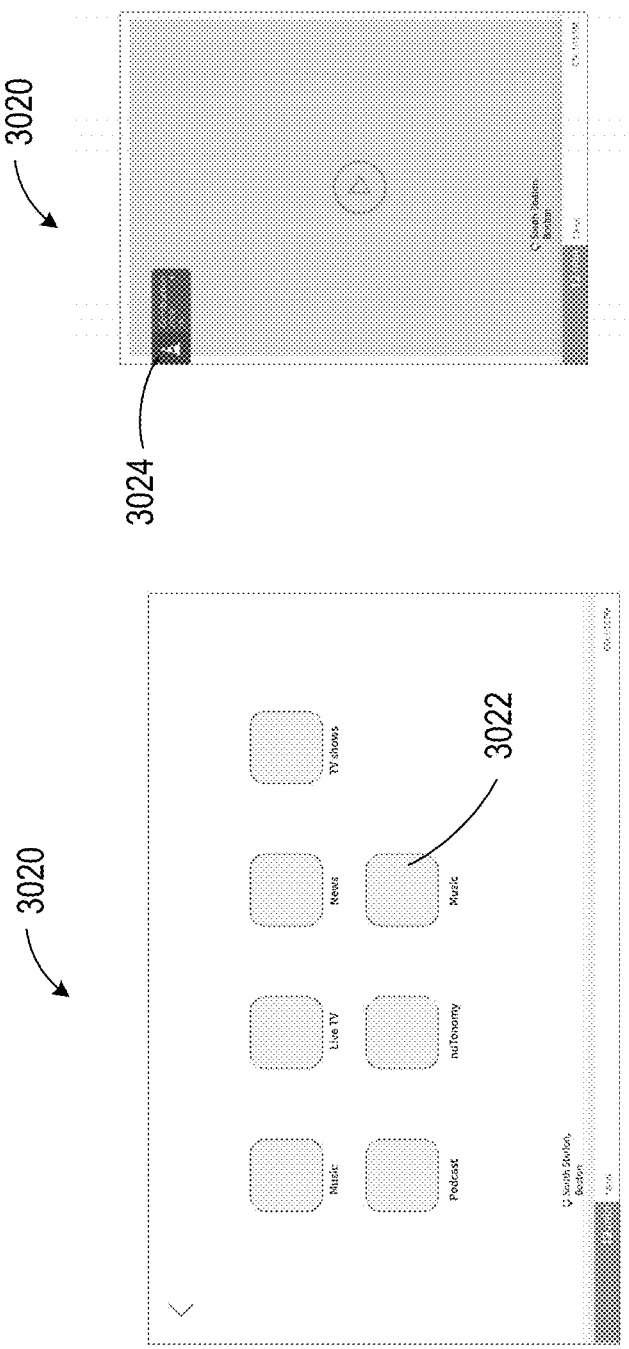

TELEOPERATION OF AUTONOMOUS VEHICLES

CROSS-REFERENCE TO RELATED APPLICATION

This application claims priority to U.S. Provisional Patent Application No. 62/714,015, filed Aug. 2, 2018, the entire contents of which are incorporated herein by reference.

FIELD OF THE INVENTION

This description relates to a computer system for remotely monitoring and controlling the operation of autonomous vehicles.

BACKGROUND

Autonomous vehicles can be used to transport people and/or cargo (e.g., packages, objects, or other items) from one location to another. As an example, an autonomous vehicle can navigate to the location of a person, wait for the person to board the autonomous vehicle, and traverse to a specified destination (e.g., a location selected by the person). As another example, an autonomous vehicle can navigate to the location of cargo, wait for the cargo to be loaded into the autonomous vehicle, and navigate to a specified destination (e.g., a delivery location for the cargo).

SUMMARY

A computer system can control the operation of one or more autonomous vehicles. For example, a computer system can deploy autonomous vehicles to one or more locations or regions, assign transportation tasks to each of the autonomous vehicles, provide navigation instructions to each of the autonomous vehicles, assign maintenance tasks to each of the autonomous vehicles, and/or assign other tasks to each of the autonomous vehicles. Further, a computer system can be used the monitor the operation of autonomous vehicles. For example, a computer system can collect information from each of the autonomous vehicles, process the collected information, and present the information to one or more users such that the users can keep informed regarding the operation of the autonomous vehicles. The computer system can include one or more devices on a communications network (e.g., a centralized network, peer-to-peer network, decentralized network, etc.). In some embodiments, the computer system is a centralized computer system.

In an aspect, a computer device receives first vehicle telemetry data from each vehicle of a plurality of vehicles. The vehicle telemetry data includes, for each vehicle of the plurality of vehicles, an indication of a geographical location of the vehicle. At least one vehicle of the plurality of vehicles is an autonomous vehicle. Further, a user interface is presented by a display device associated with the computer device. The user interface is generated based on the first vehicle telemetry data. The user interface includes a graphical map and one or more first display elements. Each first display element indicates at least a respective geographical location of a respective vehicle of the plurality of vehicles. The computer system receives a first user input selecting a particular vehicle of the plurality of vehicles. Responsive to receiving the first user input, the computer device retrieves second vehicle telemetry data from the selected vehicle, and presents, by the display device, a visual representation of at least a portion of the first vehicle telemetry data or a portion of the second vehicle telemetry data regarding the selected vehicle on the user interface.

Implementations of this aspect can include one or more of the following features.

In some embodiments, the first vehicle telemetry data includes, for each vehicle of the plurality of vehicles, geographical coordinates corresponding to the geographical location of the vehicle.

In some embodiments, the first vehicle telemetry data includes, for each vehicle of the plurality of vehicles, an indication of an altitude of the vehicle.

In some embodiments, the second vehicle telemetry data includes at least one of a video or an image captured by a sensor of the selected vehicle.

In some embodiments, the second vehicle telemetry data includes an indication of a velocity of the selected vehicle.

In some embodiments, the second vehicle telemetry data includes an indication of an orientation of the selected vehicle.

In some embodiments, the second vehicle telemetry data includes an indication of an operating condition of a computer system of the selected vehicle.

In some embodiments, the second vehicle telemetry data includes an indication of a condition of one or more batteries of the selected vehicle.

In some embodiments, the second vehicle telemetry data includes an indication of an energy consumption of the selected vehicle.

In some embodiments, the second vehicle telemetry data includes an indication of an operating condition of the selected vehicle.

In some embodiments, the second vehicle telemetry data includes information regarding an environment of the selected vehicle. In some embodiments, the information regarding the environment of the selected vehicle includes an indication of one or more objects in proximity to the selected vehicle. In some embodiments, the information regarding the environment of the selected vehicle includes an indication of a weather in the environment. In some embodiments, the information regarding the environment of the selected vehicle includes at least one of an indication of one or more parking spaces in the environment, or an indication of a landmark in the environment.

In some embodiments, the second vehicle telemetry data includes information regarding a route of the selected vehicle.

In some embodiments, at least one of the first vehicle telemetry data or the second vehicle telemetry data is textual data. In some embodiments, at least one of the first vehicle telemetry data or the second vehicle telemetry data includes one or more data items in a JavaScript Object Notation (JSON) format.

In some embodiments, the computer device further receives, from a first vehicle of the plurality of vehicles, an indication of an abnormal operation of the first vehicle. Responsive to receiving the indication of the abnormal operation of the first vehicle, an alert regarding the abnormal operation of the first vehicle is presented on the user interface by the display device. In some embodiments, the indication of the abnormal operation of the first vehicle is at least one of an indication of an interruption of a network connection between the first vehicle and the computer device or an indication that a path of the first vehicle is obstructed.

In some embodiments, the user interface includes a second display element indicating at one of the more vehicles of the plurality of vehicles in a list.

In some embodiments, the visual representation of at least the portion of the first vehicle telemetry data or the portion of the second vehicle telemetry data regarding the selected vehicle includes presenting a video captured by a sensor of the selected vehicle and one or more graphical elements overlaid on the video. The one or more graphical elements indicate one or more detected objects in the video.

In some embodiments, the user interface includes, for at least one autonomous vehicle of the plurality of vehicles, an indication of an assigned task of the autonomous vehicle (e.g., traveling to a customer/package, transporting a customer/package, charging, idling, repositioning, etc.).

In some embodiments, the computer device further receives a second user input includes one or more search conditions with respect to the plurality of vehicles. The computer device determines one or more vehicles of the plurality of vehicles meeting the one or more search conditions. A visual representation of the one or more vehicles meeting the one or more search conditions is presented on the user interface by the display device. In some embodiments, the one or more search conditions include an indication of a service facility associated with one or more autonomous vehicles. Determining the one or more vehicles meeting the one or more search conditions includes identifying one or more vehicles in proximity to the service facility.

In another aspect, a user interface is presented on a display device of an autonomous vehicle. The user interface includes a visual representation of an environment surrounding the autonomous vehicle, a first display element indicating a physical location of the autonomous vehicle with respect to the environment, and one or more second display elements. Each second display element indicates a respective operational property of the autonomous vehicle. A user input specifying an operation to be performed by the autonomous vehicle is received through the user interface. Responsive to receiving the user input, the specified operation is performed using the autonomous vehicle.

Implementations of this aspect can include one or more of the following features.

In some embodiments, at least one second display element indicates a route of the autonomous vehicle.

In some embodiments, at least one second display element indicates an occurrence of an event with respect to the autonomous vehicle. In some embodiments, the event is traffic congestion in an environment of the autonomous vehicle. In some embodiments, the event is road construction in the environment of the autonomous vehicle. In some embodiments, the event is a decrease in speed of a traffic pattern along a path of the autonomous vehicle.

In some embodiments, at least one second display element includes a video captured by a sensor of the autonomous vehicle. In some implementations, the least one second display element includes one or more graphical elements overlaid on the video, the one or more graphical elements indicating one or more detected objects in the video.

In some embodiments, at least one second display element indicates an object detected by the autonomous vehicle.

In some embodiments, at least one second display element indicates a classification of the object detected by the autonomous vehicle. In some embodiments, the classification is at least one of a vehicle, a pedestrian, or stationary object. In some implementations, at least one second display element indicates a confidence metric associated with the classification of the object detected by the autonomous vehicle.

In some embodiments, the autonomous vehicle further determines an occurrence of a trigger event with respect to the autonomous vehicle, obtains a video captured by a sensor of the autonomous vehicle, determines a portion of the video corresponding to the trigger event, and presents, on the display device, the portion of the video on the user interface. In some embodiments, the trigger event is at least one of: a detection of an object coming into proximity of the autonomous vehicle, a detection of an object along a path of the autonomous vehicle, an initiation of an emergency braking of the autonomous vehicle, or an initiation of an evasive maneuver of the autonomous vehicle.

In some embodiments, the autonomous vehicle detects a plurality of objects in proximity to the autonomous vehicle. The one more second display elements indicate a subset of the plurality of objects.

In some embodiments, performing the specified operation using the autonomous vehicle includes displaying additional information regarding the autonomous vehicle.

In some embodiments, performing the specified operation using the autonomous vehicle includes modifying a path of the autonomous vehicle.

In some embodiments, performing the specified operation using the autonomous vehicle includes modifying a destination of the autonomous vehicle.

In another aspect, a computer system receives, from an autonomous vehicle remote from the computer system, a request for the computer system to remotely control the operation of the autonomous vehicle. The request includes information regarding one or more objects in proximity to the autonomous vehicle. A user interface generated based on the received request is presented on a display device of the computer system. The user interface includes a visual representation of an environment surrounding the autonomous vehicle, a first display element indicating a physical location of the autonomous vehicle with respect to the environment, and a second display element indicating the one or more objects in proximity to the autonomous vehicle. The computer system receives a user input specifying a path for the autonomous vehicle to traverse the one or more objects in the environment. Responsive to receiving the user input, a command signal is transmitted from the computer system to the autonomous vehicle. The command signal includes instructions to the autonomous vehicle to navigate the specified path.

Implementations of this aspect can include one or more of the following features.

In some embodiments, the information regarding the one or more objects includes at least one of a video or an image captured by a sensor of the autonomous vehicle.

In some embodiments, the information regarding the one or more objects includes, for each object, an indication of a classification of the object and an indication of a location of the object relative to the autonomous vehicle.

In some embodiments, the indication of a location of the object relative to the autonomous vehicle includes textual data indicating the location of the object relative to the autonomous vehicle. In some embodiments, the textual data describing the location of the object relative to the autonomous vehicle includes one or more data items in a JavaScript Object Notation (JSON) format.

In some embodiments, the second display element includes a graphical representation of a plurality of regions surrounding the autonomous vehicle, and for at least one of the regions, a graphical indication that at least one of the one or more objects is positioned in that region. In some embodiments, presenting the user interface includes generating the second display element based on textual data indicating, for each object, a location of the object with respect to a plurality of two-dimension boxes of a graphical grid. In some embodiments, the textual data indicating the location of the object with respect to the plurality of boxes of the graphical grid comprises one or more data items in a JavaScript Object Notation (JSON) format.

In some embodiments, receiving the user input specifying the path for the autonomous vehicle to traverse the one or more objects in the environment includes detecting, using an input device, a physical gesture performed by a user with respect to the second display element. In some embodiments, the display device is a touch-sensitive display device, and the physical gesture is detected using the touch-sensitive display device.

In some embodiments, the specified path is modified based on one or more reference paths. In some embodiments, the one or more reference paths correspond to a traffic pattern of a road in the environment surrounding the autonomous vehicle. In some embodiments, modifying the specified path includes aligning the specified path with the one or more reference paths.

In another aspect, an autonomous vehicle receives sensor data from one or more sensors of the autonomous vehicle. The autonomous vehicle generates a request for remote control of the autonomous vehicle by a computer system remote from the autonomous vehicle. Generating the request includes determining, by the autonomous vehicle, a quality metric associated with a network connection between the autonomous vehicle and the computer system, and upon determining that the quality metric is greater than a threshold quality level, including a first data item representing the sensor data in the request, the first data item meeting one or more conditions associated with the threshold quality level. The request for remote control is transmitted from the autonomous vehicle to the computer system, Implementations of this aspect can include one or more of the following features.

In some embodiments, the sensor data includes at least one of a video, an image, or proximity data captured by the one or more sensors.

In some embodiments, the quality metric corresponds to an available bandwidth of the network connection.

In some embodiments, the quality metric corresponds to a latency associated with network connection.

In some embodiments, the quality metric corresponds to a reliability of the network connection.

In some embodiments, determining the quality metric associated with the network connection includes transmitting a beacon signal using the network connection, and determining the quality metric based on the transmission of the beacon signal.

In some embodiments, determining the quality metric based on the transmission of the beacon signal includes determining an available bandwidth of the network connection based on the transmission of the beacon signal.

In some embodiments, the one or more conditions associated with the threshold quality level includes at least one of a data size or a complexity of the sensor data.

In some embodiments, the autonomous vehicle determines a second quality metric associated with the network connection between the autonomous vehicle and the computer system. Upon determining that the second quality metric is less than the threshold quality level, a second data item representing the sensor data is included in the request, the second data item meeting one or more conditions associated with the threshold quality level. The second data item has a smaller data size or a lower complexity than the first data item. In some embodiments, the first data item includes a video having a higher resolution than that of a video included in the second data item. In some embodiments, the first data item includes a video having a higher frame rate than that of a video included in the second data item. In some embodiments, the first data item includes an image having a higher resolution than that of an image included in the second data item. In some embodiments, the first data item includes a greater number of images than that included in the second data item. In some embodiments, the first data item includes a portion of sensor data having a higher spatial resolution than that of a portion of sensor data included in the second data item. In some embodiments, the first data item includes a portion of sensor data having a high temporal resolution than that of a portion of sensor data included in the second data item. In some embodiments, the first data item includes at least one video or image of an environment of the autonomous vehicle. In some embodiments, the second data item includes textual data describing the environment of the autonomous vehicle instead of the at least one video or image. In some embodiments, the textual data includes one or more data items in a JavaScript Object Notation (JSON), Hypertext Markup Language (HTML), or Extensible Markup Language (XML) format.

In some embodiments, the autonomous vehicle determines a condition impeding a travel of the autonomous vehicle. The request for remote control is generated responsive to determining the condition impeding the travel of the autonomous vehicle. In some embodiments, the condition impeding the travel of the autonomous vehicle corresponds to an object blocking a path of the autonomous vehicle. In some embodiments, the condition impeding the travel of the autonomous vehicle corresponds to a closure of a roadway along a path of the autonomous vehicle.

In some embodiments, the autonomous vehicle receives a command signal including instructions to the autonomous vehicle to navigate a specified path, and executes the command signals to navigate the specified path.

These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIG. 6 shows an example of a LiDAR system.

FIGS. 16-19 show an example exchange information between an autonomous vehicle and a computer system in dynamic manner based on the conditions of the network connection between them.

FIGS. 30-36 show example graphical user interfaces for monitoring and controlling the operation of an autonomous vehicle.

DETAILED DESCRIPTION

Figure 1:
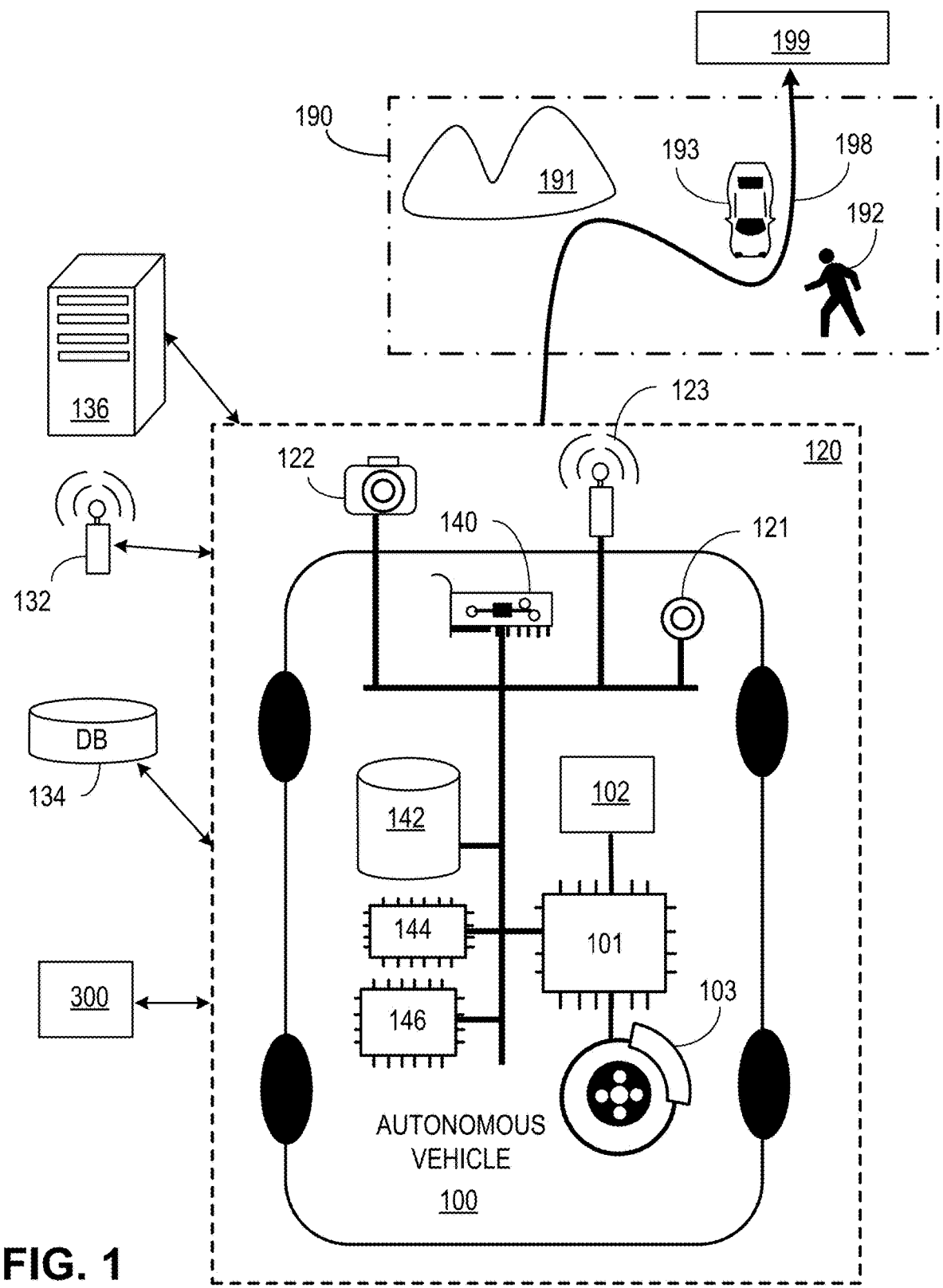
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Autonomous Vehicle Planning
6. Autonomous Vehicle Control
7. Remotely Monitoring and Controlling the Operation of Autonomous Vehicles
8. Example Processes for Monitoring and Controlling the Operation of a Fleet of Autonomous Vehicles General Overview A computer system can control the operation of one or more autonomous vehicles (e.g., a fleet of autonomous vehicles). For example, a computer system can deploy autonomous vehicles to one or more locations or regions, assign transportation tasks to each of the autonomous vehicles (e.g., pick up and transport passengers, pick up and transport cargo, etc.), provide navigation instructions to each of the autonomous vehicles (e.g., provide a route or path between two locations, provide instructions to traverse objects in proximity to the autonomous vehicle, etc.), assign maintenance tasks to each of the autonomous vehicles (e.g., charge their batteries at charging stations, receive repairs at a service station, etc.), and/or assign other tasks to each of the autonomous vehicles.

Further, a computer system can be used the monitor the operation of autonomous vehicles. For example, a computer system can collect information from each of the autonomous vehicles (e.g., vehicle telemetry data, such as data regarding a vehicle's speed, heading, status, or other aspects of a vehicle's operation), process the collected information, and present the information to one or more users (e.g., in the form of an interactive graphical user interface) such that the users can keep informed regarding the operation of the autonomous vehicles.

In some embodiments, a computer system includes one or more devices on a communications network (e.g., a centralized network, peer-to-peer network, decentralized network, etc.). Further, the computer system and an autonomous vehicle exchange information in dynamic manner based on the conditions of the network connection between them. For example, if the quality of the network connection between the computer system and an autonomous vehicle is higher (e.g., higher available bandwidth, lower latency, and/or higher reliability), the computer system can retrieve higher quality data from the autonomous vehicle (e.g., more detailed data, data that is larger in size, and/or data that is more complex). As another example, if the quality of the network connection between the computer system and an autonomous vehicle is lower (e.g., lower bandwidth, higher latency, and/or lower reliability), the computer system can retrieve lower quality data from the autonomous vehicle (e.g., less detailed data, data that is smaller in size, and/or data that is less complex).

The subject matter described herein can provide several technical benefits. For instance, some implementation can improve the efficiency and effectiveness of a fleet of autonomous vehicles as a whole, as well as autonomous vehicles individually. As an example, by dynamically adjusting the transmission of data between a computer system and an autonomous vehicle based on the quality of a network connection between them, the computer system and the autonomous vehicle are more likely to exchange relevant information in a timely and reliable manner, even despite variations in performance of a communications network. For instance, when an autonomous vehicle is in an area with good network connectivity, the autonomous vehicle can transmit detailed information regarding its operation to the computer system. This enables the computer system to control and/or monitor the operation of the autonomous vehicle in a more accurate and/or comprehensive manner. However, when the autonomous vehicle is in an area with poor network connectivity, the autonomous vehicle can transmit less detailed information regarding its operation to the computer system, such that the computer system continues to receive certain information (e.g., information that is relatively more important for safely controlling and/or monitoring the operation of the autonomous vehicle), without overwhelming the capabilities of the network connectivity. Thus, the computer system and autonomous vehicle can communicate with each other more effectively and reliably. This enables the autonomous vehicles to operate more efficiently (e.g., by enabling the computer system to generate timely instructions based on information retrieved from an autonomous vehicle, even over a congested network). This also enables the autonomous vehicles to operate more safely (e.g., by enabling the computer system to quickly react to dangerous conditions detected by an autonomous vehicle, such as an obstruction or imminent collision, even over a congested network).

Hardware Overview

FIG. 1 shows an example of an autonomous vehicle 100 having autonomous capability.

As used herein, the term "autonomous capability" refers to a function, feature, or facility that enables a vehicle to be operated without real-time human intervention unless specifically requested by the vehicle.

As used herein, an autonomous vehicle (AV) is a vehicle that possesses autonomous capability.

As used herein, "vehicle" includes means of transposition of goods or people. For example, cars, buses, trains, airplanes, drones, trucks, boats, ships, submersibles, dirigibles, etc. A driverless car is an example of an AV.

As used herein, "trajectory" refers to a path or route generated by an AV to navigate from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor" includes one or more physical components that detect information about the environment surrounding the physical components. Some of the physical components can include electronic components such as analog-to-digital converters, a buffer (such as a RAM and/or a nonvolatile storage) as well as data processing components such as an ASIC (application-specific integrated circuit), a microprocessor and/or a microcontroller.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies descried in this document also are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 autonomously or semi-autonomously along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, radar, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
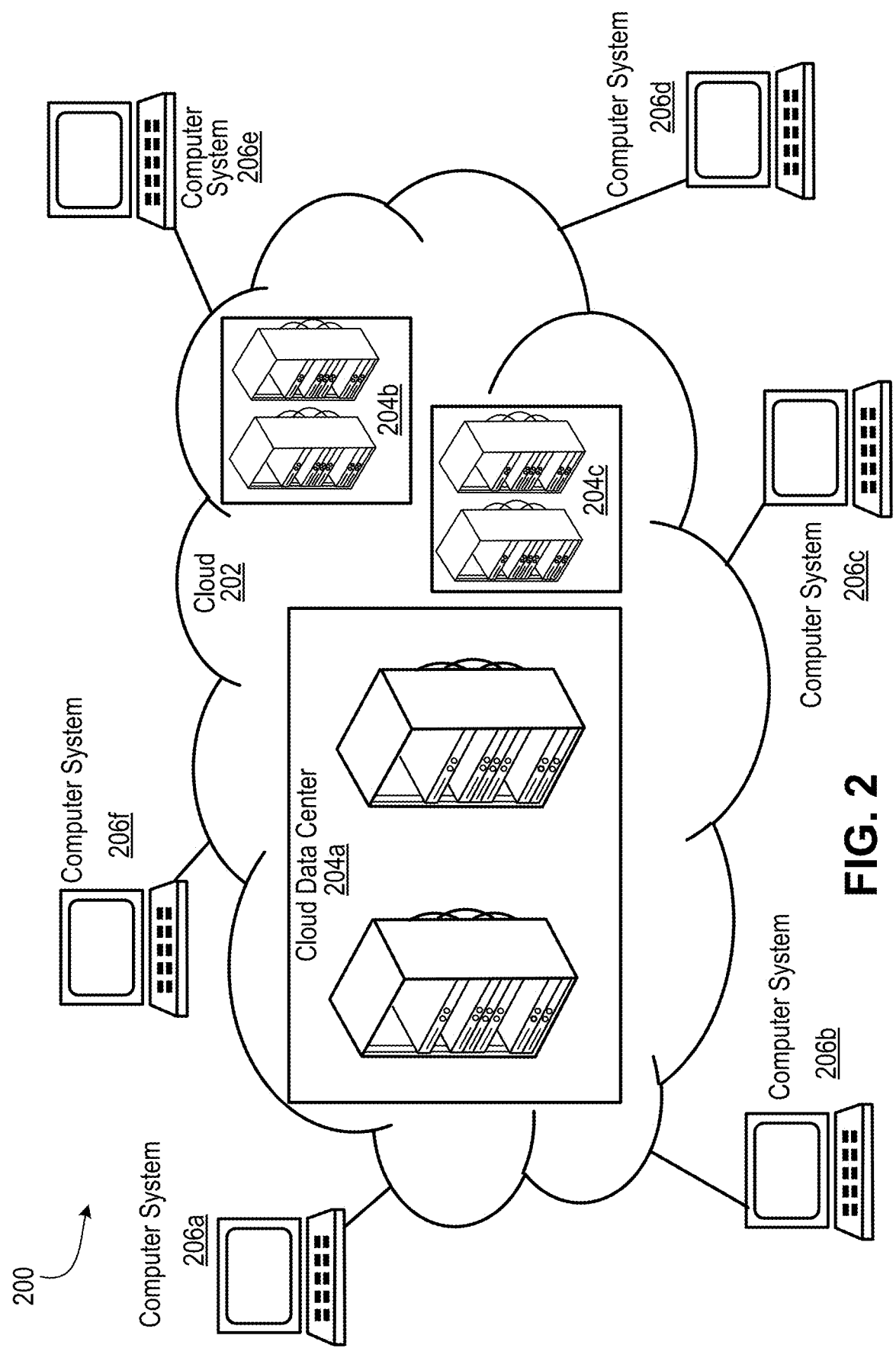
FIG. 2 illustrates an exemplary "cloud" computing environment.

FIG. 2 illustrates an exemplary "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, IoT devices, autonomous vehicles (including, cars, drones, shuttles, trains, buses, etc.) and consumer electronics. In an embodiment, the computing systems 206a-f are implemented in or as a part of other systems.

Figure 3:
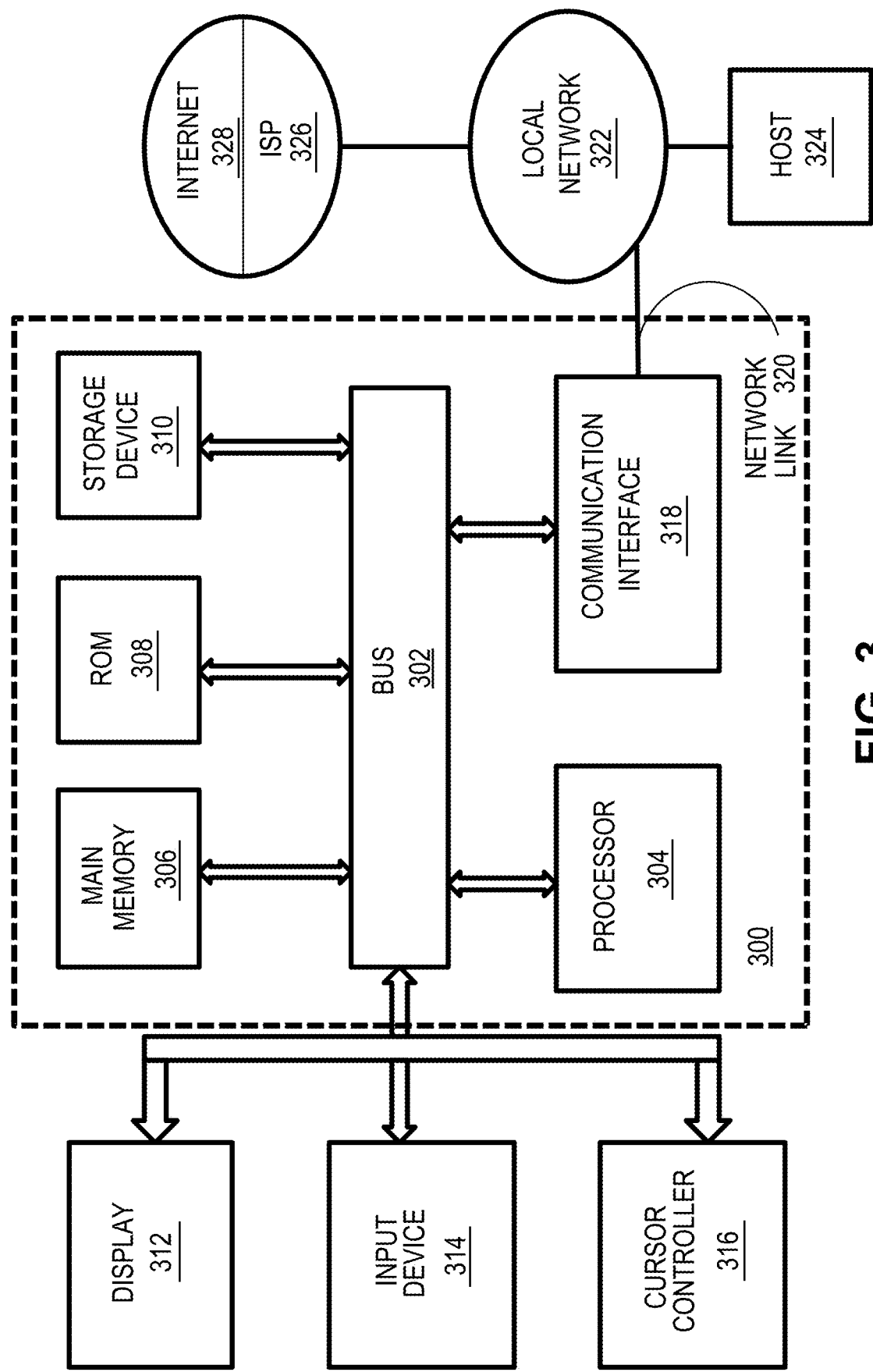
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
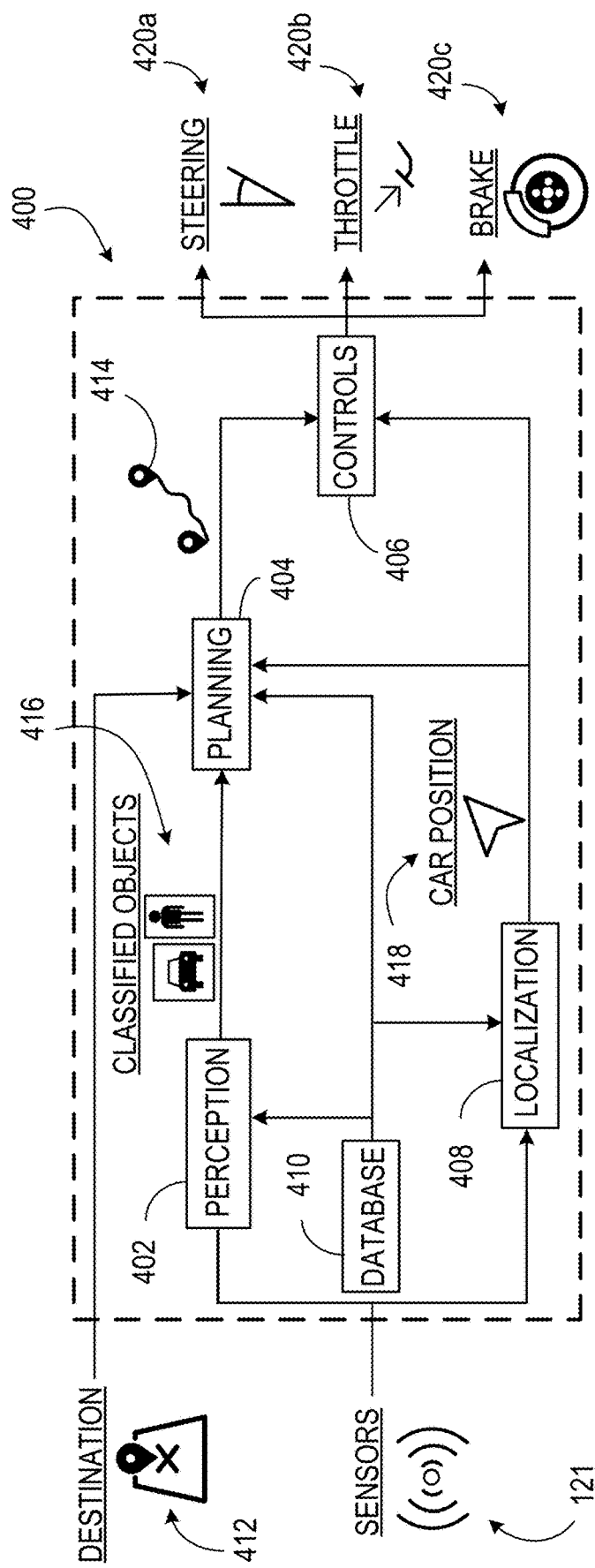
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software and computer hardware.

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and data representing the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
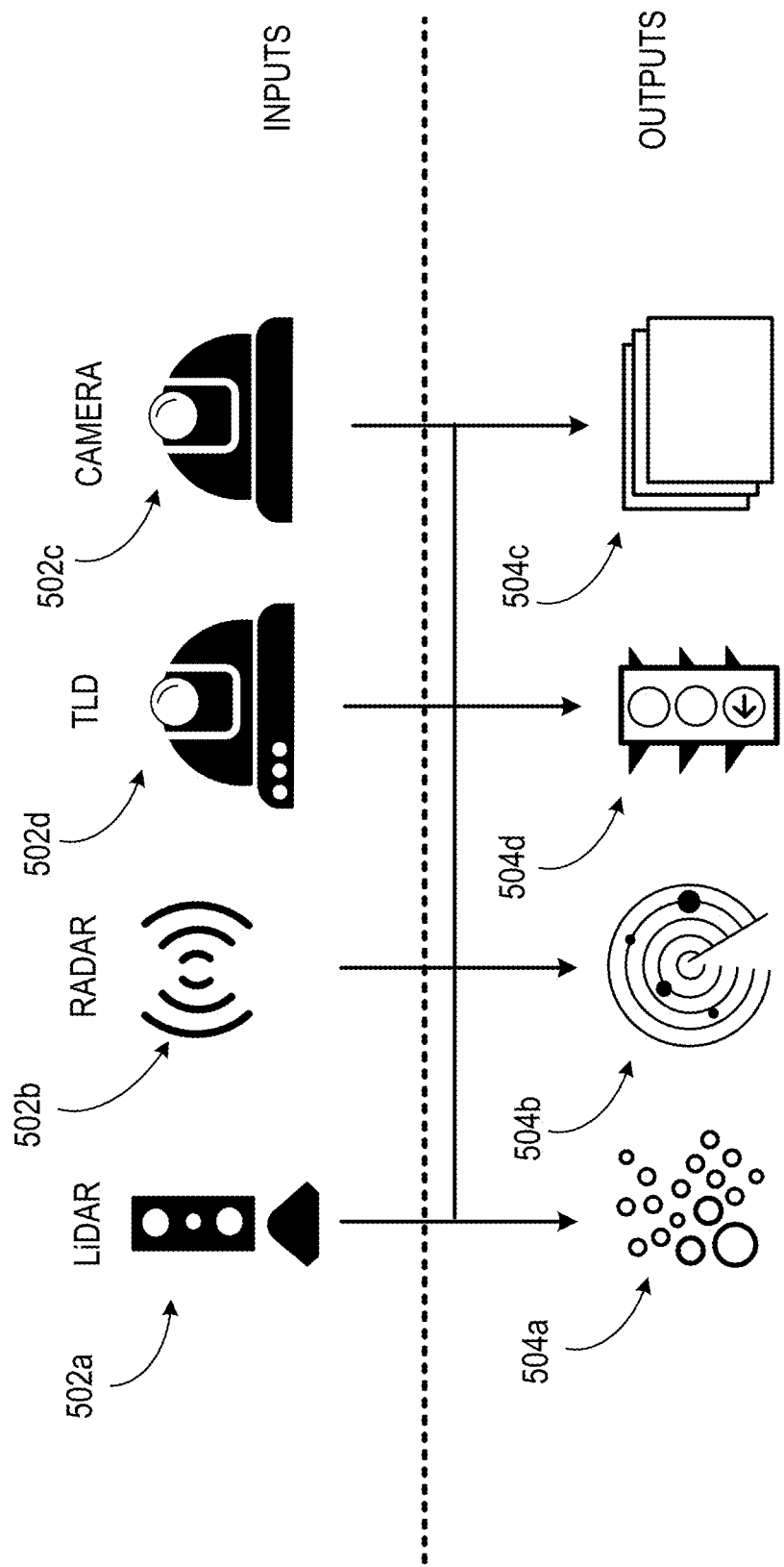
FIG. 5 shows an example of inputs and outputs that may be used by a perception module.

FIG. 5 shows an example of inputs 502*a-d* (e.g., sensors 121 shown in FIG. 1) and outputs 504*a-d* (e.g., sensor data) that is used by the perception module 402 (FIG. 4). One input 502*a* is a LiDAR (Light Detection And Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504*a*. For example, LiDAR data is collections of 3D or 2D points (also known as a point clouds) that are used to construct a representation of the environment 190.

Another input 502*b* is a radar system. Radar is a technology that uses radio waves to obtain data about nearby physical objects. Radars can obtain data about objects not within the line of sight of a LiDAR system. A radar system 502*b* produces radar data as output 504*b*. For example, radar data are one or more radio frequency electromagnetic signals that are used to construct a representation of the environment 190.

Another input 502*c* is a camera system. A camera system uses one or more cameras (e.g., digital cameras using a light sensor such as a charge-coupled device [CCD]) to obtain information about nearby physical objects. A camera system produces camera data as output 504*c*. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502*d* is a traffic light detection (TLD) system. A TLD system uses one or more cameras to obtain information about traffic lights, street signs, and other physical objects that provide visual navigation information. A TLD system produces TLD data as output 504*d*. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504*a-d* are combined using a sensor fusion technique. Thus, either the individual outputs 504*a-d* are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

FIG. 6 shows an example of a LiDAR system 602 (e.g., the input 502*a* shown in FIG. 5). The LiDAR system 602 emits light 604*a-c* from a light emitter 606 (e.g., a laser transmitter). Light emitted by a LiDAR system is typically not in the visible spectrum; for example, infrared light is often used. Some of the light 604*b* emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
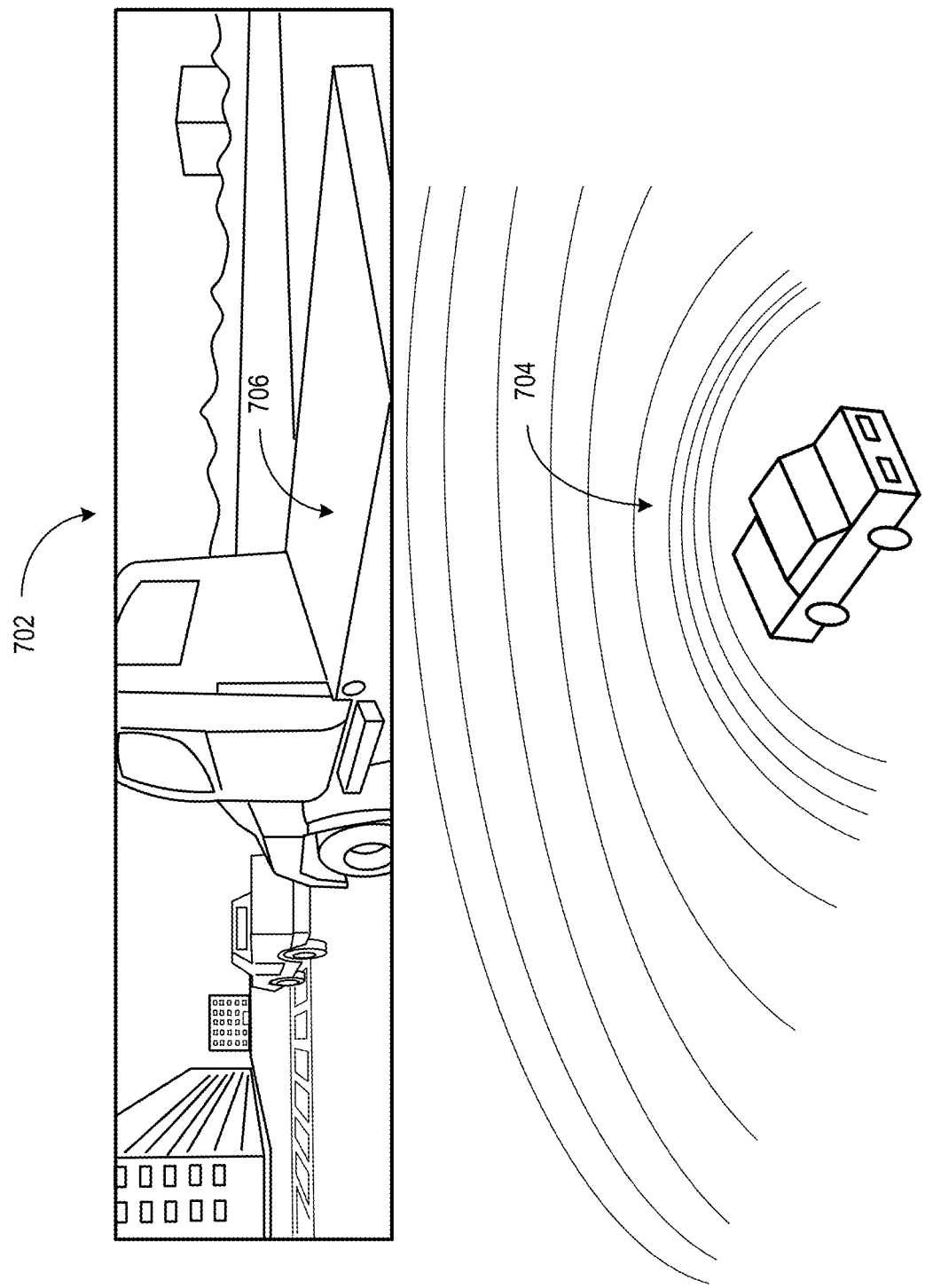
FIG. 7 shows the LiDAR system in operation.

FIG. 7 shows the LiDAR system 602 in operation. In the scenario shown in this figure, the AV 100 receives both camera system output 504*c* in the form of an image 702 and LiDAR system output 504*a* in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
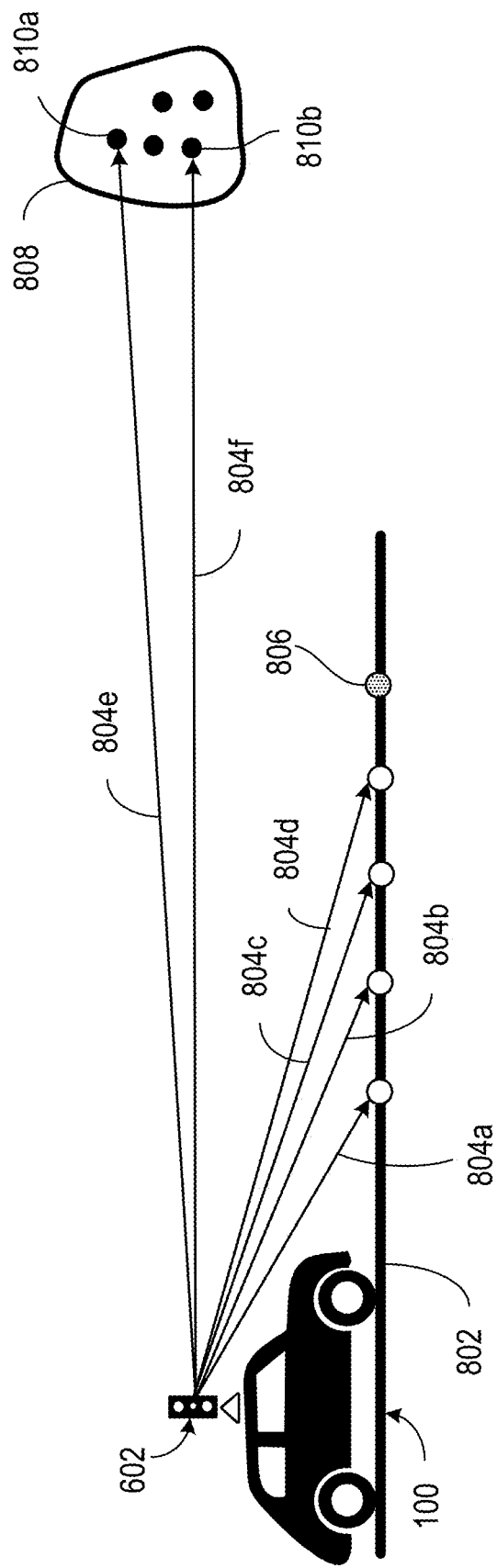
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804*a-d* emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804*e-f* emitted by the LiDAR system 602 will be reflected from points 810*a-b* in a manner inconsistent with the expected consistent manner. From this information, the AV 100 can determine that the object 808 is present.

Autonomous Vehicle Planning

Figure 9:
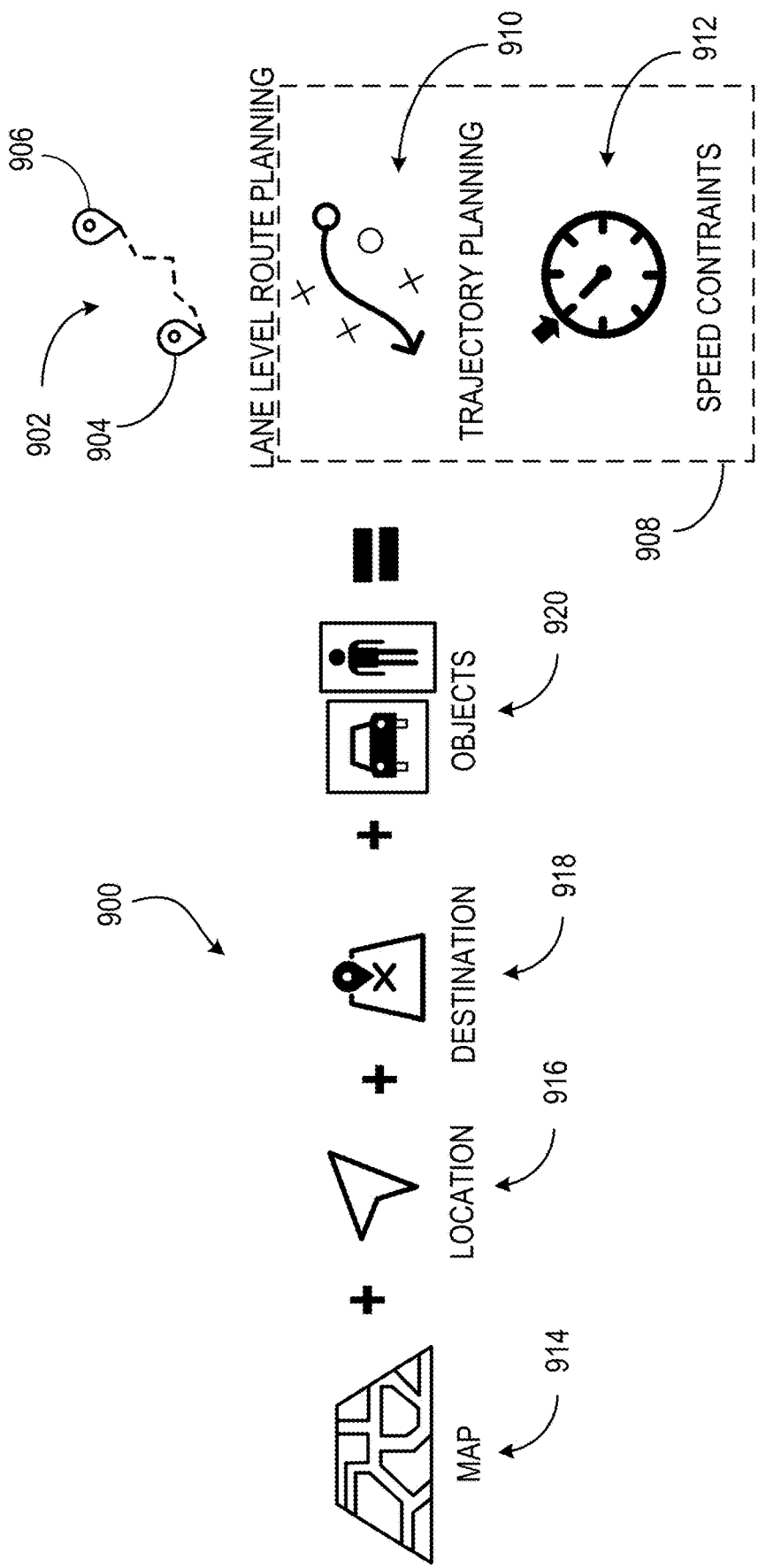
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
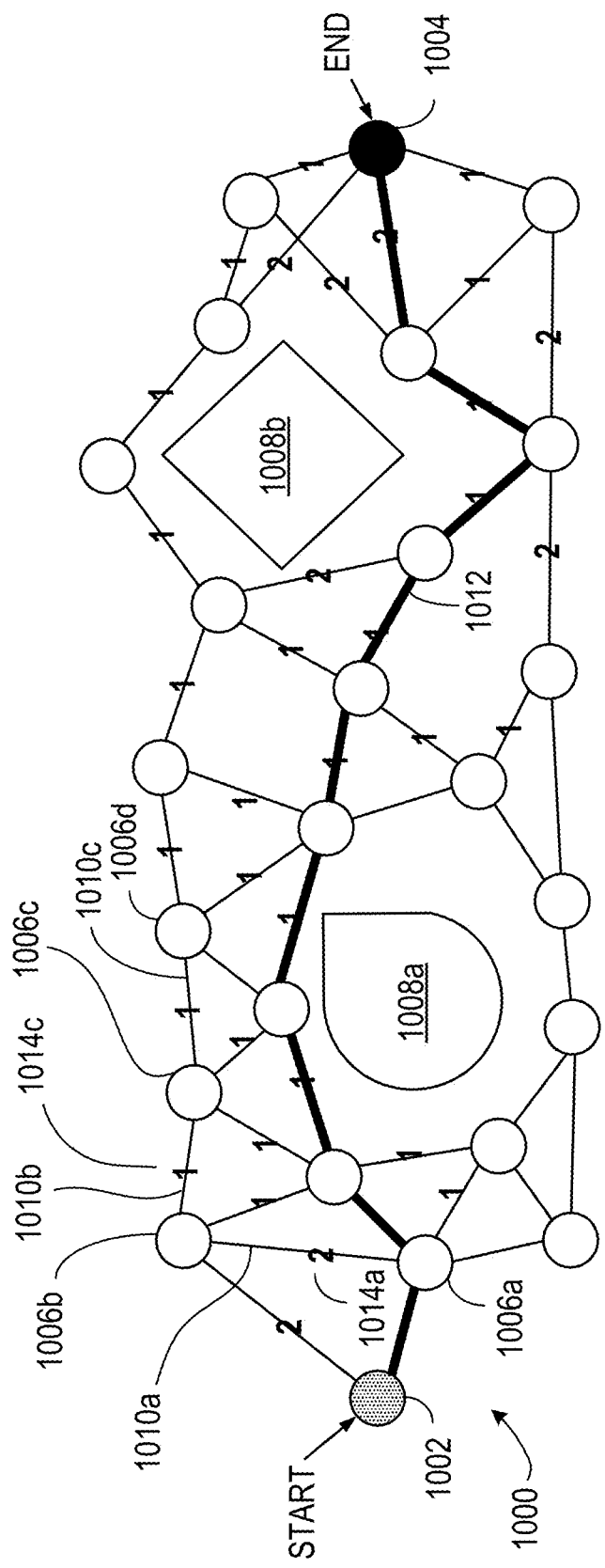
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
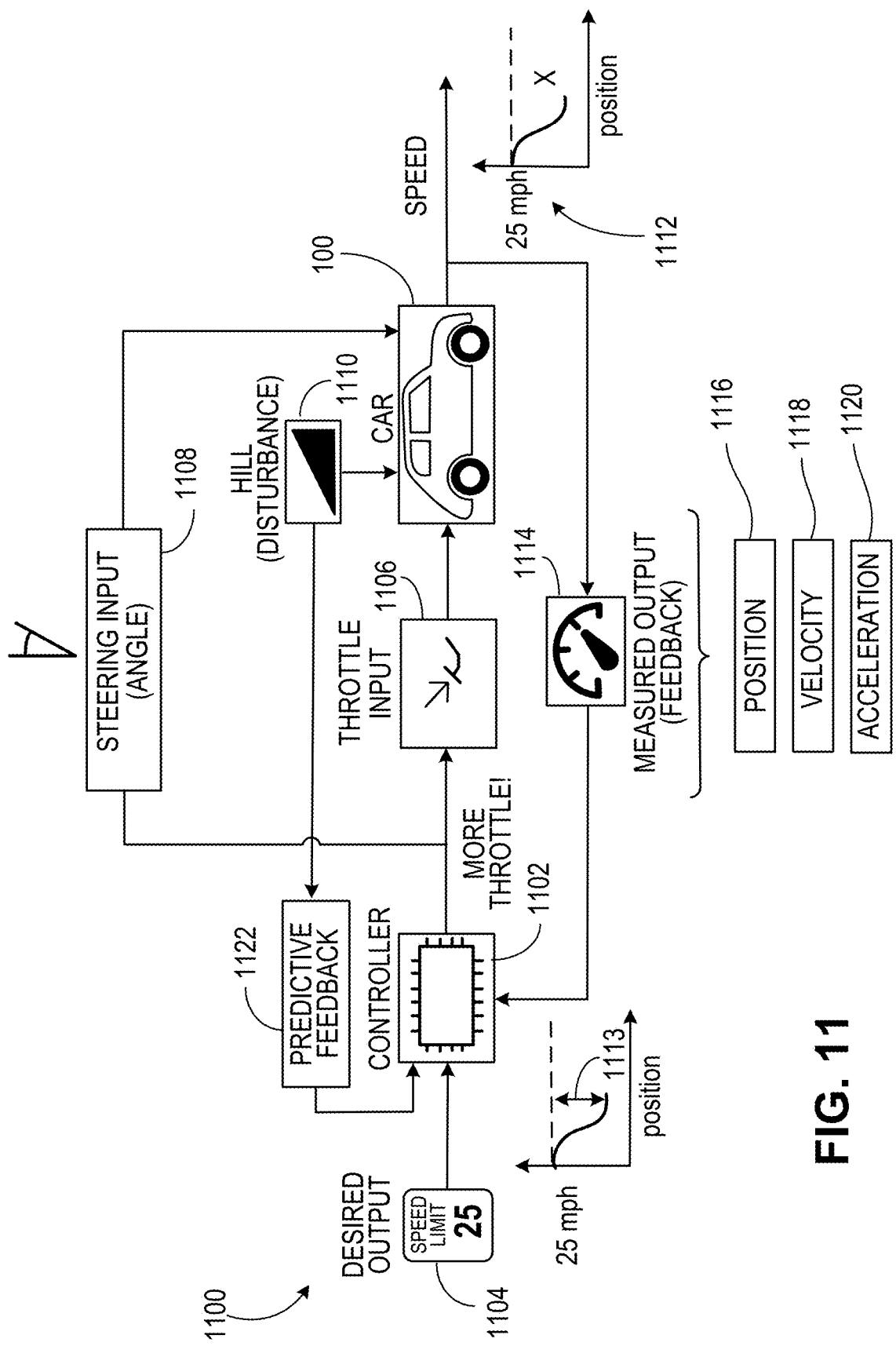
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
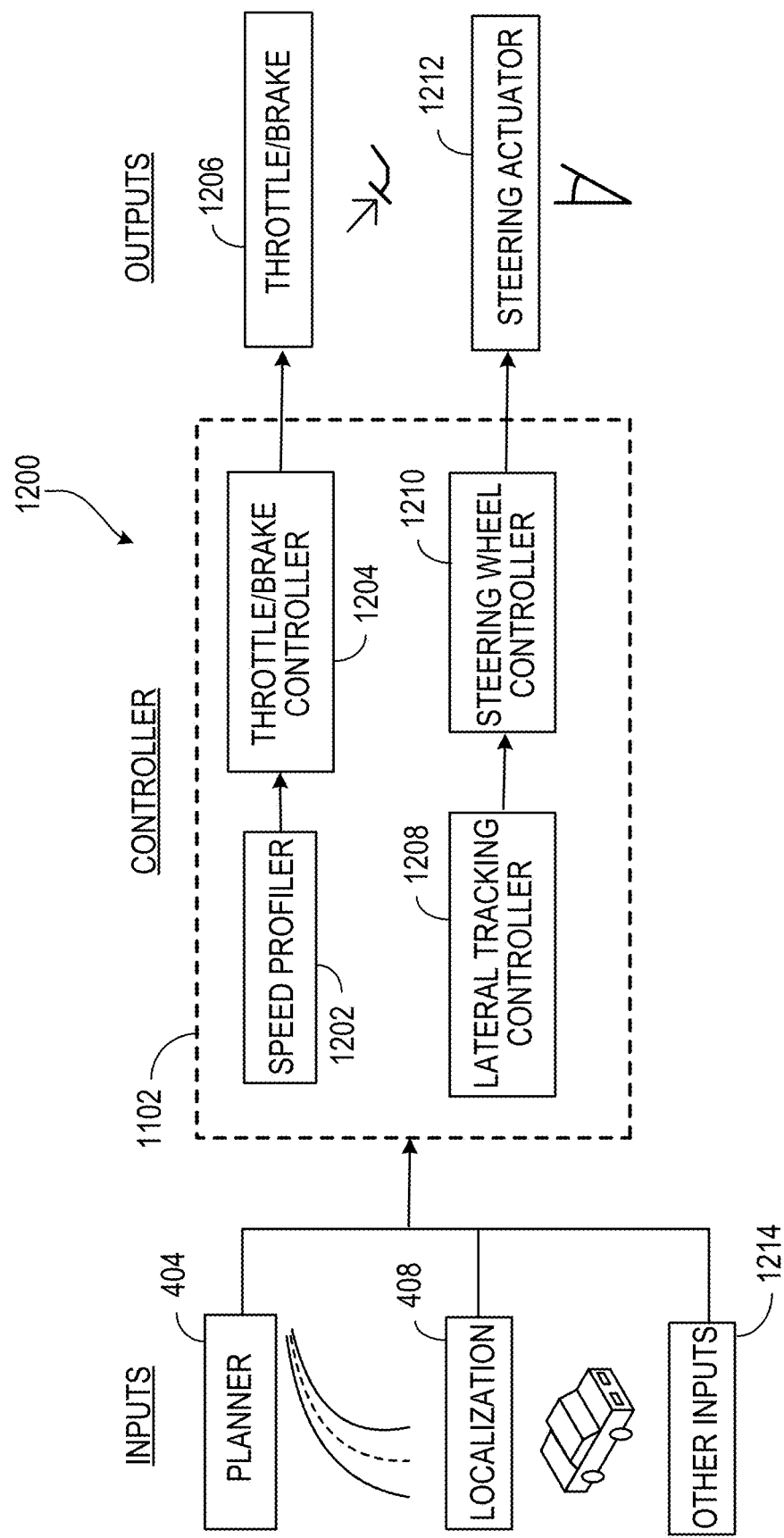
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1204 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Remotely Monitoring and Controlling the Operation of Autonomous Vehicles

In some embodiments, a computer system controls the operation of one or more autonomous vehicles (e.g., a fleet of autonomous vehicles). For example, a computer system can deploy autonomous vehicles to one or more locations or regions, assign transportation tasks to each of the autonomous vehicles (e.g., pick up and transport passengers, pick up and transport cargo, etc.), provide navigation instructions to each of the autonomous vehicles (e.g., provide a route or path between two locations, provide instructions to traverse objects in proximity to the autonomous vehicle, etc.), assign maintenance tasks to each of the autonomous vehicles (e.g., charge their batteries at charging stations, receive repairs at a service station, etc.), and/or assign other tasks to each of the autonomous vehicles.

Further, a computer system can be used the monitor the operation of autonomous vehicles. For example, a computer system can collect information from each of the autonomous vehicles (e.g., vehicle telemetry data, such as data regarding a vehicle's speed, heading, status, or other aspects of a vehicle's operation), process the collected information, and present the information to one or more users (e.g., in the form of an interactive graphical user interface) such that the users can keep informed regarding the operation of the autonomous vehicles.

Figure 13:
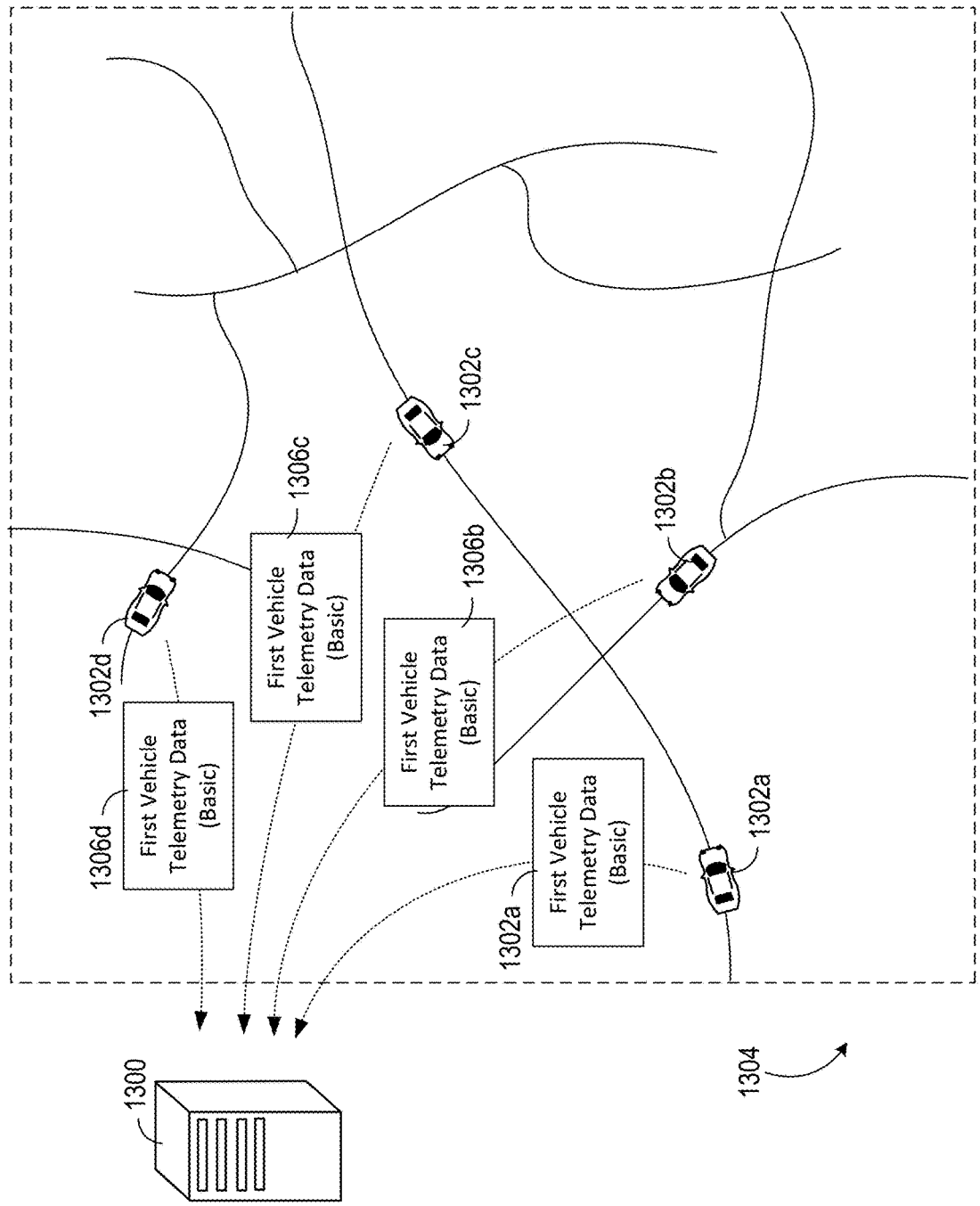
FIGS. 13-15 show an example usage of a computer system to control and monitor the operation of a fleet of autonomous vehicles.

FIG. 13 shows an example computer system 1300 for monitoring and controlling the operation of a fleet of autonomous vehicles 1302*a-d*. In this example, the computer system 1300 is remote from each of the autonomous vehicles 1302*a-d*, and communicates with the autonomous vehicles 1302*a-d* (e.g., via a wireless communications network). In some embodiments, the computer system 1300 is implemented in a similar manner as the remote servers 136 described with respect to FIG. 1 and/or the cloud computing environment 300 described with respect to FIGS. 1 and 3. In some embodiments, one or more of the autonomous vehicles 1302*a-d* are implemented in a similar manner as the autonomous vehicle 100 described with respect to FIG. 1A.

Each of the autonomous vehicles 1302*a-d* is positioned in a geographical region 1304. The geographical region 1304 can correspond to a particular political region (e.g., a particular country, state, county, province, city, town, borough, or other political region), a particular pre-defined region (e.g., a region having particular pre-defined boundaries such as a software determined geo-fenced area), a transiently-defined region (e.g., a region having dynamic boundaries such as a group of streets affected by dense traffic), or any other region.

Each of the autonomous vehicles 1302*a-d* can transmit information regarding its operation to the computer system 1300. This information can include vehicle telemetry data (e.g., data including one or more measurements, readings, and/or samples obtained by one or more sensors of the autonomous vehicle).

Vehicle telemetry data can include a variety of information. As an example, vehicle telemetry data can include data obtained using one or more imaging sensors (e.g., photodetectors, camera modules, etc.). For instance, this can include one or more videos or images captured by imaging sensors of the autonomous vehicle.

As another example, vehicle telemetry data can include information regarding a current condition of the autonomous vehicle. For instance, this can include information regarding the autonomous vehicle's location (e.g., as determined by a localization module having a GNSS sensor), speed (e.g., as determined by a speed sensor), altitude (e.g., as determined by an altimeter), and/or heading or orientation (e.g., as determined by a compass or gyroscope). This can also include information regarding a status of the autonomous vehicle and/or one or more of its subcomponents. For example, this can include information indicating that the autonomous vehicle is operating normally, or information indicating one or more abnormalities related to the autonomous vehicle's operation (e.g., error indications, warnings, failure indications, etc.). As another example, this can include information indicating that one or more specific subcomponents of the autonomous vehicle are operating normally, or information indicating one or more abnormalities related to those subcomponents.

As another example, vehicle telemetry data can include information regarding historical conditions of the autonomous vehicle. For instance, this can include information regarding the autonomous vehicle's historical locations, speeds, altitude, and/or heading or orientations. This can also include information regarding the historical statuses of the autonomous vehicle and/or one or more of its subcomponents.

As another example, vehicle telemetry data can include information regarding current and/or historical environmental conditions observed by the autonomous vehicle. For instance, this can include information regarding a traffic condition of a road observed by the autonomous vehicle, a closure or an obstruction of a road observed by the autonomous vehicle, an object or hazard observed by the autonomous vehicle, or other information.

The autonomous vehicle 1302*a-d* can transmit information to the computer system 1300 according to different frequency, rates, or patterns. For example, the autonomous vehicles 1302*a-d* can transmit information periodically (e.g., in a cyclically recurring manner, such as at a particular frequency). As another example, the autonomous vehicles 1302*a-d* can transmit information intermittently or sporadically. As another example, the autonomous vehicles 1302*a-d* can transmit information if one or more trigger conditions are met (e.g., when certain types of information are collected by the autonomous vehicle, at a certain type of time, when certain events occur, etc.) As another example, the autonomous vehicles 1302*a-d* can transmit information on a continuous or substantially continuous basis.

In some embodiments, the autonomous vehicles 1302*a-d* transmits a subset of the information that they collect. As an example, each autonomous vehicle 1302*a-d* can collect information (e.g., using one or more sensors), and selectively transmit a subset of the collected information to the computer system 1300. In some embodiments, the autonomous vehicles 1302*a-d* can transmit all or substantially all of the information that they collect. As an example, each autonomous vehicle 1302*a-d* can collect information (e.g., using one or more sensors), and selectively transmit all or substantially all of the collected information to the computer system 1300.

In some embodiments, the autonomous vehicles 1302*a-d* dynamically transmits different types of information to the computer system 1300, depending on the circumstance. As an example, in some embodiments, the autonomous vehicles 1302*a-d* can periodically, intermittently, or continuously transmit a first data set to the computer system 1300. Upon receiving a request from the computer system 1300 for additional information, the autonomous vehicles 1302*a-d* can transmit a second data set to the computer system 1300. The first data set and the second data set can differ in size and/or complexity. For instance, the first data set can be relatively smaller and/or less complex (e.g., containing less information regarding the operation of the autonomous vehicle), while the second data set can be relatively larger and/or more complex (e.g., containing more information regarding the operation of the autonomous vehicle). This can be beneficial, for example, as it enables the computer system 1300 to receive certain information regarding each of the autonomous vehicles 1302*a-d* (e.g., to continuously monitor the autonomous vehicles 1302*a-d* based on a relatively smaller set of data) and request additional information on demand (e.g., if additional information is required to monitor and/or control the operation of the autonomous vehicles 1302*a-d* in a more accurate or comprehensive manner), without overwhelming the capabilities of network connection between them.

As an example, as shown in FIG. 13, each of the autonomous vehicles can transmit respective first vehicle telemetry data 1306*a-d* to the computer system 1300. The first vehicle telemetry data 1306*a-d* can be relatively "basic," "simpler," "lightweight," or "generalized." As an example, the first vehicle telemetry data 1306*a-d* can be relatively smaller in size and/or less complex in nature (e.g., compared to second vehicle telemetry data, described in further detail below). As another example, the first vehicle telemetry data 1306*a-d* can include a relatively smaller subset of data collected by the sensors of the autonomous vehicles 1302*a-d*. As another example, the first vehicle telemetry data 1306*a-d* can include a relatively abstracted representation of the data collected by the sensors of the autonomous vehicles 1302*a-d* (e.g., a summarized, abridged, redacted, and/or simplified representation of the collected data).

The computer system 1300 can use the collected information to facilitate control and/or monitoring of the autonomous vehicles 1302*a-d*. As an example, the computer system 1300 can generate an interactive graphical user interface (GUI) including some or all of the collected information, and present the GUI to a user (e.g., using a display device associated with or otherwise in communication with the computer system 1300). The user can interact with the GUI to view information regarding each of the autonomous vehicles 1302*a-d* and/or issue commands with respect to the autonomous vehicles 1302*a-d* (e.g., commands assigning new tasks to the autonomous vehicles, commands modifying or canceling previous commands, etc.). Example GUIs are shown and described with respect to FIGS. 23-29 and 30-36. In some embodiments, the computer system 1300 can automatically issue one or more commands with respect to the autonomous vehicles 1302*a-d* based on the collected information (e.g., automatically generate commands assigning new tasks to the autonomous vehicles, commands modifying or canceling previous commands, etc.). Issued commands are transmitted from the computer system 1300 to one or more of the autonomous vehicles 1302*a-d* for execution.

Figure 14:
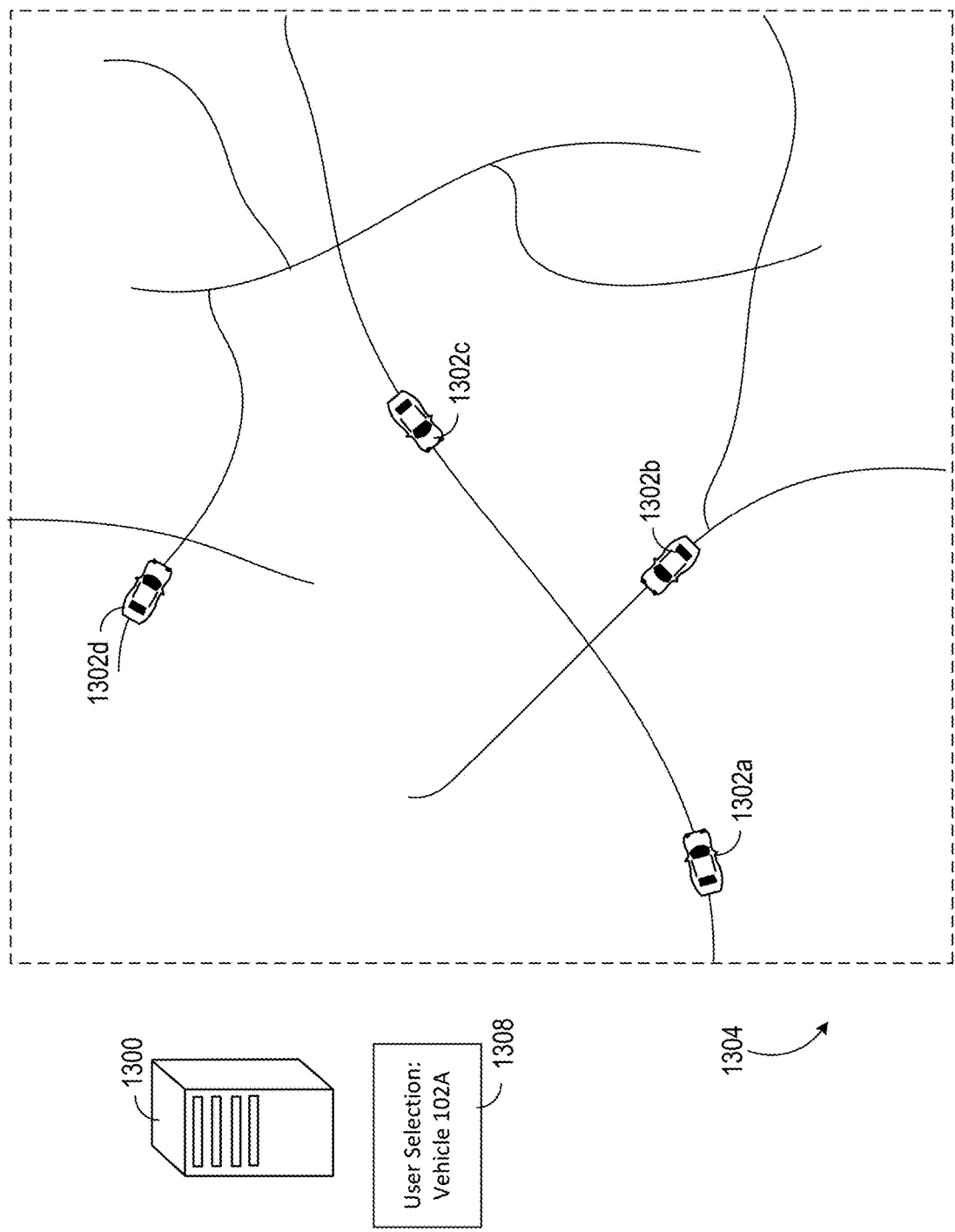

In some embodiments, additional information is selectively retrieved from one or more of the autonomous vehicles 1302*a-d*. For example, as shown in FIG. 14, the computer system 1300 can receive a user input 1308 indicating that a user of the computer system 1300 has selected the autonomous vehicle 1302*a*. The user input 1308 could correspond, for example, to a user interacting with the GUI presented by the computer system 1300 and selecting the autonomous vehicle 1302*a* (e.g., indicating that the user wishes to review additional information regarding the autonomous vehicle 1302*a*).

Figure 15:
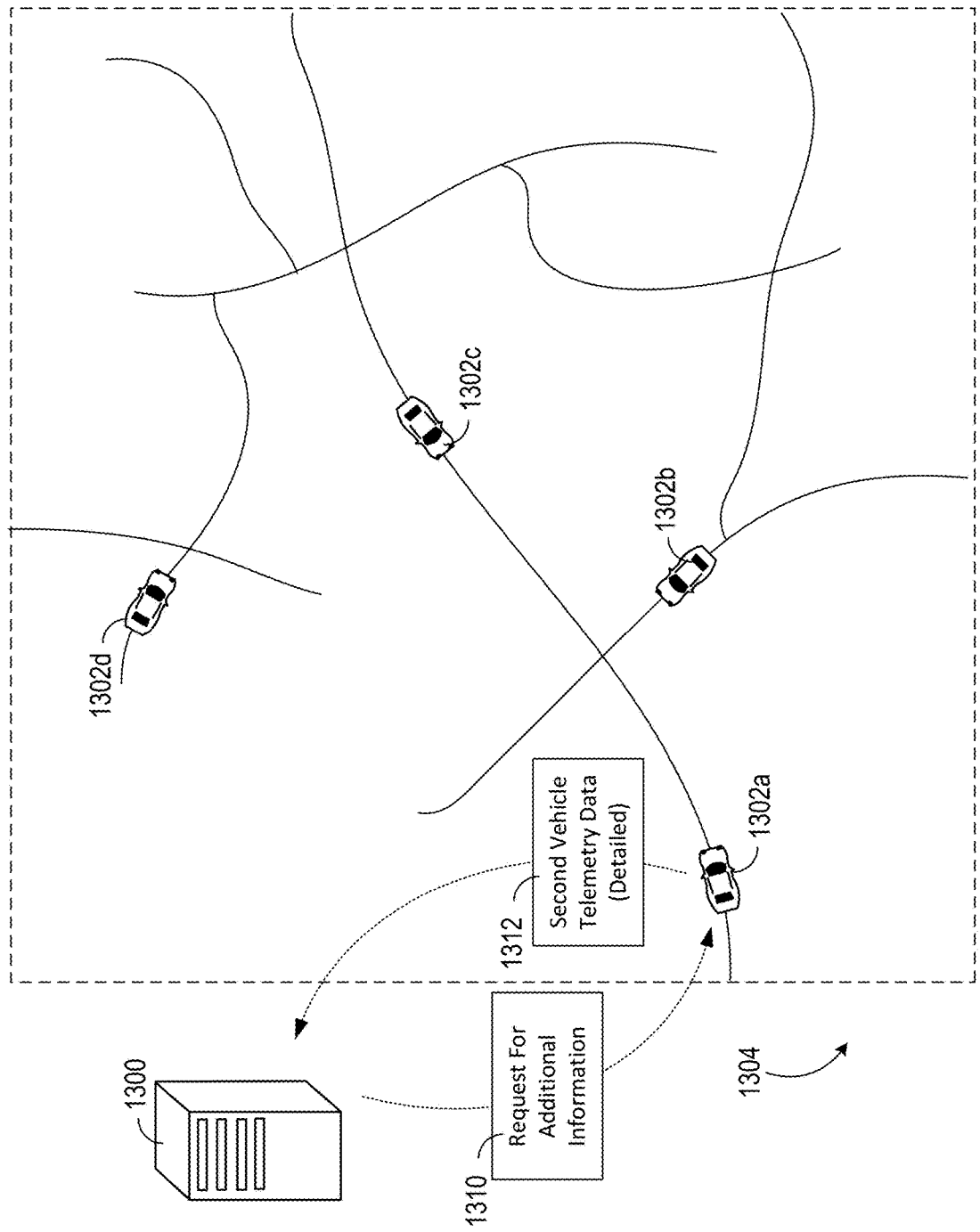

As shown in FIG. 15, in response, the computer system 1300 transmits a request message 1310 to the selected autonomous vehicle 1302*a* requesting additional information. In response to receiving the request message 1310, the autonomous vehicle 1302*b* transmits second vehicle telemetry data 1312 to the computer system 1300.

The second vehicle telemetry data 1312 can be more "detailed" than the first vehicle telemetry data 1306A previously transmitted by the autonomous vehicle 1302*a*. For example, the second vehicle telemetry data 1312 can be relatively larger in size and/or more complex compared to the first vehicle telemetry data 1306A. As another example, the second vehicle telemetry data 1312 can include a relatively larger subset of data collected by the sensors of the autonomous vehicle 1302*a* compared to the first vehicle telemetry data 1306A. As another example, the second vehicle telemetry data 1312 can include a relatively less abstracted representation of the data collected by the sensors of the autonomous vehicle 1302*a* (e.g., a more detailed summary or less simplified representation of the collected data, or the collected data itself). As another example, the second vehicle telemetry data 1312 can include the entirety of the data collected by the sensors of the autonomous vehicle 1302*a*, rather than a subset of the collected data.

For instance, the first vehicle telemetry data 1306A can include one or more images having a particular resolution and size, and the second vehicle telemetry data 1312 can include one or more images having a resolution and/or size greater than that of the images of the first vehicle telemetry data 1306A.

As another example, the first vehicle telemetry data 1306A can include one or more videos having a particular resolution, size, and framerate, and the second vehicle telemetry data 1312 can include one or more videos having a resolution, size, and/or framerate greater than that of the videos of the first vehicle telemetry data 1306A.

As another example, the first vehicle telemetry data 1306A can include one or more sensor measurements collected according to a particular frequency or rate, and the second vehicle telemetry data 1312 can include one or more sensor measurements collected according to a frequency or rate greater than that of the sensor measurements of the first vehicle telemetry data 1306A.

As another example, the first vehicle telemetry data 1306A can include one or more data items of a particular data type (e.g., 32 bit float), and the second vehicle telemetry data 1312 can include one or more data items of a data type larger than that of the data items of the first vehicle telemetry data 1306A (e.g., 64 bit double).

As another example, the first vehicle telemetry data 1306A can include one or more data items expressing values according to a particular degree of precision, and the second vehicle telemetry data 1312 can include one or more data items expressing values according to a degree of precision higher than that of the data items of the first vehicle telemetry data 1306A.

As another example, the first vehicle telemetry data 1306A can include one or more types of data items that are relatively smaller in size (e.g., textual data, such as data in a JavaScript Object Notion (JSON), Hypertext Markup Language (HTML), or Extensible Markup Language (XML) data format), and the second vehicle telemetry data 1312 can include one or more types of data items that are relatively larger in size (e.g., images and/or videos, detailed sensor data, large binary files, etc.).

In some embodiments, the computer system 1300 and the autonomous vehicles 1302*a-d* exchange information in dynamic manner based on the conditions of the network connection between them. For example, if the quality of a network connection between the computer system 1300 and an autonomous vehicle 1302*a-d* is higher (e.g., higher available bandwidth, lower latency, and/or higher reliability), the computer system 1302*a-d* can retrieve a greater amount of data from the autonomous vehicle (e.g., more detailed data, data that is larger in size, and/or data that is more complex). As another example, if the quality of the network connection between the computer system 1300 and an autonomous vehicle 1302*a-d* is lower (e.g., lower bandwidth, higher latency, and/or lower reliability), the computer system 1300 can retrieve a smaller amount of data from the autonomous vehicle (e.g., less detailed data, more basic data, data that is smaller in size, and/or data that is less complex).

To illustrate, FIG. 16 shows a region 1304 having an autonomous vehicle 1302*a*. In this example, the autonomous vehicle 1302*a* has encountered an obstruction 1600 in its path, and has determined that it is unable to safely and/or effectively navigate around the obstruction 1600 in an automated manner. The obstruction 1600 could be, for example, another vehicle (e.g., a car, van, truck, motorcycle, bicycle, etc.), a pedestrian, a non-vehicular object (e.g., a barricade, cone, road debris, etc.), a hazard (e.g., a ditch or hole, a discontinuity in the road, etc.), a road closure, or any other hindrance that could impede the travel of the autonomous vehicle 1302*a*. The obstruction 1600 can be detected, for example, by the autonomous vehicle 1302*a*, by other autonomous vehicles (e.g., other autonomous vehicles currently in proximity of the obstruction 1600 or previously in proximity of the obstruction 1600), and/or by the computer system 1300 (e.g., based on information collected by the computer system 1300 from one or more autonomous vehicles or other sources of information, such as a mapping or traffic database).

Figure 17:
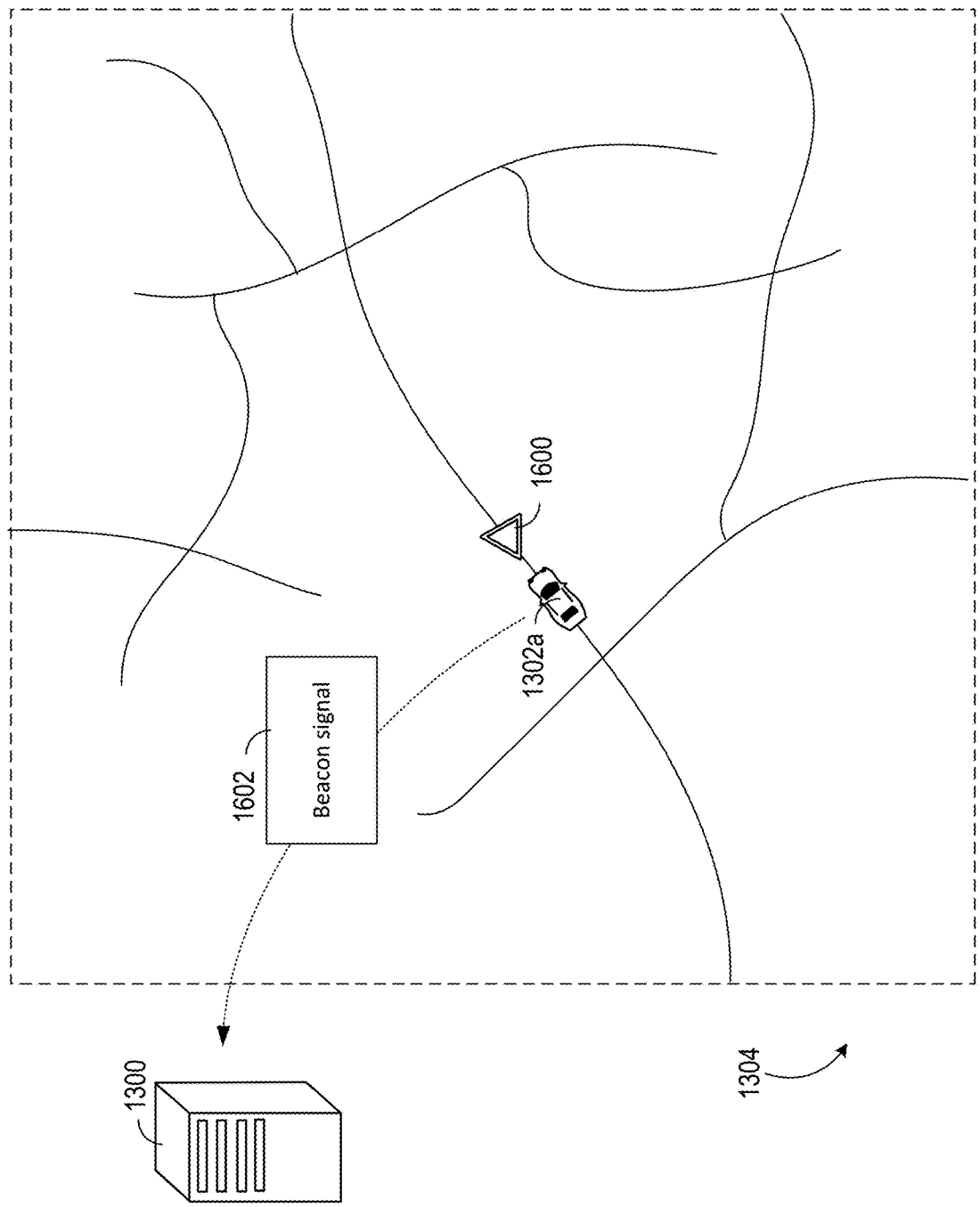

Upon determining that it cannot safely and/or effectively navigate around the obstruction 1600 in an automated manner, the autonomous vehicle 1302*a* prepares to transmit a request for remote control to the computer system 1300 (e.g., a request for instructions to traverse the obstruction 1600). As shown in FIG. 17, the autonomous vehicle begins by transmitting a beacon signal 1602 to the computer system 1300, and assessing the quality of the network connection between the autonomous vehicle 1302*a* and the computer system 1300 based on the transmission. As an example, the beacon signal 1602 can include one or more data items having a known size and/or known contents that act a baseline, standard, or reproducible sample with which to conduct tests (e.g., "test" data or "sample" data).

Figure 18:
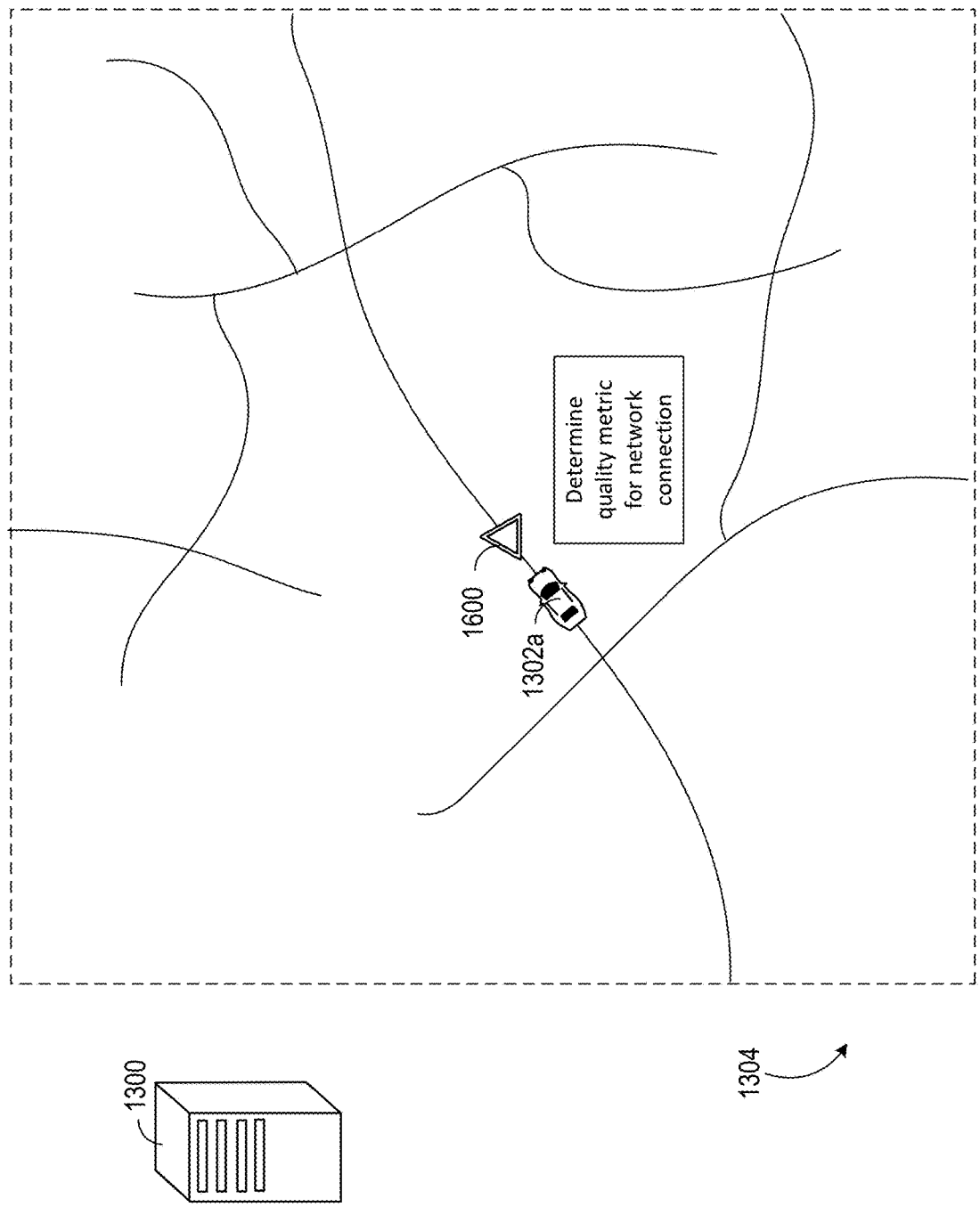

As shown in FIG. 18, the transmission of the beacon signal 1602 can be analyzed to determine the quality of the network connection between the autonomous vehicle 1302*a* and the computer system 1300. For example, based on the transmission of the beacon signal 1602, the autonomous vehicle 1302*a* and/or the computer system 1300 can determine the available bandwidth for the network connection (e.g., the amount of information that the network connection can transmit in a given period of time), a latency associated with transmitting information using the network connection (e.g., the amount of time information takes to traverse the network connection), and/or reliability of transmissions using the network connection (e.g., the ability of the network connection to carry out transmissions in a consistent manner). For instance, the autonomous vehicle 1302*a* and/or the computer system 1300 can measure the amount of time that it takes to transmit the beacon signal 1602, the transfer rate of the transmission, the consistency or regularity of the transfer rate, an integrity of the beacon signal 1602 arrived upon arrival at the computer system 1300, among other factors. Further, the autonomous vehicle 1302*a* and/or the computer system 1300 can determine whether any errors or irregularities occurred during transmission. In some embodiments, the autonomous vehicle 1302a and/or the computer system 1300 determines one or more quality metrics (e.g., one or more numerical scores, or other objective or subjective descriptors) representing the quality of the network connection between the autonomous vehicle 1302a and the computer system 1300. As an example, if the quality metric is a numerical score, higher available bandwidth, lower latency, and higher reliability can correspond to a higher quality metric. Inversely, lower available bandwidth, higher latency, and lower reliability can correspond to a lower quality metric. In some embodiments, multiple quality metrics can be determined, with each quality metric corresponding to a different respective aspect of the quality of the network connection (e.g., available bandwidth, latency, reliability, etc.).

Figure 19:
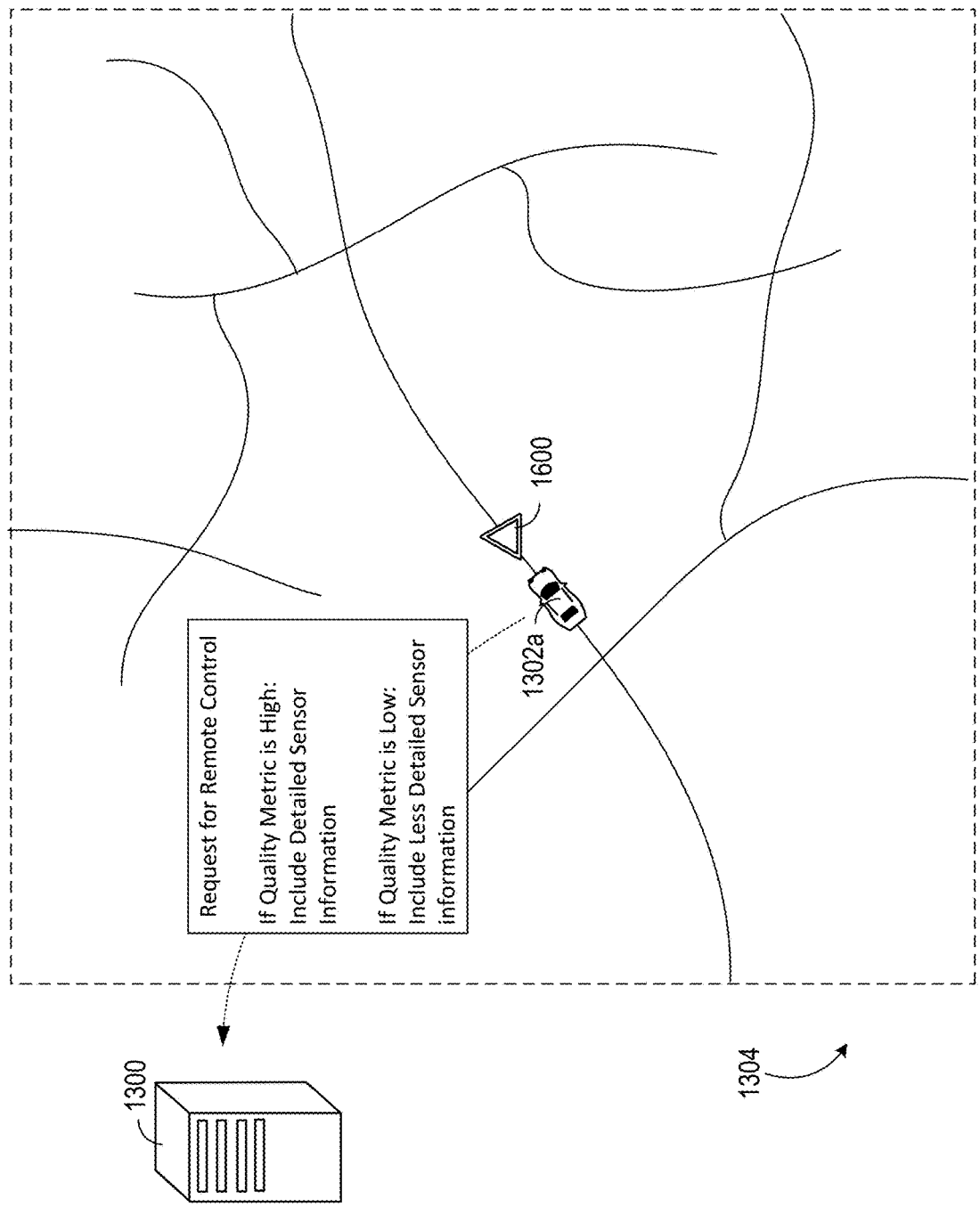

As shown in FIG. 19, upon determining the quality metric for the network connection, the autonomous vehicle 1302 generates a request for remote control 1604, and transmits the request 1604 to the computer system 1300.

The request 1604 can include data describing the obstruction 1600. As an example, the request 1604 can include data indicating the location of the obstruction 1600 (e.g., the location of the obstruction 1600 relative to the autonomous vehicle 1304A, or an absolute location of the obstruction 1600, etc.). As another example, the request 1604 can include data indicating the size, shape, and/or orientation of the obstruction 1600.

The request 1604 can also include data describing one or more aspects of the autonomous vehicle 1304A. As an example, the request 1604 can include vehicle telemetry data, such as that described with respect to FIGS. 13-15. For instance, vehicle telemetry data can include data obtained using one or more imaging sensors (e.g., videos or images), information regarding a current condition of the autonomous vehicle (e.g., the autonomous vehicle's location, speed, altitude, and/or heading or orientation, a status of the autonomous vehicle and/or one more of its subcomponents, etc.), information regarding a previous condition of the autonomous vehicle, and/or information regarding current and/or historical environmental conditions observed by the autonomous vehicle.

The autonomous vehicle 1304A can dynamically vary the information that is included in the request 1604 based on the quality metric associated with the network connection. For example, if the quality of a network connection between the computer system 1300 and an autonomous vehicle 1302a is higher (e.g., associated with one or more higher quality metrics corresponding to higher available bandwidth, lower latency, and/or higher reliability), the autonomous vehicle 1304A can include a greater amount of information (e.g., more detailed data, data that is larger in size, and/or data that is more complex). As another example, if the quality of the network connection between the computer system 1300 and an autonomous vehicle 1302a is lower (e.g., associated with a lower quality metric corresponding to lower bandwidth, higher latency, and/or lower reliability), the autonomous vehicle 1304A can include a smaller amount of information (e.g., less detailed data, data that is smaller in size, and/or data that is less complex).

As an example, if the quality of a network connection is lower, the autonomous vehicle 1304A can include one or more images having a particular resolution and size. If the quality of a network connection is higher, the autonomous vehicle 1304A can include one or more images having a greater resolution and/or size.

As another example, if the quality of a network connection is lower, the autonomous vehicle 1304A can include one or more videos having a particular resolution, size, and framerate. If the quality of a network connection is higher, the autonomous vehicle 1304A can include one or more videos having a greater resolution, size, and/or framerate.

As another example, if the quality of a network connection is lower, the autonomous vehicle 1304A can include one or more sensor measurements collected according to a particular frequency or rate. If the quality of a network connection is higher, the autonomous vehicle 1304A can include one or more sensor measurements collected according to a greater frequency or rate.

As another example, if the quality of a network connection is lower, the autonomous vehicle 1304A can include one or more sensor measurements collected according to a particular temporal resolution and/or spatial resolution. If the quality of a network connection is higher, the autonomous vehicle 1304A can include one or more sensor measurements collected according to a greater temporal resolution and/or spatial resolution.

As another example, if the quality of a network connection is lower, the autonomous vehicle 1304A can include one or more data items of a particular data type (e.g., 32 bit float). If the quality of a network connection is higher, the autonomous vehicle 1304A can include one or more data items of a larger data type (e.g., 64 bit double).

As another example, if the quality of a network connection is lower, the autonomous vehicle 1304A can include one or more data items expressing values according to a particular degree of precision. If the quality of a network connection is higher, the autonomous vehicle 1304A can include one or more data items expressing values according to a higher degree of precision.

As another example, if the quality of a network connection is lower, the autonomous vehicle 1304A can include one or more types of data items that are relatively smaller in size (e.g., textual data, such as data in a JSON, HTML, or XML data format). If the quality of a network connection is higher, the autonomous vehicle 1304A can include one or more types of data items that are relatively larger in size (e.g., images and/or videos, detailed sensor data, large binary files, etc.).

In some embodiments, the autonomous vehicle 1304A varies the information that is included in the request 1604 according to multiple different levels, tiers, or grades. For instance, if the quality of the network connection corresponds to a highest level (e.g., associated with a quality metric greater than or equal to a first threshold level), the autonomous vehicle 1304A can include a first portion of information having the most information (e.g., the most detailed data, data that is largest in size, and/or data that is most complex). If the quality of the network connection corresponds to a lower level (e.g., associated with a quality metric less than the first threshold level, but greater than or equal to a lower second threshold level), the autonomous vehicle 1304A can include a second portion of information having a smaller amount of data (e.g., less detailed data, data that is smaller in size, and/or data that is less complex). If the quality of the network connection corresponds to an even lower level (e.g., associated with a quality metric less than the second threshold level, but greater than or equal to a lower third threshold level), the autonomous vehicle 1304A can include a third portion of information having even smaller amount of data (e.g., even less detailed data, data that is even smaller in size, and/or data that is even less complex). Any number of levels, tiers, or grades can be defined in this manner (e.g., two, three, four, or more). In this manner, the transmission of data between the autonomous vehicle 1302a and the computer system 1300 can be dynamically varied based on the quality of the network connection between them, thereby improving the effectiveness of communications.

In some embodiments, the network connection between an autonomous vehicle and a computer system can be established using a cellular network, such as a 4G network (e.g., a network implemented using the "fourth generation" of broadband cellular network technology as defined by the International Telecommunication Union [ITU]) or a 5G network (e.g., a network implemented using the "fifth generation" of broadband cellular network technology as defined by the ITU). The quality of the network connection can vary based on the type of cellular network that is used. As an example, a 5G network can have a peak data rate (e.g., a maximum achievable data rate) of approximately 20 Gbit/s, a user experienced data rate (e.g., an achievable data rate across coverage area) of approximately 1 Gbit/s, a latency (e.g., a radio network contribution to packet travel time) of approximately 1 ms, a mobility (e.g., a maximum speed for handoff and Quality of Service requirements) of approximately 500 km/h, a connection density (e.g., a total number of devices per unit area) of approximately $10^6/km^2$, and an area traffic capacity (e.g., a total traffic across coverage area) of approximately 10 (Mbit/s)/$m^2$. In some embodiments, a network has a peak data rate greater than, equal to, or less than approximately 20 Gbit/s. In some embodiments, a network has a user experienced data rate greater than, equal to, or less than 1 Gbit/s. In some embodiments, a network has a latency greater than, equal to, or less than 1 ms. In some embodiments, a network has a mobility greater than, equal to, or less than 500 km/h. In some embodiments, a network has a connection density greater than, equal to, or less than $10^6/km^2$. In some embodiments, a network has an area traffic capacity greater than, equal to, or less than 10 (Mbit/s)/$m^2$. In some embodiments, the beacon signal is used to determine the type of cellular network that is being used, and the performance of the network connection is determined based on an appropriate technical specification (e.g., a 4G or 5G specification, as defined by the ITU).

Upon receipt of the request 1604, the computer system 1300 determines the location, shape, and orientation of the obstruction 1600 (e.g., relative to the autonomous vehicle 1302a), and presents a visual representation of the obstruction 1600 and the autonomous vehicle 1302a to the user (e.g., using the GUI generated by the computer system 1300). A user can interact with the GUI to examine the nature of the obstruction, and input commands to the autonomous vehicle 1302a to traverse the obstruction 1600. For instance, the user can input a path for the autonomous vehicle 1302a to navigate around and/or avoid the obstruction 1600, while maintaining a sufficiently safe path of travel. Inputted commands are transmitted from the computer system 1300 to the autonomous vehicle 1302a for execution.

In some embodiments, the computer system 1300 presents information regarding the obstruction 1600 and the autonomous vehicle 1302a using a simplified visual representation (e.g., an abstracted representation of the relative positions and orientations of obstruction 1600 and the autonomous vehicle 1302a). This can be useful, for example, as it enables a user to more readily understand the nature of the obstruction 1600 and provide a navigation path around it, without being overwhelmed by extraneous information.

Figure 20:
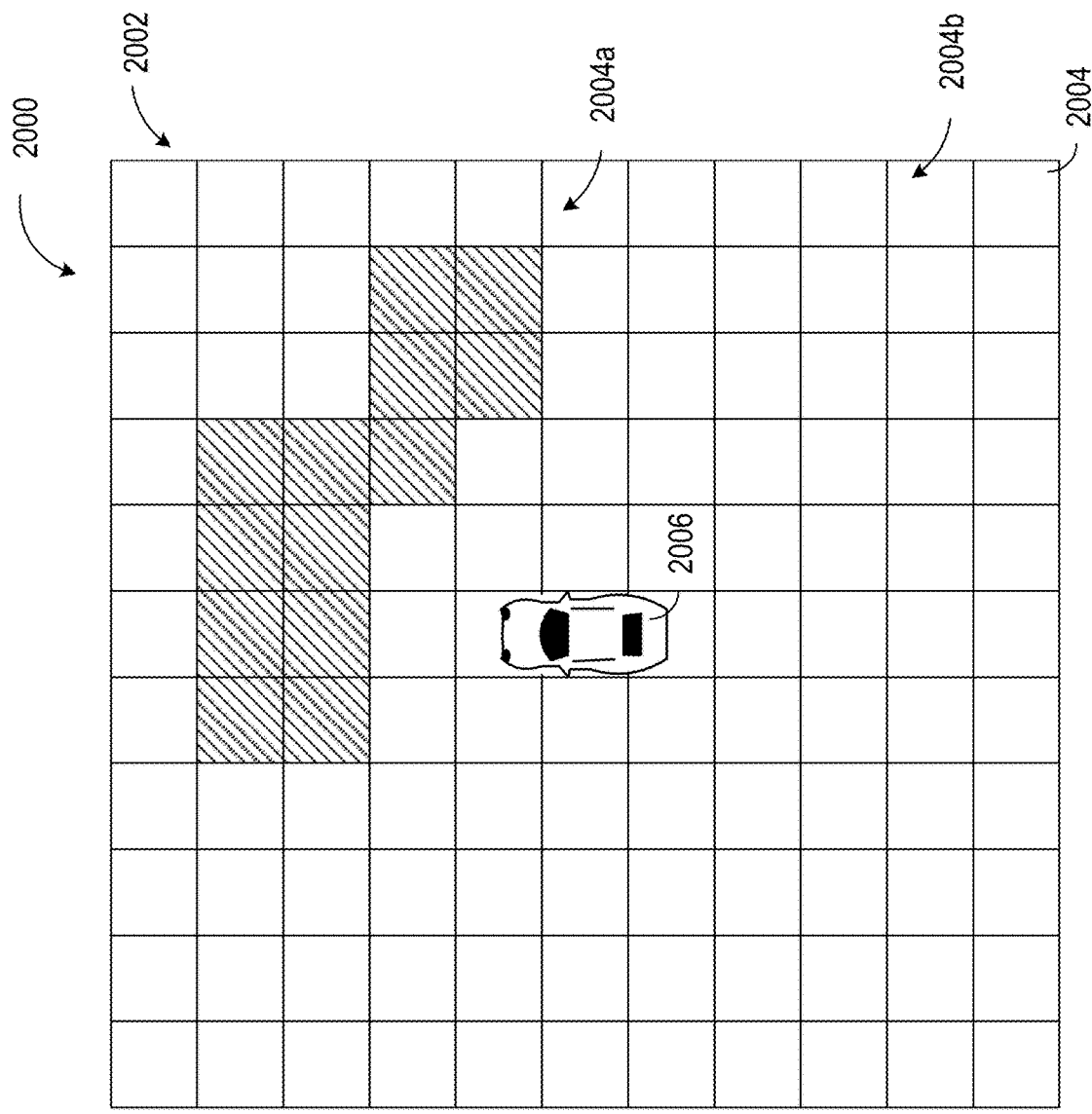
FIGS. 20-22 show an example visual representation depicting the relative location of an obstruction and an autonomous vehicle.

As an example, FIG. 20 shows a visual representation 2000 depicting the relative location of an obstruction and an autonomous vehicle. The visual representation 2000 can be presented, for example, using a GUI generated by the computer system 1300.

The visual representation 2000 includes an occupancy grid 2002 defining a number of different two-dimensional boxes 2004, and a visual representation of the autonomous vehicle 2006. The occupancy grid 2002 represents the physical environment surrounding the autonomous vehicle (e.g., from a top-down perspective). For example, each box 2004 of the occupancy grid 2004 can indicate a particular area or region in proximity to the autonomous vehicle along its plane of travel. In some embodiments, the occupancy grid 2002 can represents the physical environment surrounding the autonomous vehicle according to a fixed or constant scale (e.g., each box represents a respective 1 foot by 1 foot region in proximity to the autonomous vehicle). In some embodiments, the occupancy grid 2002 can represent the physical environment surrounding the autonomous vehicle according to a variable scale (e.g., boxes closer to the autonomous vehicle represent smaller regions in proximity to the autonomous vehicle, while boxes further from the autonomous vehicle represent larger regions).

Further, one or more boxes 2004 of the occupancy grid 2004 can be depicted in contrasting colors, hues, or patterns to indicate the location of an obstruction relative to the autonomous vehicle. For instance, in the example shown in FIG. 20, several boxes 2004a are shaded to indicate that an obstruction is located in the region depicted by those boxes (e.g., generally in front of and to the front-right of the autonomous vehicle). Other boxes 2004b remain unshaded to indicate that the regions depicted by those boxes are unobstructed. Accordingly, a user can review the visual representation 2000 and quickly and intuitively ascertain the location, shape, and orientation of the obstruction relative to the autonomous vehicle.

The occupancy grid 2004 can be generated based on information collected by the autonomous vehicle 1302a. For example, the autonomous vehicle 1302a can collect sensor data regarding its surroundings (e.g., images, videos, proximity data, etc.), and transmit some or all of the sensor data to the computer system 1300. The computer system 1300 can interpret the sensor data to determine the presence and location of one or objects in proximity to the autonomous vehicle 1302a, and generate an occupancy grid 2004 visually representing those objects.

As another example, the autonomous vehicle 1302a can collect sensor data regarding its surroundings, interpret the sensor data to determine the presence and location of one or objects in its proximity, and generate one or more data items indicating the location of the objects relative to the autonomous vehicle 1302a. The autonomous vehicle 1302a can transmit the data items to the computer system 1300, and in turn, the computer system 1300 can generate an occupancy grid 2004 based on the data items.

In some embodiments, the data items includes a simplified representation of the sensor data collected by the autonomous vehicle 1302a. For example, the autonomous vehicle 1302a can collect a variety of different sensor measurements (e.g., images, videos, radar measurements, LiDAR measurements, ultrasonic measurements, etc.), and determine the presence and location of one or more objects based on those measurements. Rather than including the sensor measurements themselves, the data items can simply identify the location of each object relative to the autonomous vehicle 1302a. In some embodiments, this information is expressed in the form of textual data, textual data, such as data in a JSON, HTML, or XML data format. This is beneficial, for example, as it enables the autonomous vehicle 1302a to transmit information to the computer system 1300 describing the location of objects in its proximity, while reducing the amount of data that is transmitted over the network connection (e.g., simplified textual data rather than comprehensive sensor data). Thus, the autonomous vehicle 1302a and the computer system 1300 can communicate in a more efficient manner.

Figure 21:
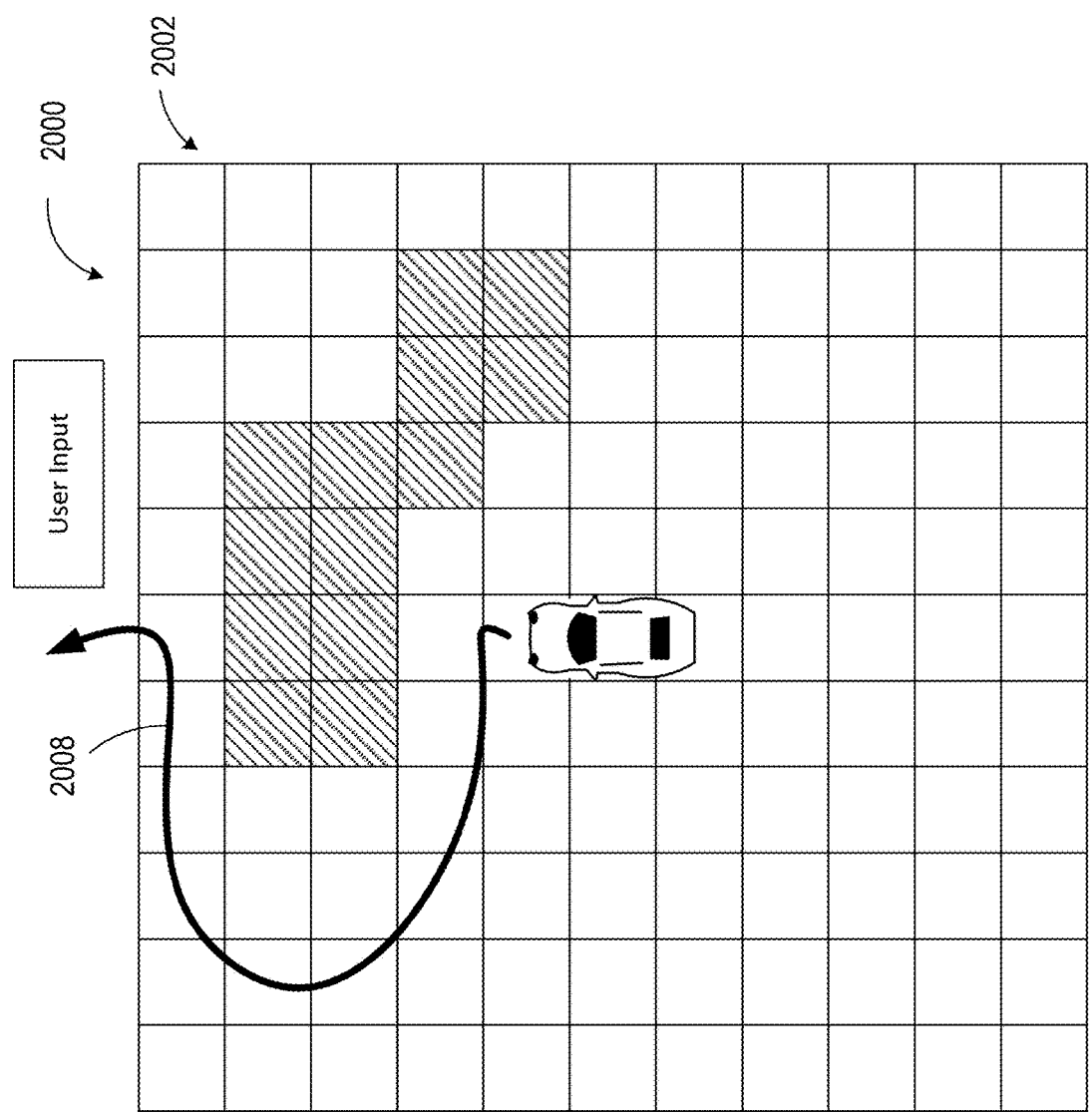

Further, a user can interact with the visual representation 2000 to input a path for the autonomous vehicle to navigate around and/or avoid the obstruction. For example, as shown in FIG. 21, a user can input a path 2008 for the autonomous vehicle to navigate around and/or avoid the obstruction and continue onward. The path 2008 can be inputted in various different ways. As an example, a user can input the path 2008 using an input device, such as a mouse, trackpad, or stylus (e.g., to draw or trade the path 2008 with respect to the visual representation 2000). As another example, the visual representation 2000 can be presented on a touch sensitive display device (e.g., a touchscreen), and a user can input the path 2008 by drawing or tracing the path 2008 onto the visual representation 2000 (e.g., by tracing his finger or a stylus with respect to the visual representation 2000). The inputted path 2008 can be transmitted from the computer system 1300 to the autonomous vehicle for execution, thereby enabling the autonomous vehicle to traverse the obstruction and continue onward.

In some embodiments, the path that is input by the user is modified before transmission to the autonomous vehicle. For instance, the inputted path can be modified to account for safety and/or practical considerations. As an example, an inputted path can be modified such that it better accounts for the configuration of the road (e.g., lane lines, road boundaries, etc.), the flow of traffic (e.g., the direction of traffic), traffic rules or regulations, and other considerations. In some embodiments, an inputted path is "snapped" to an alternative path approximating the inputted path (e.g., reference path similar to the inputted path, but having improved safety and/or practical implications). This can be useful, for example, as it enables the user to quickly provide coarse or general instructions regarding the navigation of the autonomous vehicle (e.g., without worrying about the precise path that the autonomous vehicle will take), while ensuring that the autonomous vehicle is provided sufficiently precise instructions to safely and effectively traverse the obstruction. In some embodiments, the computer system 1300 determines an alternative path based on information collected by the autonomous vehicle, other autonomous vehicles (e.g., other autonomous vehicles currently in proximity of the obstruction or have previously navigated through the environment), or other sources of information (e.g., services providing mapping data, imaging data such as satellite or overhead images, survey data, etc.)

As described above, a computer system 1300 can generate an interactive GUI to present information to a user regarding one or more autonomous vehicles and/or to enable a user to input commands with respect to one or more autonomous vehicles. Example GUIs are shown in FIGS. 23-29 and 30-36.

Figure 23:
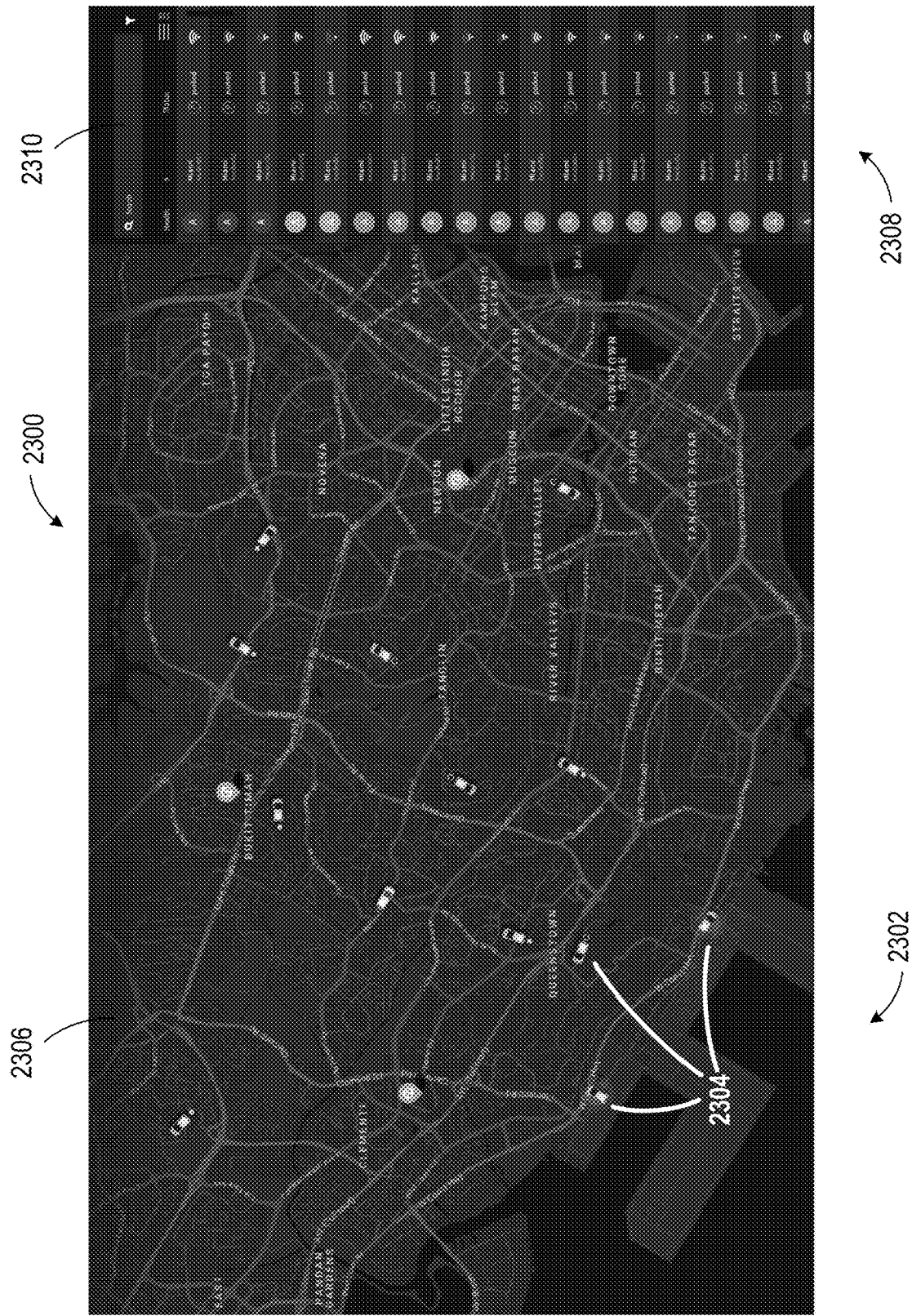
FIGS. 23-29 show example graphical user interfaces for monitoring and controlling the operation of one or more autonomous vehicles.

FIG. 23 shows an example GUI 2300 for monitoring and controlling the operation of one or more autonomous vehicles. The GUI 2300 can be generated, for example, by the computer system 1300 and presented to a user using a display device (e.g., a video monitor or screen). In some embodiments, the GUI 2300 can be used in a "command center" for remotely controlling multiple autonomous vehicles (e.g., a fleet of autonomous vehicles).

The GUI 2300 includes a map portion 2302 showing the location of several autonomous vehicles. For example, the map portion 2302 includes a number of display elements 2304 indicating the locations of autonomous vehicles with respect to a graphical map 2306. A user can interact with the map portion 2302 to view different geographical regions (e.g., by zooming and/or panning the graphical map 2306). A user can also interact with the map portion 2302 to view different layers of information. For example, the graphical map 2306 can include a number of different layers overlaid on one another, each indicating a different type of information (e.g., roads, traffic, satellite/overhead imagery, topography, etc.). A user can selectively show or hide one or more layers to view different types of information, either individually or in conjunction with other layers.

The GUI 2300 also includes a list portion 2308 displaying information regarding several autonomous vehicles. As an example, for each autonomous vehicle, the list portion 2308 can display an identifier of the autonomous vehicle (e.g., a name, serial number, or other identifier), a location of the autonomous vehicle (e.g., a city, a region, or a location point, etc.), a current status of the autonomous vehicle (e.g., an indication that the autonomous vehicle is parked, driving, picking up passengers, transporting passengers, or performing some other task), a "health" of the autonomous vehicle (e.g., an indication that the autonomous vehicle is operating normally, or is experiencing one or more abnormalities or errors), and a quality of a network connection available to the autonomous vehicle (e.g., an indication of a strength of a signal transmitted by a wireless transmitter associated with a wireless communications network). In some embodiments, the autonomous vehicles shown on the list portion 2308 directly correspond to the autonomous vehicles shown in the map portion 2302. In some embodiments, a user can scroll the list portion 2308 (e.g., by scrolling up or down) to review information regarding additional autonomous vehicles.

Further, the list portion 2308 includes a search input box 2310. A user can input search terms into the search input box 2310 to filter the autonomous vehicles shown in the list portion 2308. As an example, a user can input one or more search terms (e.g., terms pertaining to the autonomous vehicles' identifiers, locations, statuses, health, or any other information), and in response, the GUI 2300 can display autonomous vehicles matching those search terms. In some embodiments, a user can input a particular location or landmark (e.g., a name of a city or region, an address, a venue, a building, etc.), and in response, the GUI 2300 can display autonomous vehicles at or near the inputted location or landmark.

Figure 24:
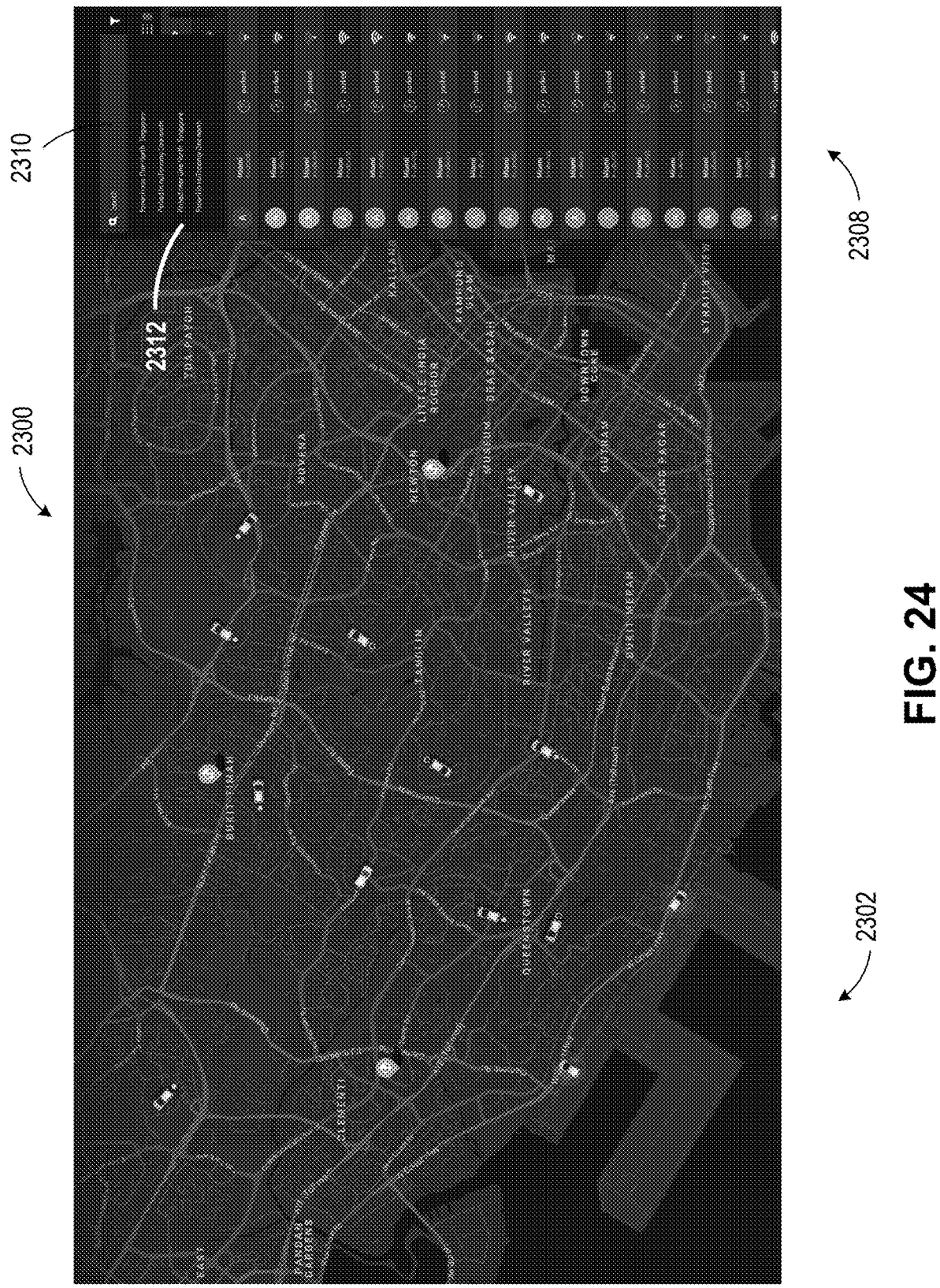

As shown in FIG. 24, the GUI 2300 can suggest one or more search terms to a user. For example, when the user selects the search input box 2310, the GUI 2300 can display one or more suggested search terms 2312 in proximity to the search input box 2310. A user can select a suggest search term 2312 to conduct a search, or manually input search terms into the search input box 2310.

Figure 25:
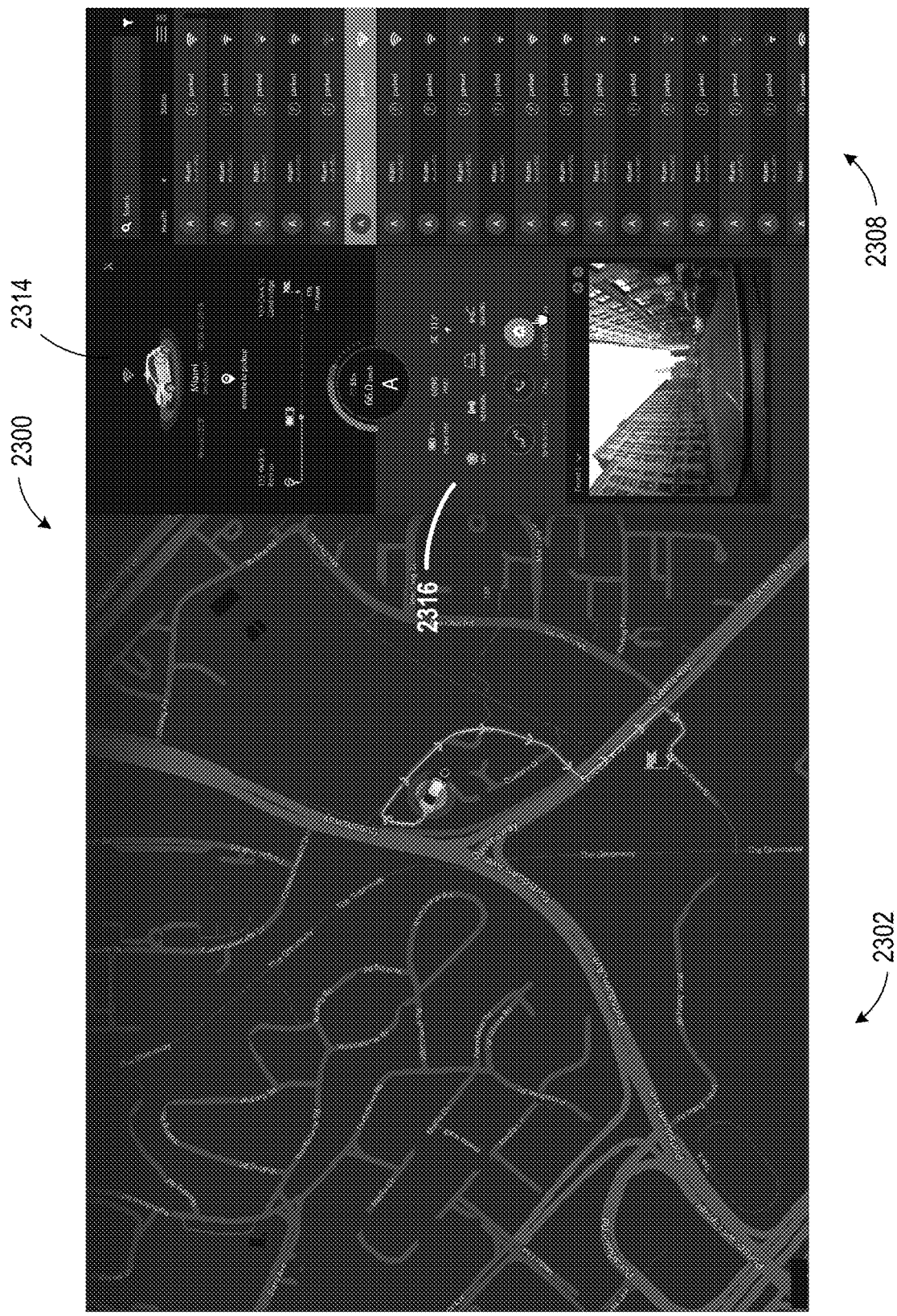

Further, a user can select an autonomous vehicle to view additional information regarding that autonomous vehicle. For instance, a user can select an autonomous vehicle displayed in the map portion 2302 or the list portion 2308 using an input device (e.g., a mouse, trackpad, stylus, or touch sensitive display device). As shown in FIG. 25, in response, the GUI 2300 adjusts the map portion 2302 to focus on the selected autonomous vehicle (e.g., by zooming and/or panning the graphical map 2306), and displays a vehicle information portion 2314 presenting additional information regarding the selected autonomous vehicle. As examples, the vehicle information portion 2314 can display the selected autonomous vehicle's identifier, operational status, progress with respect to an assigned task (e.g., trip progress between two locations), speed, battery condition, heading or orientation, mileage, or other information regarding the operation of the autonomous vehicle. As another example, the vehicle information portion 2314 can display one or more images or videos obtained by the autonomous vehicle (e.g., an image or video feed showing the autonomous vehicle's surroundings). In some embodiments, a user can select from among several different views (e.g., corresponding to different imaging sensors installed on the autonomous vehicle). Further, the map portion 2302 can display a current route or travel path of the autonomous vehicle, and a destination for the autonomous vehicle.

Figure 26:
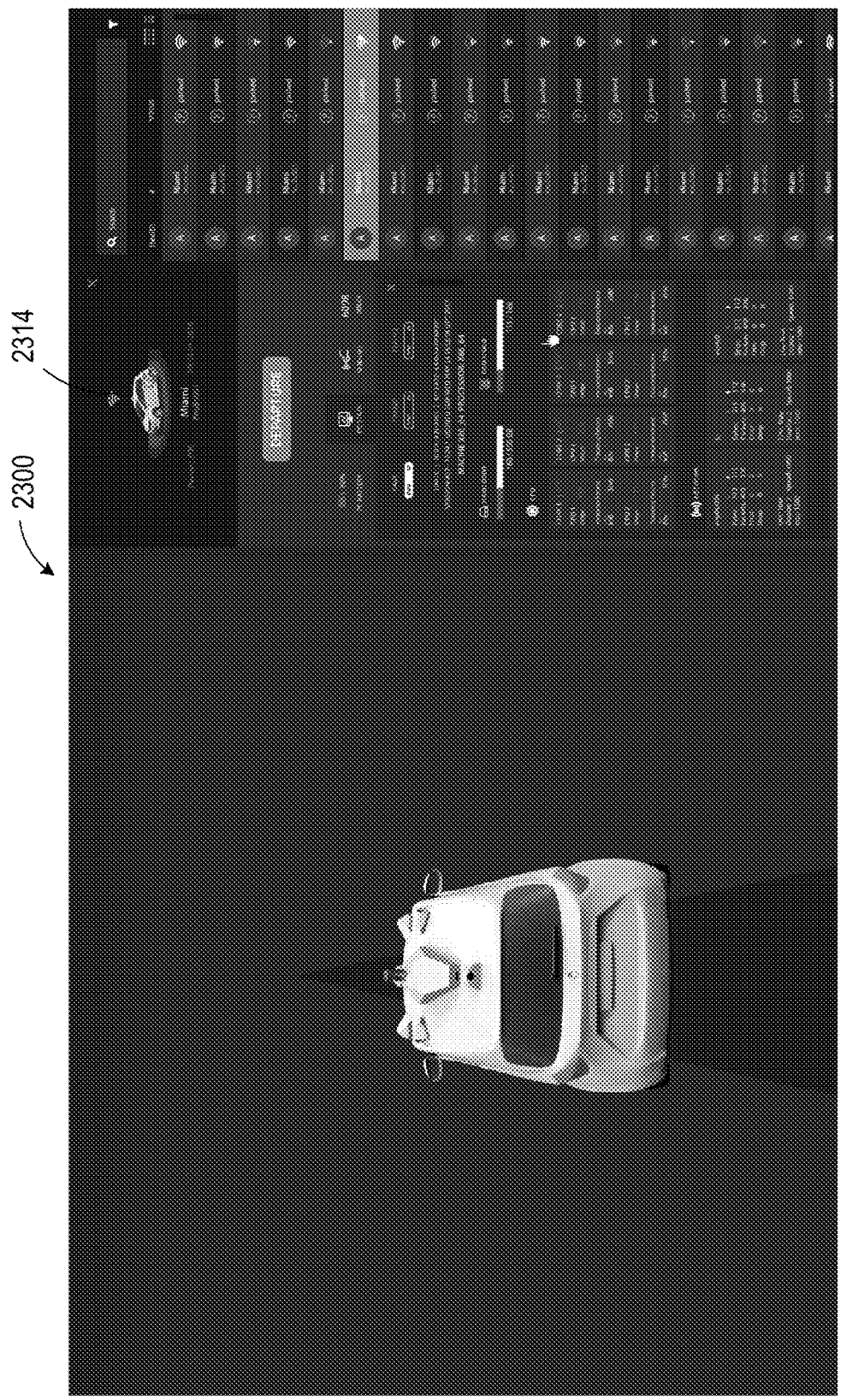

A user can interact with the vehicle information portion 2314 to retrieve further information regarding the autonomous vehicle. For example, the vehicle information portion 2314 can include several selectable elements 2316, each pertaining to a different aspect of the autonomous vehicle (e.g., the autonomous vehicle's computer systems, network connectivity, sensors, etc.). A user can select one of the selectable elements 2316 to view additional information regarding the selected aspect. For example, a user can select the selectable element 2316 corresponding to the computer systems of the autonomous vehicle. As shown in FIG. 26, in response, the GUI 2300 updates the vehicle information portion 2314 to display additional information regarding the computer systems (e.g., CPU usage, memory usage, hard drive usage, hardware versions, software versions, etc.). Similarly, a user can select other selectable elements 2316 to view other information regarding the autonomous vehicle.

Figure 27:
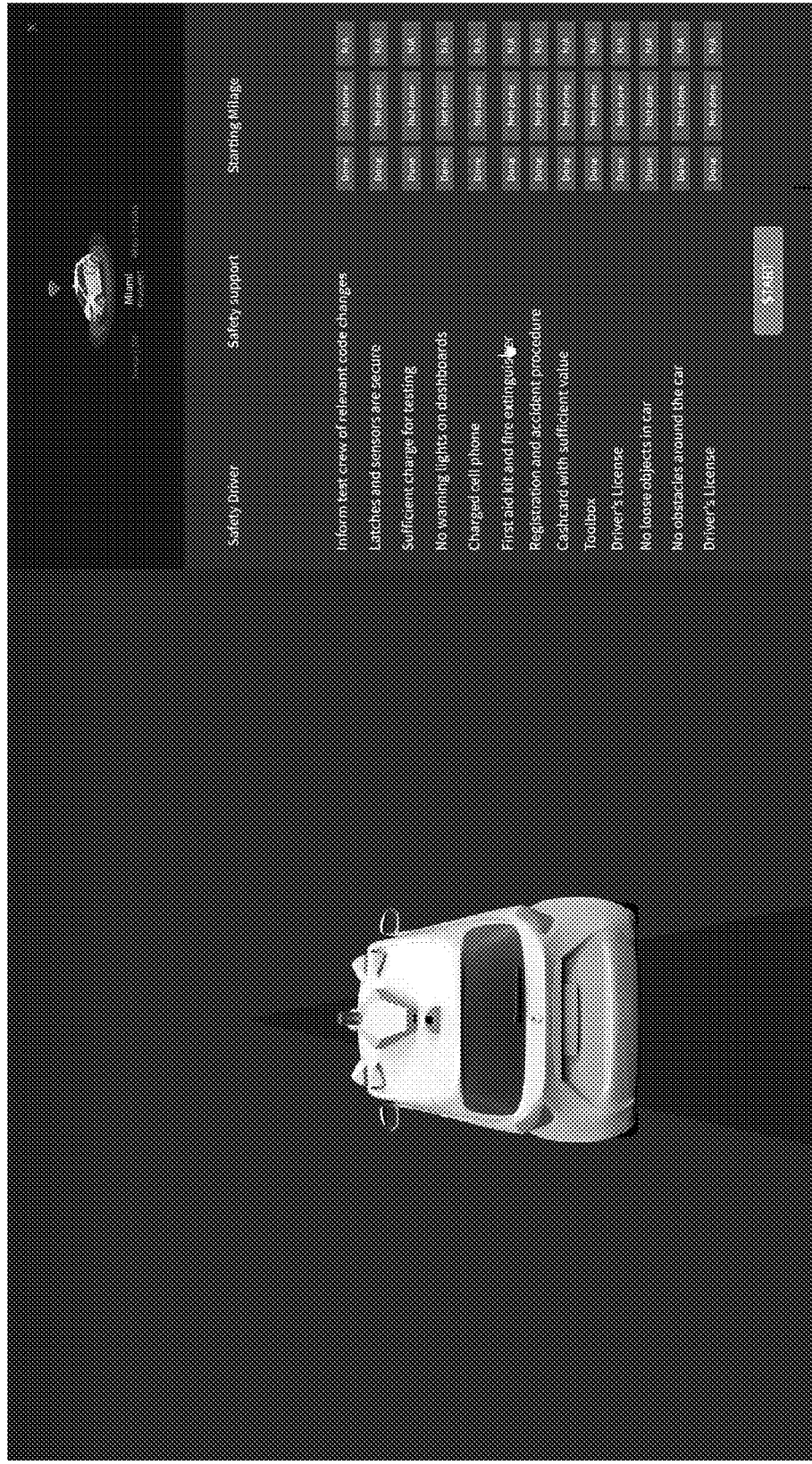

In some embodiments, the GUI 2300 displays regarding one or more safety checks performed with respect to the autonomous vehicle (e.g., safety checks automatically performed by the autonomous vehicle and/or safety checks performed by a human operator, such as a safety operator). For example, as shown in FIG. 27, the GUI 2300 can display a safety check portion 2318 including a list of several tasks to be performed as a part of the safety check, and the status of those tasks (e.g., "done," "not done," or "N/A"). The safety check portion 2318 can update to indicate the performance of each task.

Figure 22:
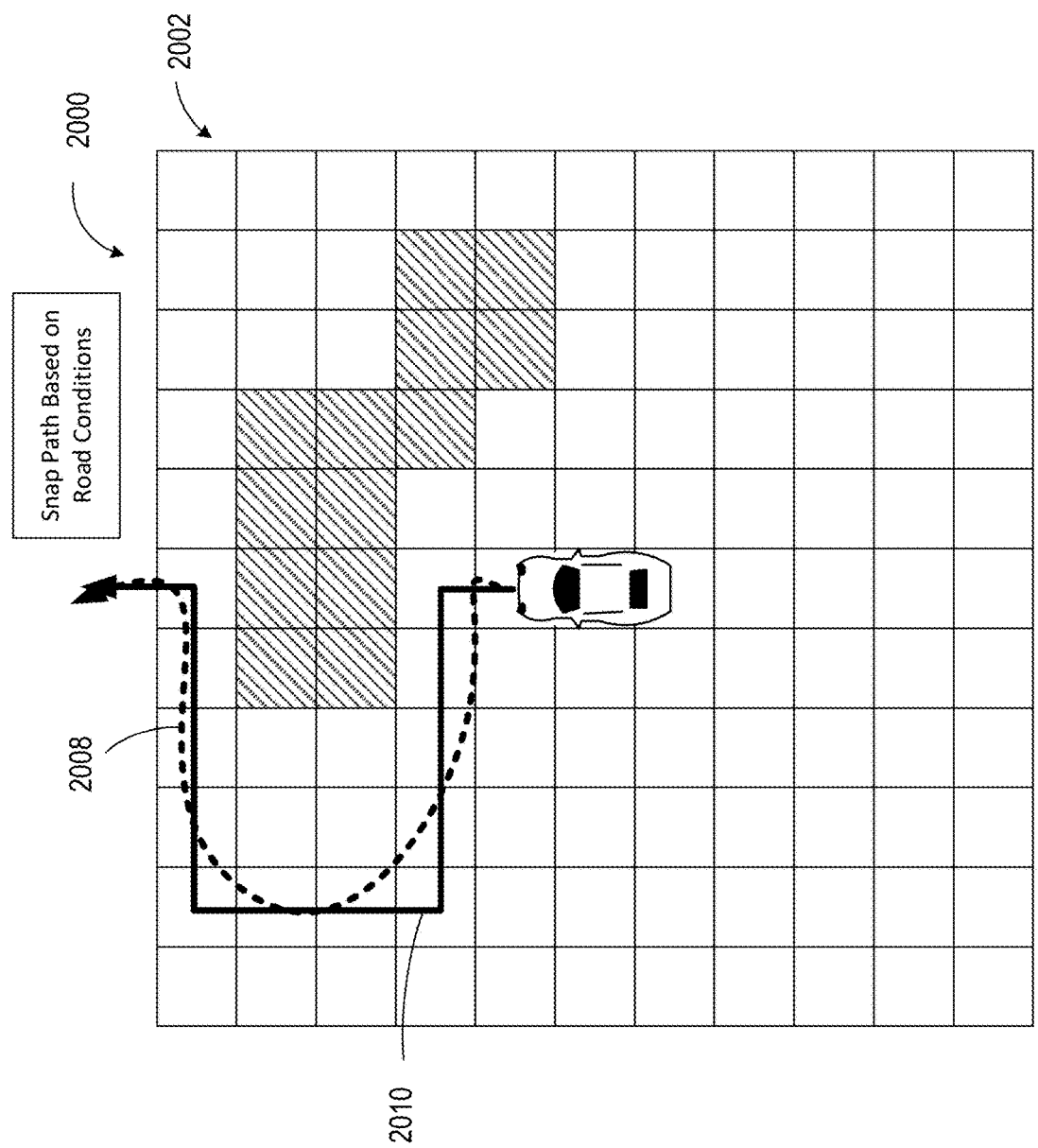
Figure 28:
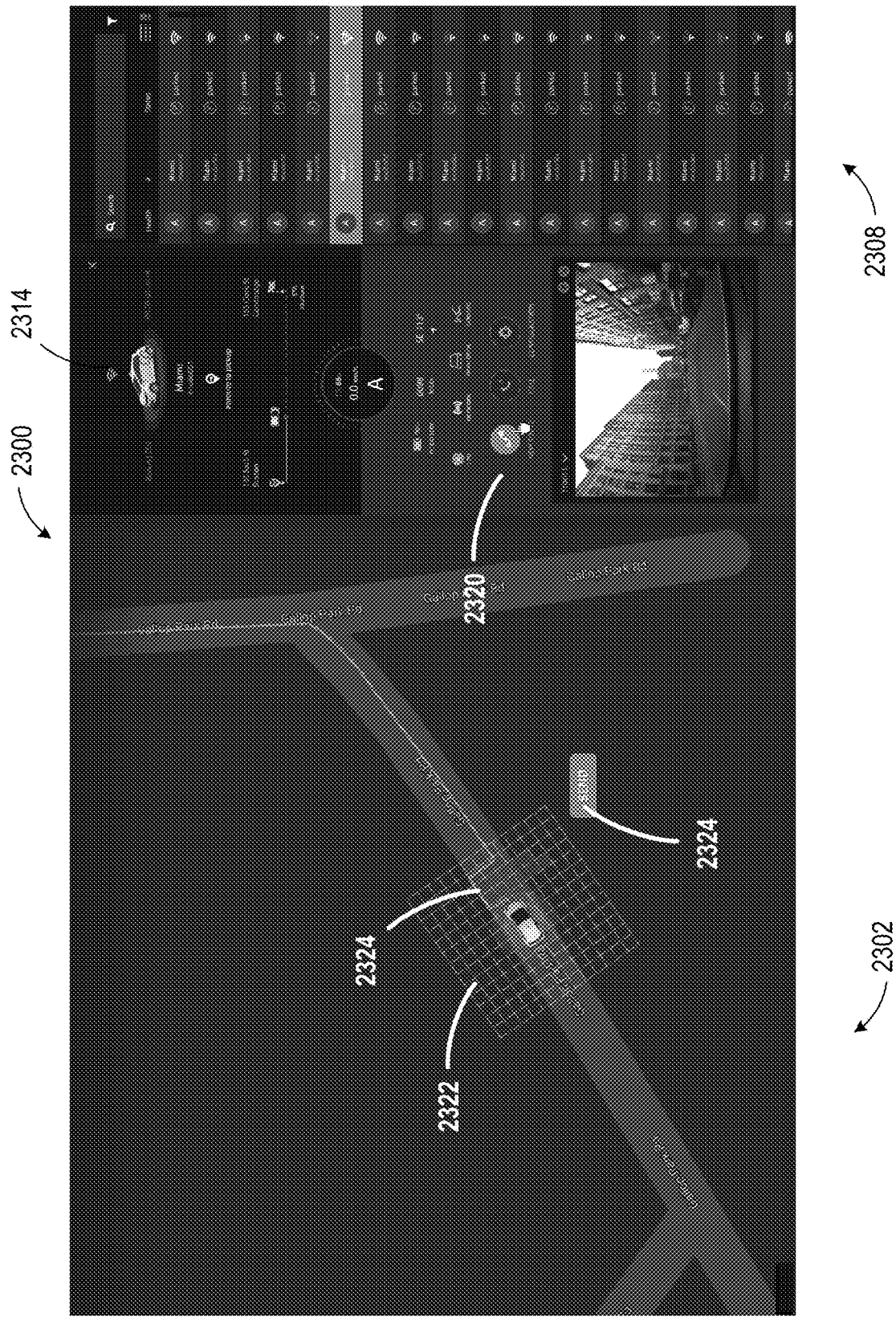

In some embodiments, a user can manually specify a route or a path of travel for an autonomous vehicle. As shown in FIG. 28, a user can select a selectable element 2320 (e.g., indicating that the user would like to input a new route for the autonomous vehicle). In response, the GUI 2300 updates the map portion 2302 to display a visual representation 2322 of any objects or other obstructions in proximity to the autonomous vehicle. The visual representation 2312 can be similar to that shown and described with respect to FIGS. 20-22 (e.g., having a two-dimensional occupancy grid representing the physical environment surrounding the autonomous vehicle). In a similar manner as described with respect to FIGS. 20-22, a user can input a path 2324 for the autonomous vehicle (e.g., a path to traverse obstruction), and instruct the autonomous vehicle to travel along that path (e.g., by selecting a "send" element 2326).

As shown in FIG. 23, the GUI 2300 can display the locations of multiple different autonomous vehicles using the map portion 2302 (e.g., using display elements 2304 overlaid on the graphical map 2306). Further, a user can interact with the map portion 2302 to view different geographical regions (e.g., by zooming and/or panning the graphical map 2306). In some embodiments, the GUI 2300 displays the general location of multiple autonomous vehicles using a single display element. This can be useful, for example, in improving the readability of the GUI 2300. For example, if multiple autonomous vehicles are positioned nearby one another on the map portion 2302, the display elements for those autonomous vehicles can be combined into a single display element. Further, the combined display element can include an indication of the number of vehicles that it represents.

Figure 29:
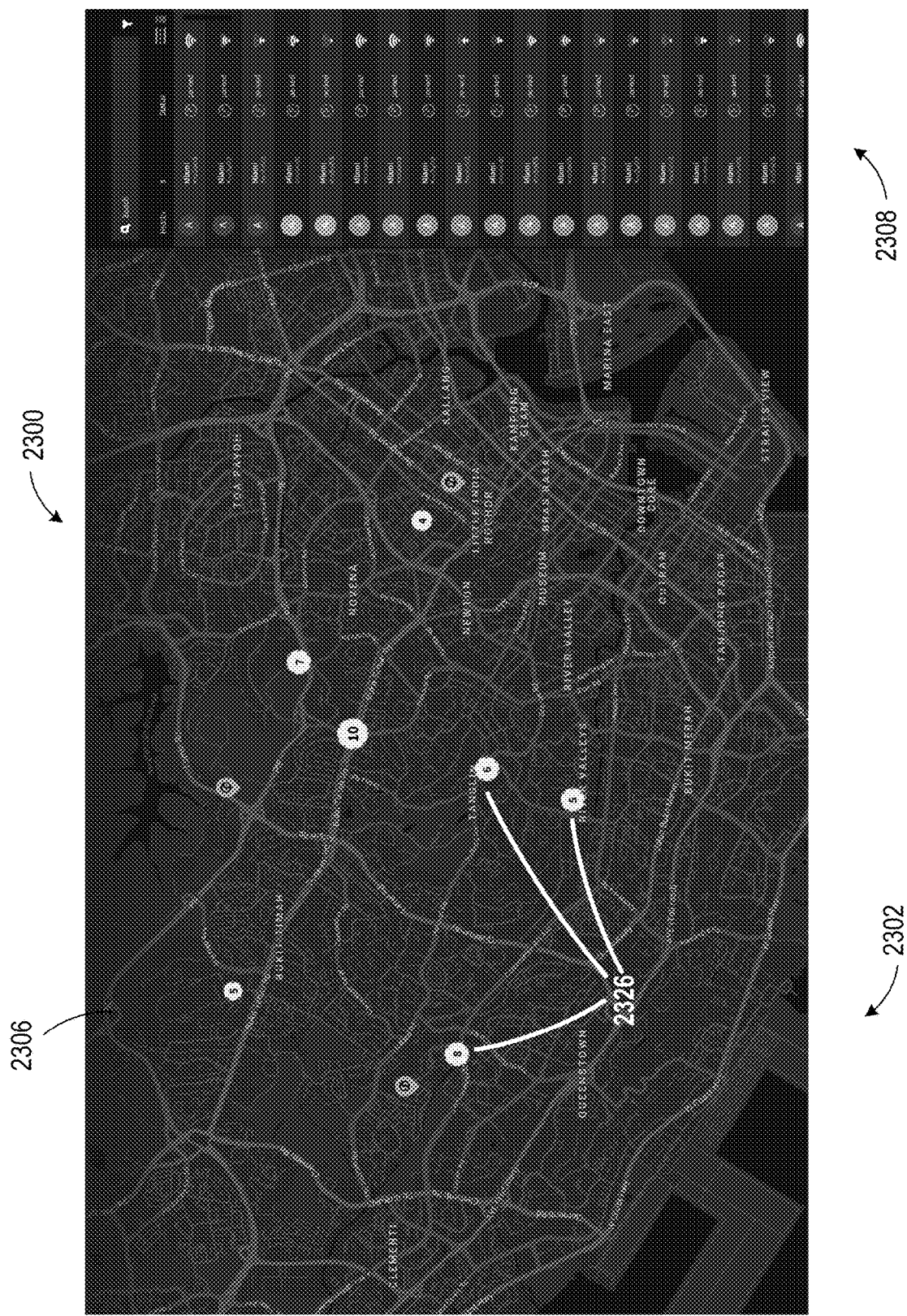

As an example, FIG. 29 shows the GUI 2300 with the graphical map 2306 zoomed out relative to that shown in FIG. 23. Instead of presenting the location of individual autonomous vehicles, the GUI 2300 indicates the general location of different groups of autonomous vehicles (and the number of autonomous vehicles in each group) using display elements 2326.

In some embodiments, the GUI 2300 dynamically switches between showing the location of individual autonomous vehicles and showing the general locations of groups of autonomous vehicles. For example, if the graphical map 2306 is zoomed in relatively close, the GUI 2300 can display the locations of individual autonomous vehicles on the graphical map 2306. If the graphical map 2306 is subsequently zoomed out to a particular zoom level, the GUI 2300 can display the general locations of groups of autonomous vehicles instead (e.g., to avoid cluttering the graphical map 2306).

Figure 30:
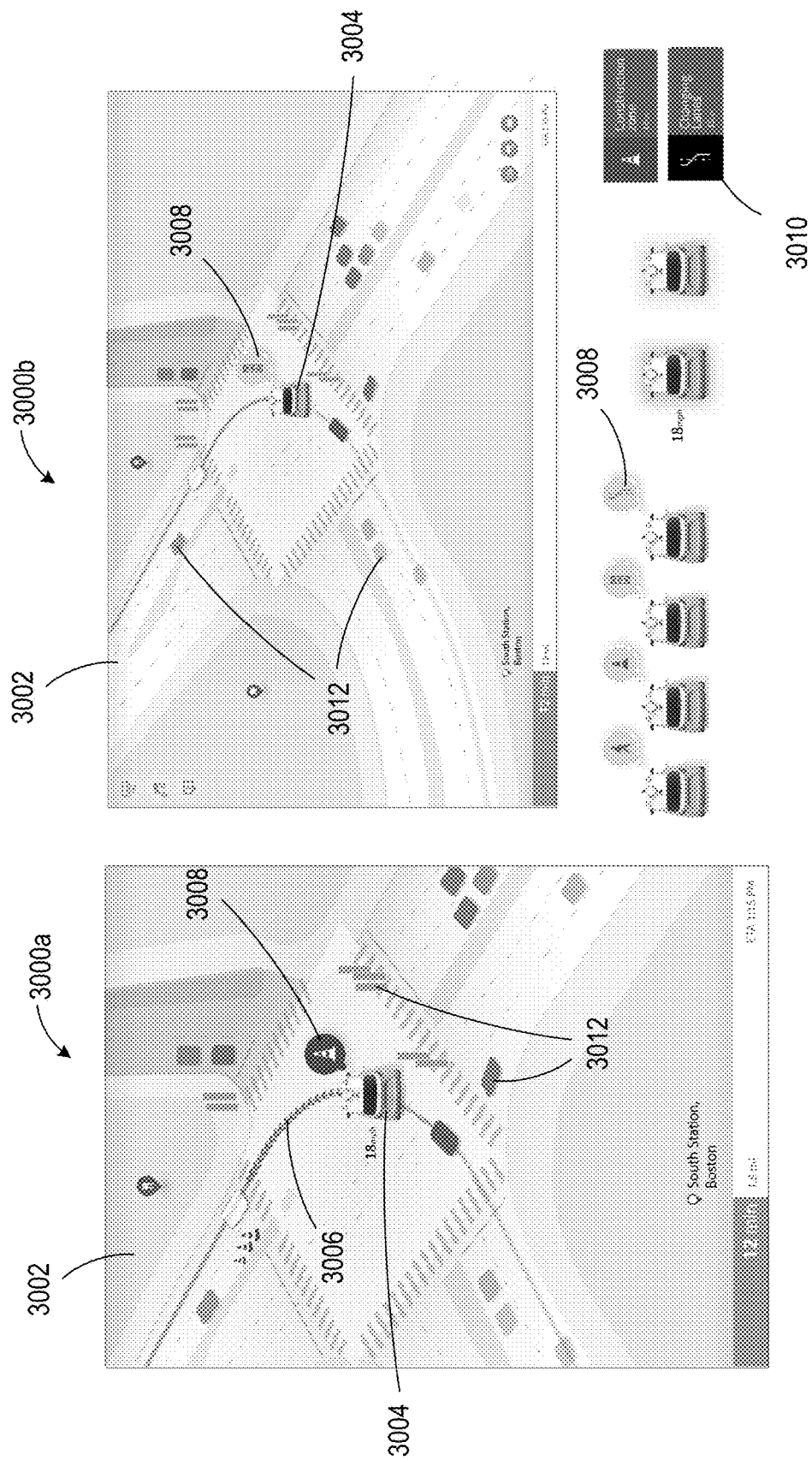

FIG. 30 shows example GUIs 3000*a* (having a "portrait" orientation) and 3000*b* (having a "landscape" orientation) for monitoring and controlling the operation of a single autonomous vehicle. The GUIs 3000*a* and 3000*b* can be generated, for example, by an autonomous vehicle and presented to a passenger of the autonomous vehicle using a display device (e.g., a video monitor or screen mounted within the autonomous vehicle, such as on an interior console or seat of the autonomous vehicle).

The GUIs 3000*a* and 3000*b* can present information regarding the operation of the autonomous vehicle and/or the environment surrounding the autonomous vehicle. This can be useful, for example, as it enables a passenger of the autonomous vehicle to keep informed regarding the operation of the autonomous vehicle during travel, even if the passenger is not directly controlling the autonomous vehicle (e.g., to improve passenger comfort and safety).

The GUIs 3000*a* and 3000*b* can show simplified visual representations of the autonomous vehicle and/or the surrounding environment. This can be beneficial, for example, in improving the readability of the GUIs 3000*a* and 3000*b* (e.g., by reducing complexity or clutter that might confuse or distract a user). For instance, instead of showing a photorealistic representation of the autonomous vehicle and each of the objects surrounding it (e.g., using an image or video captured by an imaging sensor directly), the GUIs 3000*a* and 3000*b* can display a simplified graphical representation showing the autonomous vehicle and selected features of the environment (e.g., certain roads, objects, etc.). Further, the graphical representation can be generated using high contrast and high visibility display elements to improve readability.

For example, as shown in FIG. 30, the GUIs 3000*a* and 3000*b* include a map portion 3002 representing the environment surrounding the autonomous vehicle, and a display element 3004 indicating the location of the autonomous vehicle in the environment. As an example, the map portion 3002 can indicate one or more roads in the environment, a current or anticipated path of the autonomous vehicle, and one or more objects in proximity to the autonomous vehicle.

Further, the map portion 3002 can display information regarding the operation of the autonomous vehicle. For example, the map portion 3002 can indicate the current speed of the autonomous vehicle (e.g., in the form of text next to the display element 3004). In some embodiments, the current speed is hidden from view, and a passenger can selectively display the current speed by selecting the display element 3004.

As another example, the map portion 3002 can indicate whether there is a slow down or delay along the autonomous vehicle's route or path. For example, if there is traffic congestion slowing down the autonomous vehicle, the map portion 3002 can indicate the slow down by indicating the path 3006 using contrasting colors or patterns (e.g., a red dotted line).

As another example, the map portion 3002 can indicate one or more events or conditions detected by the autonomous vehicle (e.g., using a "bubble" display element 3008 extending from the display element 3004, or a notification message 3010 overlaid on the map portion 3002). Example events or conditions include the detection of a pedestrian, detour, obstruction, crosswalk, traffic signal, traffic signal, or other feature, or a determination that a lane change is required (e.g., for navigation or evasive purposes). Additional example bubble display elements 3008 and notification messages 3010 are shown below GUI 3000b.

Figure 31:
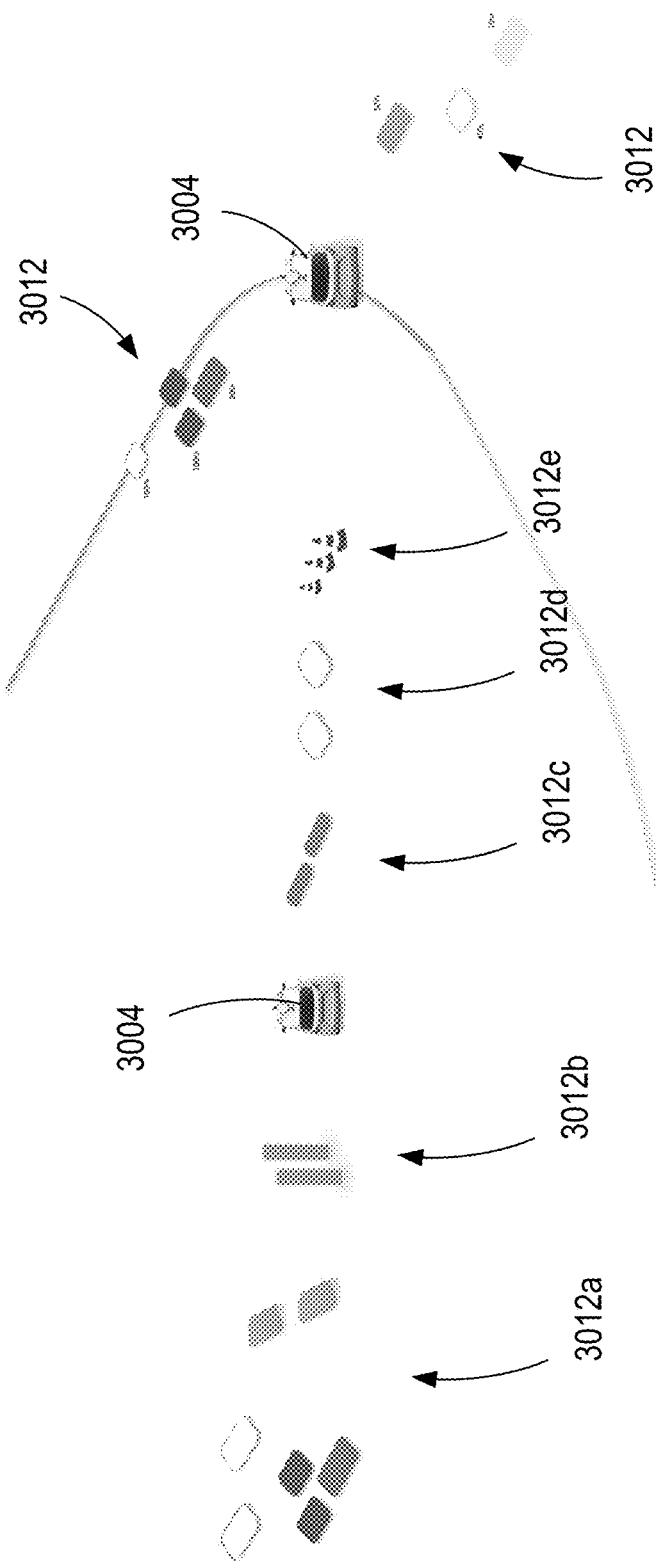

The map portion 3002 can indicate the location and classification of objects using symbolic icons 3012 (e.g., simplified representations of the objects). Different icons can be used for different classes or types of objects. For instance, FIG. 31 shows several example symbolic icons 3012a-3012e that can be used to represent different classes or types of objects. For example, icons 3012a can be used to represent motor vehicles (e.g., cars, trucks, vans, etc., icons 3012b can be used to represent pedestrians, icons 3012c can be used to represent bicycles, icons 3012d can be used to represent unclassified objects, and icons 3012e can be used to identify construction barricades or traffic cones.

Further, the opacity or shading of the icons 3012 can be varied to indicate a confidence regarding the classification of the objects. For example, if the autonomous vehicle determines that an object is a vehicle with a higher degree of confidence, the icon 3012 for that object can be relatively darker or more opaque. As another example, if the autonomous vehicle determines that an object is a vehicle with a lower degree of confidence, the icon 3012 for that object can be relatively lighter or less opaque.

Figure 32:
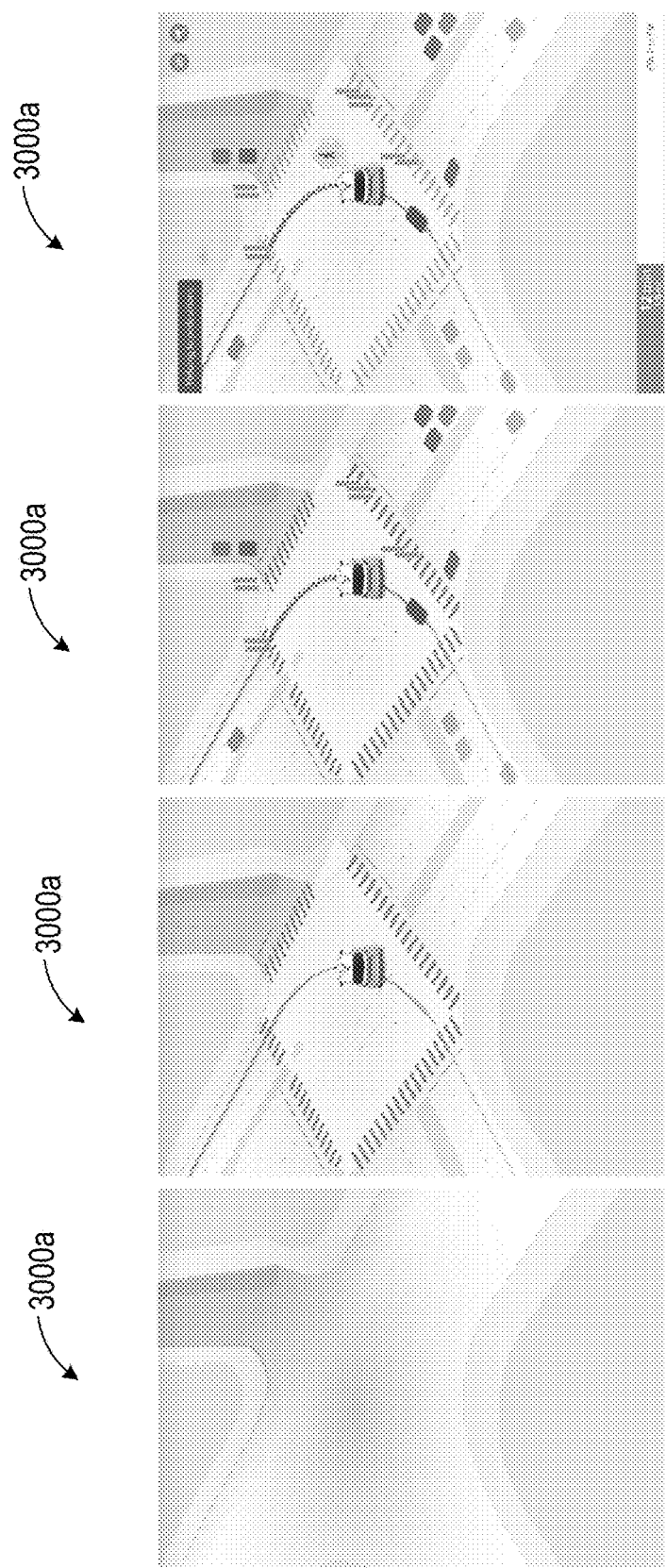

The amount of information presented on the GUIs 3000a and 3000b can vary, depending on the implementation. As an example, in some implementations, the GUIs 3000a and 3000b can indicate all or substantially all of the detected objects in the surrounding environment. As another example, in some implementations, the GUIs 3000a and 3000b can indicate a subset of the detected objects (e.g., objects are the closer to the autonomous vehicle, or more important or higher priority objects). To illustrate, FIG. 32 shows four variations of the GUIs 3000a, each showing different levels of detail regarding the autonomous vehicle and its surrounding environment. For instance, the far left variation shows only the roads in the environment, while the middle left variation additionally shows a pedestrian crosswalk, the autonomous vehicle's position in the environment, and an anticipated path of the autonomous vehicle. Further, the middle right variation additionally shows objects detected the environment (e.g., other vehicles, pedestrians, bicycles, etc.). Further, the far right variations additionally shows information regarding detected events or conditions (e.g., in the form of bubble display elements and notification messages). This is beneficial, for example, as it enables the autonomous vehicle to vary the amount of information displayed the passenger, such that the passenger is not overwhelmed or distracted.

Figure 33:
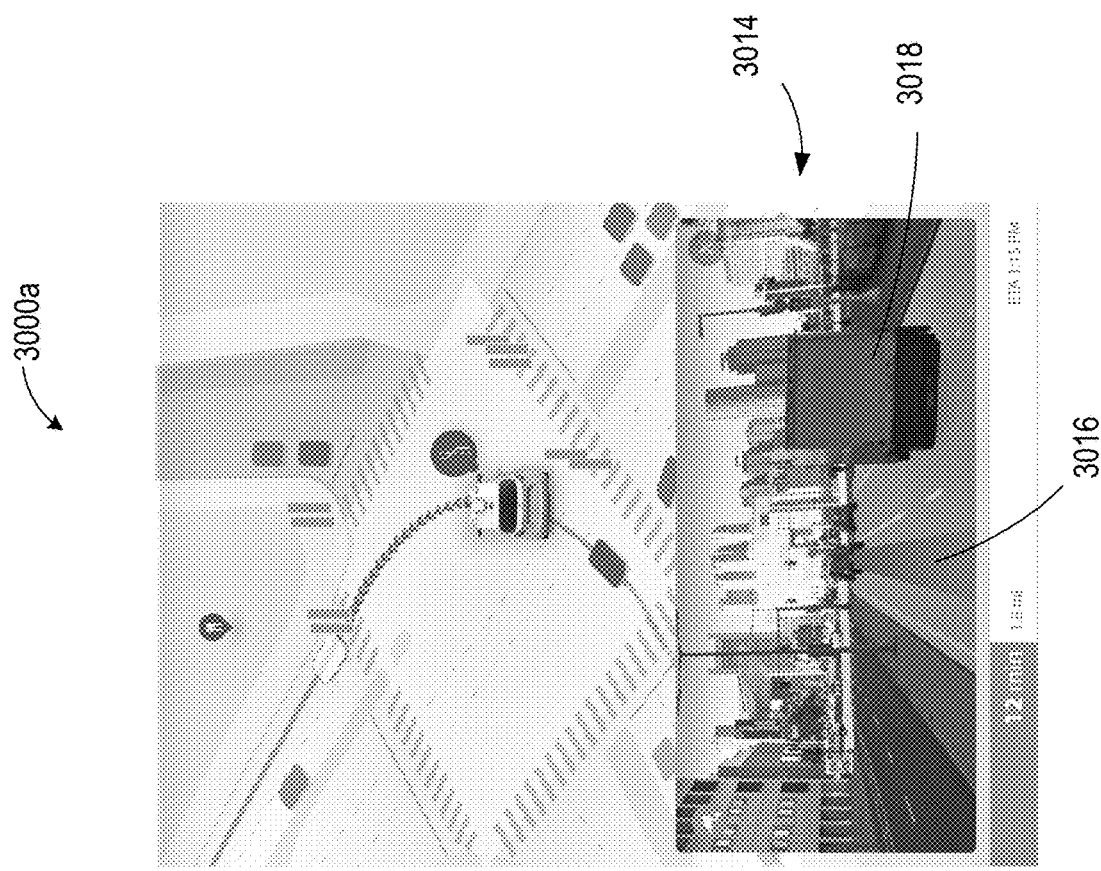

In some embodiments, the GUIs 3000a and 3000b include one or more video having an "augmented reality" overlay to improve the clarity of the video. As an example, FIG. 33 shows a GUI 3000a having video 3014. The video 3014 can be obtained, for example, using one or more video cameras or other imaging sensors of the autonomous vehicle. Further, the video 3014 can include one or more graphical overlays accentuating certain features depicted the video 3014. For example, the video 3014 can include an overlay 3016 (e.g., a display element simulating a three dimensional path) indicating the current or anticipated path of the autonomous vehicle. As another example, the video 3014 can include an overlay 3018 (e.g., a high contrast color overlay) identifying a vehicle in proximity to the autonomous vehicle. Other overlays can also be used (e.g., to identify other types of objects, obstructions, or other features shown in the video 3014).

In some embodiments, the GUIs 3000a and 3000b show video captured in real-time or substantially real-time. For example, video captured by an imaging sensor can be immediately shown on the GUIs 3000a and 3000b to provide a substantially contemporaneous view of the environment surrounding the autonomous vehicle. In some embodiments, the GUIs 3000a and 3000b show portions of video captured in the past (e.g., occurring seconds ago, minutes ago, etc.). This can be useful, for example, in providing the user with "instant replays" of certain events (e.g., near collisions, sudden lane changes, evasive maneuver, etc.), such that the user has a better understanding of why the autonomous vehicle responded in the way that it did. In some embodiments, an imaging sensor continuously captures video (e.g., in a video buffer), and portions of video are selectively extracted for display based on the detection of certain trigger events (e.g., the detection of a nearby object, the performance of a lane change, the performance of an evasive maneuver, the performance of emergency braking, etc.).

In some embodiments, a GUI is used to display entertainment programs to the passenger (e.g., movies, television shows, videos, music, etc.). For example, as shown in FIG. 34, a GUI 3020 includes several selectable display elements 3022, each corresponding to a different program. A user can select one of the display elements 3012 to play back a particular program (e.g., as shown in FIG. 35). Further, the GUI 3020 can interrupt play back to present information regarding the autonomous vehicle to the passenger. For example, the GUI 3020 can present a notification message 3024 regarding the occurrence of certain events or conditions (e.g., the detection of a construction zone, the detection of an object in proximity to the autonomous vehicle, a determination that a lane change is required, etc.).

Figure 36:
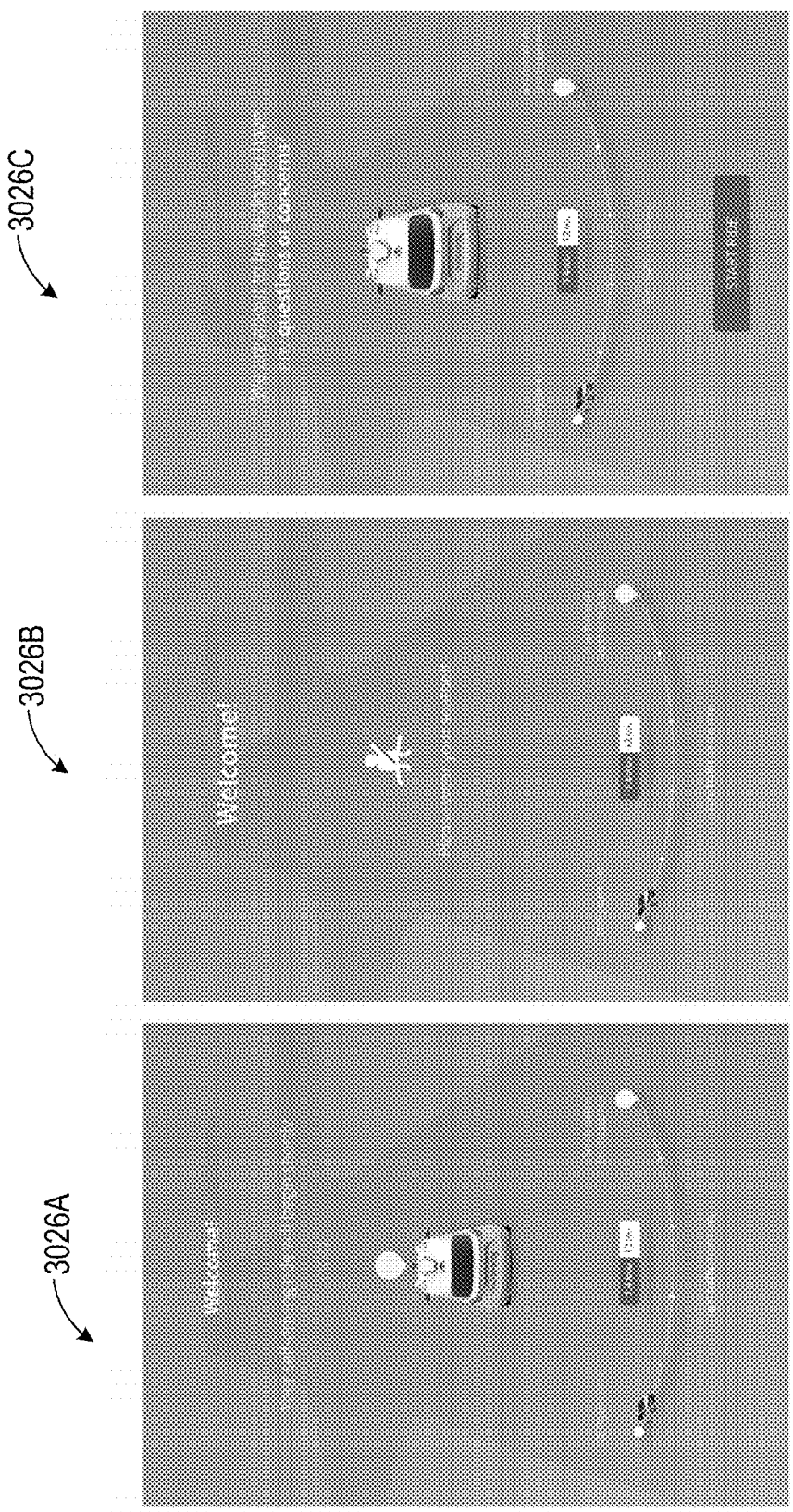

In some embodiments, a GUI is used to display safety and orientation information to the passenger. This can be useful, for example, in educating the passenger regarding the safe operation of the autonomous vehicle. For example, FIG. 36 shows an example GUI 3026a welcoming the passenger to the autonomous vehicle and display information regarding an upcoming trip (e.g., the beginning location, the destination location, the distance between them, the estimated travel time, and the level of traffic along the route). As another example, FIG. 36 shows an example GUI 3026b instructing the user to fasten his seatbelt in preparation for the trip. As another example, FIG. 36 shows an example GUI 3026c requesting instructions from the user to initiate the trip.

Figure 37:
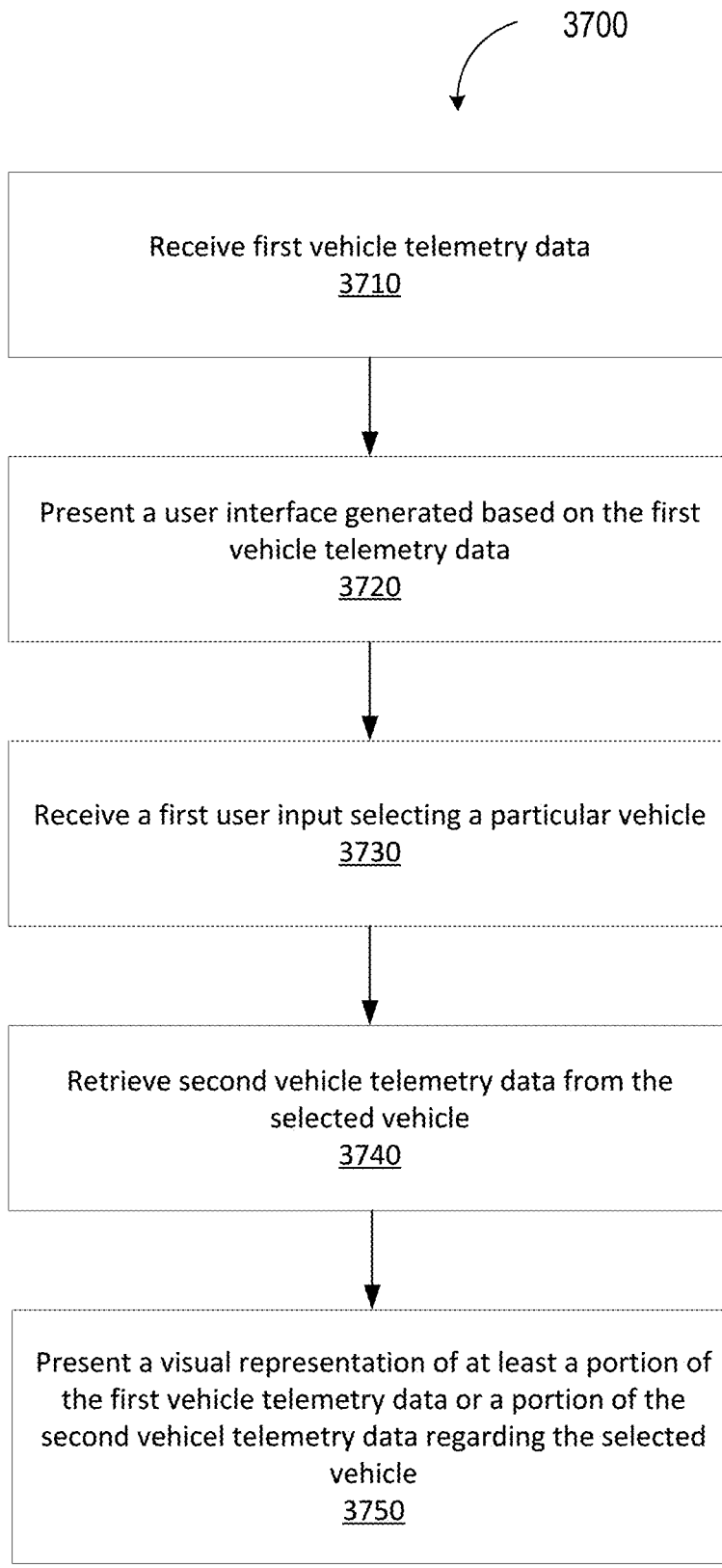
FIG. 37 in a flow chart diagram showing an example process for monitoring and controlling the operation of autonomous vehicles.

Example Processes for Monitoring and Controlling the Operation of Autonomous Vehicles FIG. 37 shows an example process 3700 for monitoring and controlling the operation of autonomous vehicles. The process 3700 can be performed, at least in part, using one or more of the systems described herein (e.g., using one or more computer systems, AV systems, autonomous vehicles, graphical user interfaces, etc. described with respect to FIGS. 1-36).

In the process 3700, a computer device receives first vehicle telemetry data from each vehicle of a plurality of vehicles (step 3710). The vehicle telemetry data includes of each vehicle of the plurality of vehicles, an indication of a geographical location of the vehicle. At least one vehicle of the plurality of vehicles is an autonomous vehicle.

In some embodiments, first vehicle telemetry data includes data that is relatively "basic," "simpler," "lightweight," or "generalized" (e.g., compared to second vehicle telemetry data, described in further detail below). As an example, the first vehicle telemetry data can be relatively smaller in size and/or less complex in nature. As another example, the first vehicle telemetry data can include a relatively smaller subset of data collected by the sensors of the autonomous vehicles. As another example, the first vehicle telemetry data can include a relatively abstracted representation of the data collected by the sensors of the autonomous vehicles (e.g., a summarized, abridged, redacted, and/or simplified representation of the collected data).

Various examples of first vehicle telemetry data are described herein. As an example, first vehicle telemetry data can include, for each vehicle of the plurality of vehicles, geographical coordinates corresponding to the geographical location of the vehicle and/or an altitude of the vehicle.

The computer generates a user interface based on the first vehicle telemetry data, and presents the user interface on a display device associated with the computer device (step 3720). The user interface includes a graphical map and one or more first display elements. Each first display element indicates at least a respective geographical location of a respective vehicle of the plurality of vehicles. In some embodiments, the user interface includes a second display element indicating at one of the more vehicles in a list. In some embodiments, the user interface includes, for at least one autonomous vehicle, an indication of an assigned task of the autonomous vehicle (e.g., traveling to a customer/package, transporting a customer/package, charging, idling, repositioning, etc.). Example user interfaces are shown, for example, in FIGS. 23-29.

The computer device receives a first user input selecting a particular vehicle of the plurality of vehicles (step 3730). As an example, a user can select a vehicle using an input device, such as a mouse, trackpad, stylus, or touch sensitive display device.

In response to receiving the first user input, the computer device retrieves second vehicle telemetry data from the selected vehicle (step 3740). The second vehicle telemetry data can be more "detailed" than the first vehicle telemetry data. For example, the second vehicle telemetry data can be relatively larger in size and/or more complex compared to the first vehicle telemetry data. As another example, the second vehicle telemetry data can include a relatively larger subset of data collected by the sensors of the autonomous vehicle compared to the first vehicle telemetry data. As another example, the second vehicle telemetry data can include a relatively less abstracted representation of the data collected by the sensors of the autonomous vehicle (e.g., a more detailed summary or less simplified representation of the collected data, or the collected data itself). As another example, the second vehicle telemetry data can include the entirety of the data collected by the sensors of the autonomous vehicle, rather than a subset of the collected data.

Various examples of first vehicle telemetry data are described herein. This can include videos, images, sensor data, CPU, battery, energy consumption, orientation, driving speed, general vehicle status (e.g., normal/error condition), failure indicators (e.g., failed brake, failed sensors, etc.), historical data, decision making, environment information, traffic speed, object identification, geolocation, object color, vehicle/object orientation, routing information, decision making on route selection, etc.), As an example, second vehicle telemetry data can include a video and/or image captured by a sensor of the selected vehicle (e.g., an imaging sensor, such as a photodetector or camera module). As another example, the second telemetry data can include an indication of a velocity of the selected vehicle and/or an indication of an orientation of the selected vehicle. As another example, the second vehicle telemetry data can include an indication of an operating condition of a computer system of the selected vehicle (e.g., CPU usage, memory usage, etc.). As another example, the second vehicle telemetry data can include an indication of a condition of one or more batteries of the selected vehicle. As another example, the second vehicle telemetry data can include an indication of an energy consumption of the selected vehicle. As another example, the second vehicle telemetry data can include an indication of an operating condition of the selected vehicle (e.g., general vehicle status such as normal/error condition, failure indicators such as failed brake or failed sensors, etc.).

In some embodiments, second vehicle telemetry data includes information regarding an environment of the selected vehicle. As an example, this can include an indication of one or more objects in proximity to the selected vehicle, an indication of a weather in the environment, an indication of one or more parking spaces in the environment, and/or an indication of a landmark in the environment.

In some embodiments, the second vehicle telemetry data includes information regarding a route of the selected vehicle (e.g., current route, decisions made with respect to route selection, etc.).

The computing device presents a visual representation of at least a portion of the first vehicle telemetry data or a portion of the second vehicle telemetry data regarding the selected vehicle on the user interface using the display device (step 3750). In some embodiments, the visual representation includes "raw" data (e.g., data obtained directly from the sensors without substantially any post-processing). In some embodiments, the visual representation includes "processed" data (e.g., data that was obtained from the sensors and subsequently manipulated, for example to summarize the data, identify new trends or insights based on the data, or to perform other data analysis).

In some embodiments, the visual representation includes an "augmented reality" video. For example, this can include a video captured by a sensor of the selected vehicle, and one or more graphical elements overlaid on the video (e.g., indicating one or more detected objects in the video, such as other vehicles, pedestrians, objects, etc.).

In some embodiments, the first vehicle telemetry data and/or the second vehicle telemetry data is textual data. For example, the first vehicle telemetry data and/or the second vehicle telemetry data can include one or more data items in a JavaScript Object Notation (JSON), Hypertext Markup Language (HTML), or Extensible Markup Language (XML) format.

In some case, the computer device receives, from a first vehicle, an indication of an abnormal operation of the first vehicle. In response, the computer device can present, by the display device, an alert regarding the abnormal operation of the first vehicle on the user interface. The indication of the abnormal operation of the first vehicle can be an indication of an interruption of a network connection between the first vehicle and the computer device and/or an indication that a path of the first vehicle is obstructed.

In some embodiments, the computer device receives a second user input including one or more search conditions with respect to the plurality of vehicles. The computer device determines one or more vehicles meeting the one or more search conditions, and present a visual representation of the one or more vehicles meeting the one or more search conditions on the user interface. The one or more search conditions can include an indication of a service facility associated with one or more autonomous vehicles, and determining the one or more vehicles meeting the one or more search conditions can include identifying one or more vehicles in proximity to the service facility.

Figure 38:
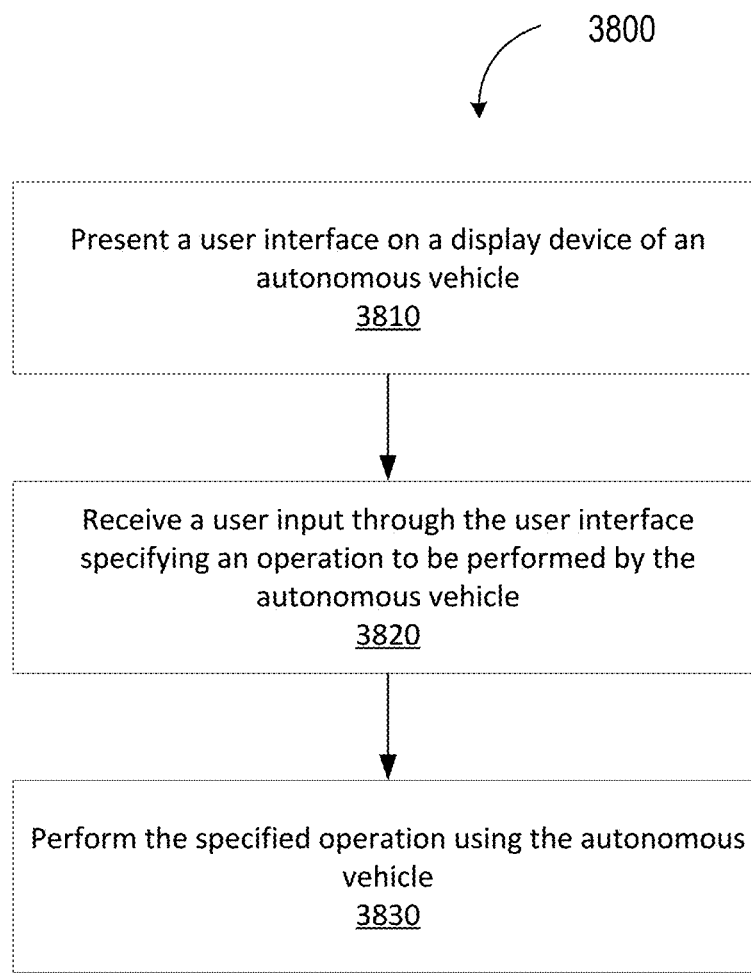
FIG. 38 in a flow chart diagram showing another example process for monitoring and controlling the operation of an autonomous vehicle.

FIG. 38 shows another example process 3800 for monitoring and controlling the operation of an autonomous vehicle. The process 3800 can be performed, at least in part, using one or more of the systems described herein (e.g., using one or more computer systems, AV systems, autonomous vehicles, graphical user interfaces, etc. described with respect to FIGS. 1-36).

In the process 3800, a user interface is presented on a display device of an autonomous vehicle (step 3810). The user interface includes a visual representation of an environment surrounding the autonomous vehicle, a first display element indicating a physical location of the autonomous vehicle with respect to the environment, and one or more second display elements. Example user interfaces are shown, for example, in FIGS. 30-36.

Each second display element indicates a respective operational property of the autonomous vehicle. For instance, this can include a route of the vehicle, objects detected by the vehicle, detected events, video feed, video replay, augmented reality video overlays, confidence indicators, slow down indicators, etc.

As an example, at least one second display element can indicate a route of the autonomous vehicle. As another example, at least one second display element can indicate an occurrence of an event with respect to the autonomous vehicle. The event can be traffic congestion in an environment of the autonomous vehicle, road construction in the environment of the autonomous vehicle, a decrease in speed of a traffic pattern along a path of the autonomous vehicle, and/or any other event. As another example, at least one second display element can include a video captured by a sensor of the autonomous vehicle. A video can be an "augmented reality" video. For example, the least one second display element can include one or more graphical elements overlaid on the video (e.g., indicating one or more detected objects in the video).

As another example, at least one second display element can indicate an object detected by the autonomous vehicle. As another example, at least one second display element can indicate a classification of the object detected by the autonomous vehicle. The classification can be at least one of a vehicle, a pedestrian, or stationary object. Further, at least one second display element can indicate a confidence metric associated with the classification of the object detected by the autonomous vehicle.

In some embodiments, an "instant replay" video is displayed to a user. For example, the autonomous vehicle can determine an occurrence of a trigger event with respect to the autonomous vehicle (e.g., a detection of an object coming into proximity of the autonomous vehicle, a detection of an object along a path of the autonomous vehicle, an initiation of an emergency braking of the autonomous vehicle, an initiation of an evasive maneuver of the autonomous vehicle, or any other event). Further, the autonomous vehicle can obtain a video captured by a sensor of the autonomous vehicle (e.g., a camera module). The autonomous vehicle can determine a portion of the video corresponding to the trigger event (e.g., a video clip), and present the portion of the video on the user interface using the display device.

In some embodiments, the autonomous vehicle detects multiple objects in proximity to the autonomous vehicle. The one more second display elements can indicate a subset of the detected objects.

A user input specifying an operation to be performed by the autonomous vehicle is received through the user interface (step 3820). As an example, a user can make an input using an input device, such as a mouse, trackpad, stylus, or touch sensitive display device.

Responsive to receiving the user input, the specified operation is performed using the autonomous vehicle (step 3830). As an example, this can include displaying additional information regarding the autonomous vehicle, modifying a path of the autonomous vehicle, modifying a destination of the autonomous vehicle, or performing any other action with respect to the autonomous vehicle.

Figure 39:
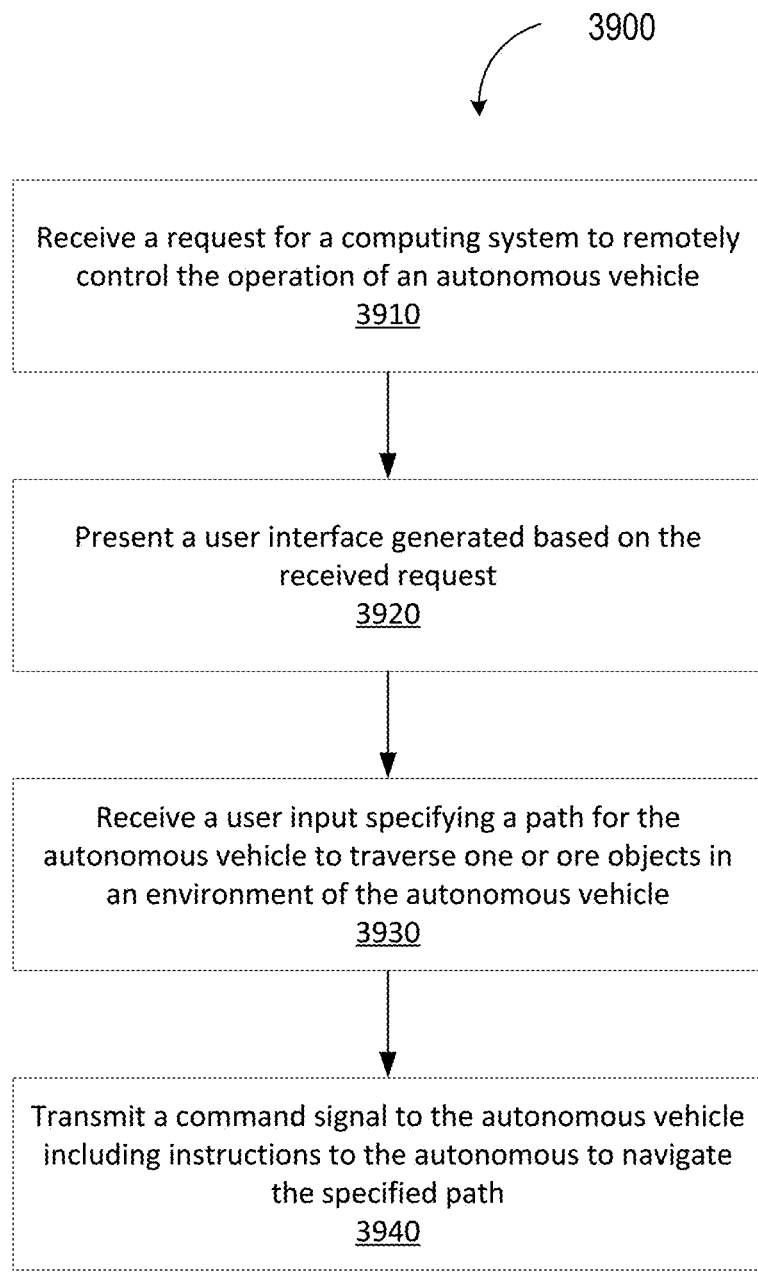
FIG. 39 in a flow chart diagram showing another example process for monitoring and controlling the operation of an autonomous vehicle.

FIG. 39 shows another example process 3900 for monitoring and controlling the operation of an autonomous vehicle. The process 3900 can be performed, at least in part, using one or more of the systems described herein (e.g., using one or more computer systems, AV systems, autonomous vehicles, graphical user interfaces, etc. described with respect to FIGS. 1-36).

In the process 3900, a computer system receives, from an autonomous vehicle, a request for the computer system to remotely control the operation of the autonomous vehicle (step 3910). The request includes information regarding one or more objects in proximity to the autonomous vehicle. For example, the request can include at least one of a video or an image captured by a sensor of the autonomous vehicle (e.g., a imaging sensor, such as a photodetector or camera module), an indication of a classification of each object (e.g., other vehicle, pedestrian, bicycle, etc.) and an indication of a location of each object relative to the autonomous vehicle, and/or textual data indicating the location of the object relative to the autonomous vehicle. In some embodiments, the textual data includes one or more in a JavaScript Object Notation (JSON), Hypertext Markup Language (HTML), or Extensible Markup Language (XML) data format.

The computer system generates a user interface based on the received request, and presents the user interface on a display device (step 3920). The user interface includes a visual representation of an environment surrounding the autonomous vehicle, a first display element indicating a physical location of the autonomous vehicle with respect to the environment, and a second display element indicating the one or more objects in proximity to the autonomous vehicle.

In some embodiments, the second display element includes an occupancy grid identifying the location of one or more objects in proximity to the autonomous vehicle. As an example, the second display element can include a graphical representation of a plurality of regions surrounding the autonomous vehicle, and for at least one of the regions, a graphical indication that at least one of the one or more objects is positioned in that region (e.g., contrasting shading, coloring, markings, patterns, etc.). In some embodiments, the graphical representation of the plurality of regions surrounding the autonomous vehicle includes a graphical grid defining multiple two-dimensional boxes (each corresponding to a different location around the autonomous vehicle), with one or more of the boxes having contrasting shading, coloring, markings, patterns, or other visual characteristics to indicate the presence of an object in a particular location. In some embodiments, the second display element is generated based on textual data indicating, for each object, a location of the object with respect to a plurality of two-dimension boxes of a graphical grid. The textual data can include one or more data items in a JSON, HTML, or XML data format. Further, the textual data can be received from the autonomous vehicle. Example occupancy grids are described, for example, with respect to FIGS. 20-22.

The computer system receives a user input specifying a path for the autonomous vehicle to traverse the one or more objects in the environment (step 3930). In some embodiments, the computer system receives the user input by detecting a physical gesture performed by a user with respect to the second display element (e.g., tracing the path with respect to the occupancy grid). In some embodiments, the second display element is presented on a touch-sensitive display device, and the physical gestures are detected using that touch-sensitive display device (e.g., by detecting the user tracing the path on the displayed occupancy grid).

In some embodiments, the path specified by the user is modified based on one or more reference paths (e.g., "snapped" to a reference path, aligning the specified path with the one or more reference paths, etc.). In some embodiments, the reference paths corresponds to a traffic pattern of a road in the environment surrounding the autonomous vehicle.

In response to receiving the user input, the computer system transmits a command signal to the autonomous vehicle including instructions to the autonomous vehicle to traverse the specified path (step 3940).

Figure 40:
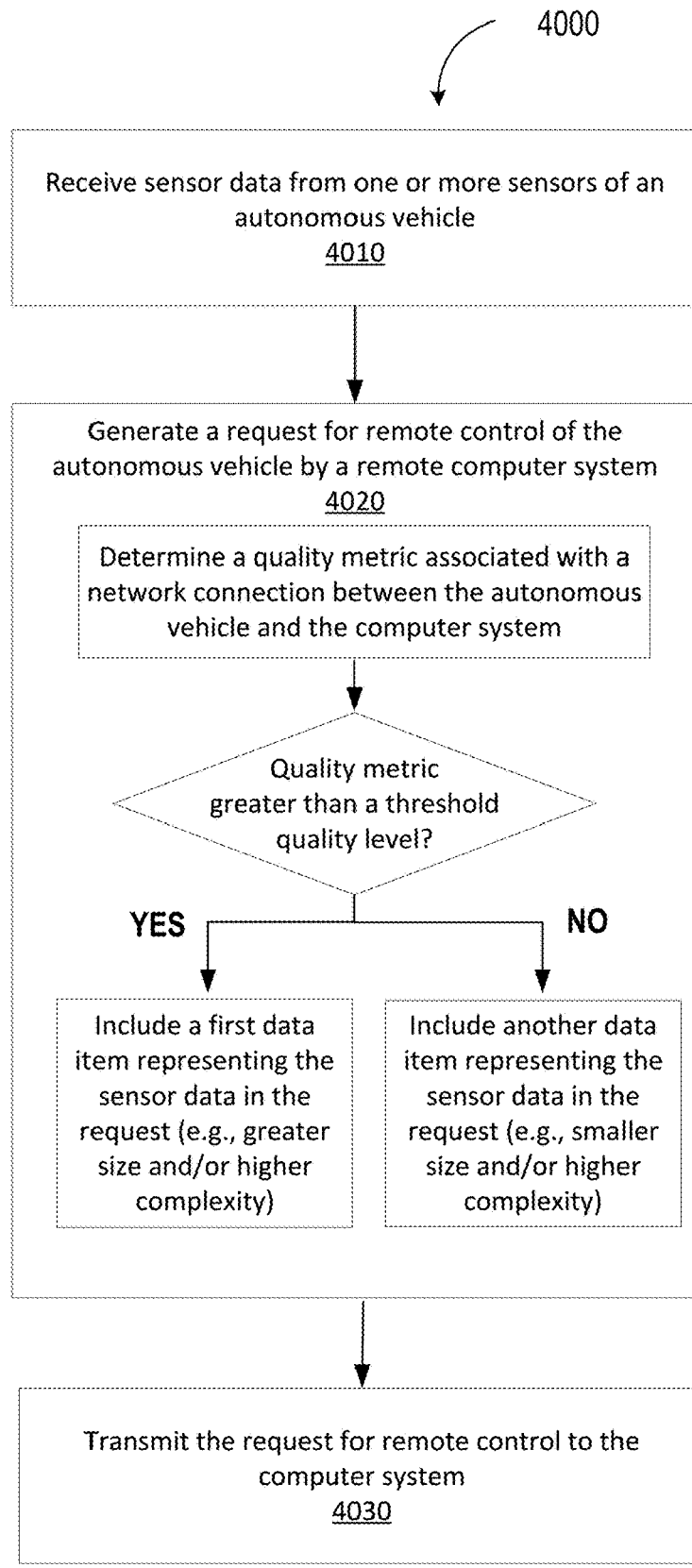
FIG. 40 in a flow chart diagram showing another example process for monitoring and controlling the operation of an autonomous vehicle.

FIG. 40 shows another example process 4000 for monitoring and controlling the operation of an autonomous vehicle. The process 4000 can be performed, at least in part, using one or more of the systems described herein (e.g., using one or more computer systems, AV systems, autonomous vehicles, graphical user interfaces, etc. described with respect to FIGS. 1-36).

In the process 4000, an autonomous vehicle receives sensor data from one or more sensors of the autonomous vehicle (step 410). Sensor data can include, for example, one or more videos, images, proximity data, and/or other information captured by the one or more sensors.

The autonomous vehicle generates a request for remote control of the autonomous vehicle by a computer system remote from the autonomous vehicle (step 4020). Generating the request includes determining a quality metric associated with a network connection between the autonomous vehicle and the computer system, and upon determining that the quality metric is greater than a threshold quality level, including a first data item representing the sensor data in the request (e.g., a data item meeting one or more conditions associated with the threshold quality level). Alternatively, upon determining that the quality metric is less than the threshold quality level, another data item representing the sensor data is included in the request (e.g., a data item associated with a lower quality level).

In some embodiments, the one or more conditions associated with the threshold quality level includes at least one of a data size or a complexity of the sensor data. For example, if the quality metric meets or exceeds the threshold quality level, the included sensor data can be of a particular data size or complexity (e.g., a higher data size or complexity). In contrast, if the quality metric is less than the threshold quality level, the included sensor data can be of a different data size or complexity (e.g., a lower data size or complexity).

In some embodiments, the quality metric corresponds to one or more aspects of the network connection, such as an available bandwidth of the network connection, a latency associated with network connection, and/or a reliability of the network connection. A higher quality metric can correspond to a higher quality connection (e.g., greater available bandwidth, lower latency, and/or higher reliability), while lower quality metric can correspond to a lower quality connection (e.g., smaller available bandwidth, higher latency, and/or lower reliability). In some embodiments, the quality metric is determined by transmitting a beacon signal using the network connection (e.g., a transmission including test data), and determining the quality metric based on the transmission of the beacon signal. In some embodiments, an available bandwidth of the network connection is determined based on the transmission of the beacon signal.

The autonomous vehicle transmits the request for remote control to the computer system (step 4030).

In some embodiments, the autonomous vehicle further determines a second quality metric associated with the network connection between the autonomous vehicle and the computer system (e.g., at a different time and/or location as the determination of the first quality metric). Upon determining that the second quality metric is less than the threshold quality level, the autonomous vehicle can include a second data item representing the sensor data in the request. The second data item can meet one or more conditions associated with the threshold quality level.

Further, the second data item can have a smaller data size or a lower complexity than the first data item. For example, the first data item can include a video having a higher resolution than that of a video included in the second data item. As another example, the first data item can include a video having a higher frame rate than that of a video included in the second data item. As another example, the first data item can include an image having a higher resolution than that of an image included in the second data item. As another example, the first data item can include a greater number of images than that included in the second data item. As another example, the first data item can include a portion of sensor data having a higher spatial resolution than that of a portion of sensor data included in the second data item. As another example, the first data item can include a portion of sensor data having a high temporal resolution than that of a portion of sensor data included in the second data item. As another example, the first data item can include at least one video or image of an environment of the autonomous vehicle, and the second data item can include textual data describing the environment of the autonomous vehicle instead of the at least one video or image. In some embodiments, the textual data can include one or more data items in a JSON, HTML, or XML data format.

In some embodiments, the autonomous vehicle determines a condition impeding a travel of the autonomous vehicle. The request for remote control is generated responsive to this determination. The condition could correspond, for example, to an object blocking a path of the autonomous vehicle or a closure of a roadway along a path of the autonomous vehicle.

In some embodiments, the autonomous vehicle receives a command signal from the computer system (e.g., in response to the request). The command signal can include instructions to the autonomous vehicle to traverse a specified path. The autonomous vehicle can execute the command signals to traverse the specified path (e.g., to avoid one or more objects impeding its travel).

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
   receiving, by an autonomous vehicle, sensor data from one or more sensors of the autonomous vehicle;
   generating, by the autonomous vehicle, a request for remote control of the autonomous vehicle by a computer system remote from the autonomous vehicle, wherein generating the request comprises:
   determining, by the autonomous vehicle, a quality metric associated with a network connection between the autonomous vehicle and the computer system, and
   comparing the quality metric to a threshold quality level,
   transmitting, from the autonomous vehicle to the computer system, the request for remote control, wherein transmitting the request comprises:
   transmitting, with the request, a first data item representing the sensor data upon determining that the quality metric is greater than threshold quality level, or
   transmitting, with the request, a second data item representing the sensor data upon determining that the quality metric is less than threshold quality level, the second data item having a smaller data size or a lower complexity than the first data item,
   wherein the first data item comprises at least one video or image of an environment of the autonomous vehicle,
   wherein the second data item comprises textual data describing the environment of the autonomous vehicle instead of the at least one video or image.

2. The method of claim 1, wherein the sensor data comprises at least one of a video, an image, or proximity data captured by the one or more sensors.

3. The method of claim 1, wherein the quality metric corresponds to an available bandwidth of the network connection.

4. The method of claim 1, wherein the quality metric corresponds to a latency associated with network connection.

5. The method of claim 1, wherein the quality metric corresponds to a reliability of the network connection.

6. The method of claim 1, wherein determining the quality metric associated with the network connection comprises:
   transmitting a beacon signal using the network connection, and
   determining the quality metric based on the transmission of the beacon signal.

7. The method of claim 6, wherein determining the quality metric based on the transmission of the beacon signal comprises determining an available bandwidth of the network connection based on the transmission of the beacon signal.

8. The method of claim 1, wherein the first data item comprises a portion of sensor data having a higher spatial resolution than that of a portion of sensor data included in the second data item.

9. The method of claim 1, wherein the first data item comprises a portion of sensor data having a high temporal resolution than that of a portion of sensor data included in the second data item.

10. The method of claim 1, wherein the textual data comprises one or more data items in a JavaScript Object Notation (JSON), Hypertext Markup Language (HTML), or Extensible Markup Language (XML) format.

11. The method of claim 1, further comprising:
    determining, by the autonomous vehicle, a condition impeding a travel of the autonomous vehicle, and
    wherein the request for remote control is generated responsive to determining the condition impeding the travel of the autonomous vehicle.

12. The method of claim 11, wherein the condition impeding the travel of the autonomous vehicle corresponds to an object blocking a path of the autonomous vehicle.

13. The method of claim 11, wherein the condition impeding the travel of the autonomous vehicle corresponds to a closure of a roadway along a path of the autonomous vehicle.

14. The method of claim 1, further comprising:
    receiving, at the autonomous vehicle from the computer system, a command signal comprising instructions to the autonomous vehicle to navigate a specified path, and
    executing, at the autonomous vehicle, the command signals to navigate the specified path.

15. A device comprising:
    one or more processors; and
    one or more storage devices storing instructions for execution by the one or more processors,
    wherein the one or more processors are configured to:
    receive sensor data from one or more sensors of an autonomous vehicle;

generate a request for remote control of the autonomous vehicle by a computer system remote from the autonomous vehicle, wherein generating the request comprises:
  determining a quality metric associated with a network connection between the autonomous vehicle and the computer system, and
  comparing the quality metric to a threshold quality level, transmit, to the computer system, the request for remote control, wherein
transmitting the request comprises:
  transmitting, with the request, a first data item representing the sensor data upon determining that the quality metric is greater than threshold quality level, or
  transmitting, with the request, a second data item representing the sensor data upon determining that the quality metric is less than threshold quality level, the second data item having a smaller data size or a lower complexity than the first data item,
  wherein the first data item comprises at least one video or image of an environment of the autonomous vehicle,
  wherein the second data item comprises textual data describing the environment of the autonomous vehicle instead of the at least one video or image.

16. A non-transitory computer-readable storage medium comprising one or more programs for execution by one or more processors the one or more programs including instructions which, when executed by the one or more processors, cause the one or more processors to perform operations comprising:

receiving sensor data from one or more sensors of an autonomous vehicle;
generating a request for remote control of the autonomous vehicle by a computer system remote from the autonomous vehicle, wherein generating the request comprises:
  determining a quality metric associated with a network connection between the autonomous vehicle and the computer system, and
  comparing the quality metric to a threshold quality level,
transmitting, to the computer system, the request for remote control, wherein transmitting the request comprises:
  transmitting, with the request, a first data item representing the sensor data upon determining that the quality metric is greater than threshold quality level, or
  transmitting, with the request, a second data item representing the sensor data upon determining that the quality metric is less than threshold quality level, the second data item having a smaller data size or a lower complexity than the first data item,
  wherein the first data item comprises at least one video or image of an environment of the autonomous vehicle,
  wherein the second data item comprises textual data describing the environment of the autonomous vehicle instead of the at least one video or image.

* * * * *